US008515256B2

(12) United States Patent
Fukumoto et al.

(10) Patent No.: US 8,515,256 B2
(45) Date of Patent: Aug. 20, 2013

(54) IMAGE PROCESSING APPARATUS, MOVING IMAGE REPRODUCING APPARATUS, AND PROCESSING METHOD AND PROGRAM THEREFOR

(75) Inventors: Yasutaka Fukumoto, Tokyo (JP); QiHong Wang, Tokyo (JP); Masatomo Kurata, Tokyo (JP); Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 12/524,777

(22) PCT Filed: Dec. 10, 2008

(86) PCT No.: PCT/JP2008/072402
§ 371 (c)(1),
(2), (4) Date: Jul. 28, 2009

(87) PCT Pub. No.: WO2009/081732
PCT Pub. Date: Jul. 2, 2009

(65) Prior Publication Data
US 2010/0135635 A1 Jun. 3, 2010

(30) Foreign Application Priority Data
Dec. 26, 2007 (JP) .................................. 2007-335344

(51) Int. Cl.
*G11B 27/00* (2006.01)
(52) U.S. Cl.
USPC ......................................................... 386/280
(58) Field of Classification Search
None
See application file for complete search history.

(56) References Cited

U.S. PATENT DOCUMENTS

| 5,469,274 | A | 11/1995 | Iwasaki et al. |
| 5,649,032 | A | 7/1997 | Burt et al. |
| 5,657,402 | A | 8/1997 | Bender et al. |
| 5,706,416 | A | 1/1998 | Mann et al. |

(Continued)

FOREIGN PATENT DOCUMENTS

| JP | 5 260264 | 10/1993 |
| JP | 9 62861 | 3/1997 |

(Continued)

OTHER PUBLICATIONS

Partial European Search Report issued Oct. 28, 2011 in patent application No. 08865920.6.

(Continued)

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

An image processing apparatus includes moving image storage means for storing a taken moving image and conversion information storage means for storing, for each second taken image located after a first taken image, conversion information. The image processing apparatus further includes image holding means for holding a log image including each taken image located before the second taken image and feature quantity extraction means for extracting a feature quantity. The image processing apparatus also includes image conversion means for converting the second taken image, decision means for determining whether or not synthesis of the second taken image and the log image is necessary, and image synthesis means for, if the synthesis of the second taken image and the log image is determined necessary, synthesizing the converted second taken image with the log image.

18 Claims, 48 Drawing Sheets

(56) References Cited

U.S. PATENT DOCUMENTS

| | | |
|---|---|---|
| 5,920,657 A | 7/1999 | Bender et al. |
| 5,999,662 A | 12/1999 | Burt et al. |
| 6,393,163 B1 | 5/2002 | Burt et al. |
| 6,895,126 B2 | 5/2005 | Di Bernardo et al. |
| 7,327,494 B2 | 2/2008 | Aiso |
| 2004/0150657 A1 | 8/2004 | Wittenburg et al. |
| 2006/0109283 A1 | 5/2006 | Shipman et al. |
| 2007/0008499 A1 | 1/2007 | Iketani et al. |
| 2007/0103544 A1 | 5/2007 | Nakazawa |

FOREIGN PATENT DOCUMENTS

| | | |
|---|---|---|
| JP | 11 120353 | 4/1999 |
| JP | 11 134352 | 5/1999 |
| JP | 11 289517 | 10/1999 |
| JP | 2002 359798 | 12/2002 |
| JP | 2004 222025 | 8/2004 |
| JP | 2004 266670 | 9/2004 |
| JP | 2005 217874 | 8/2005 |
| JP | 2007 183588 | 7/2007 |
| WO | WO 98/21688 | 5/1998 |
| WO | WO 03/084249 A1 | 10/2003 |
| WO | 2005 024723 | 3/2005 |
| WO | 2005 032125 | 4/2005 |
| YE | WO9821688 * | 5/1998 |

OTHER PUBLICATIONS

Janhao Meng, et al., "Scene Change Detection in a MPEG Compressed Video Sequence", Proceedings of the SPIE, The International Society for Optical Engineering SPIE, vol. 2419, XP000670965, Feb. 7, 1995, pp. 14-25.

HongJiang Zhang, et al., "Automatic Partitioning of Full-motion Video", Multimedia Systems, vol. 1, No. 1, XP000572496, Jan. 1, 1993, pp. 10-28.

U.S. Appl. No. 12/524,887, filed Jul. 29, 2009, Tsurumi.
U.S. Appl. No. 12/526,058, filed Aug. 6, 2009, Tsurumi.
U.S. Appl. No. 12/524,734, filed Jul. 28, 2009, Tsurumi.
U.S. Appl. No. 12/524,757, filed Jul. 28, 2009, Tsurumi.
U.S. Appl. No. 12/524,383, filed Jul. 24, 2009, Wang et al.
U.S. Appl. No. 12/565,499, filed Sep. 23, 2009, Tsurumi.
U.S. Appl. No. 13/486,209, filed Jun. 1, 2012, Tsurumi.

* cited by examiner

FIG. 5
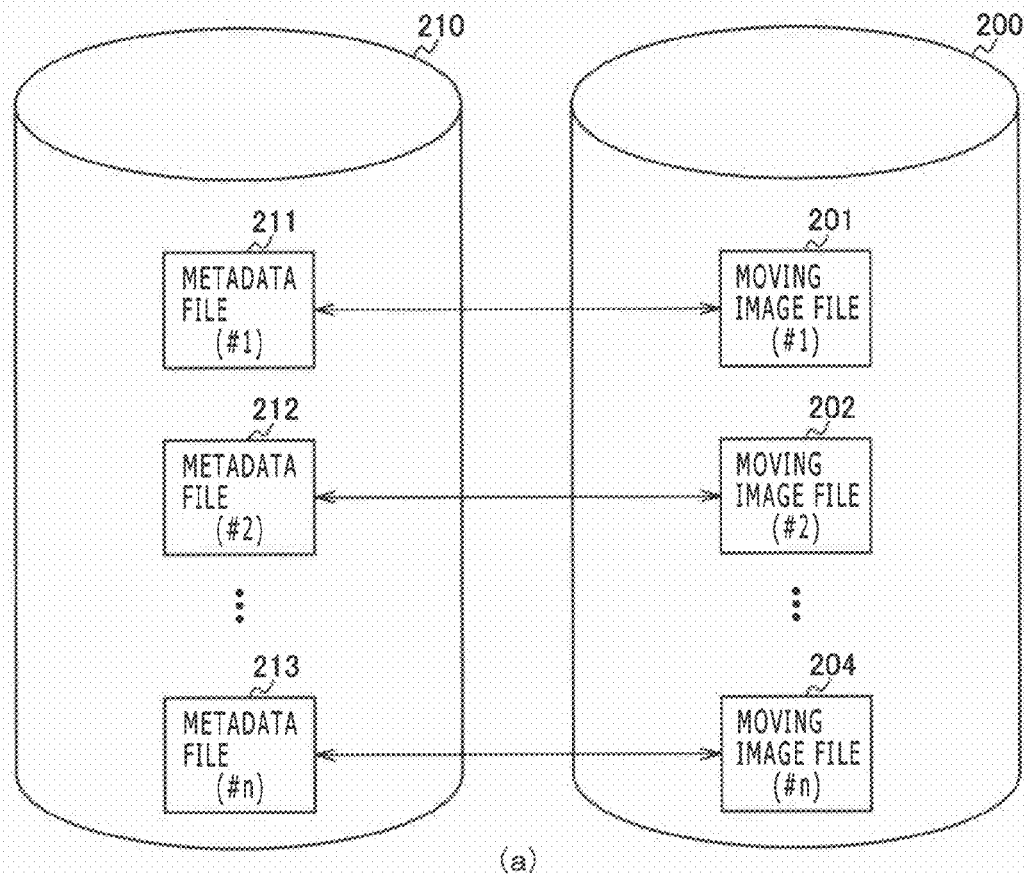
(a)
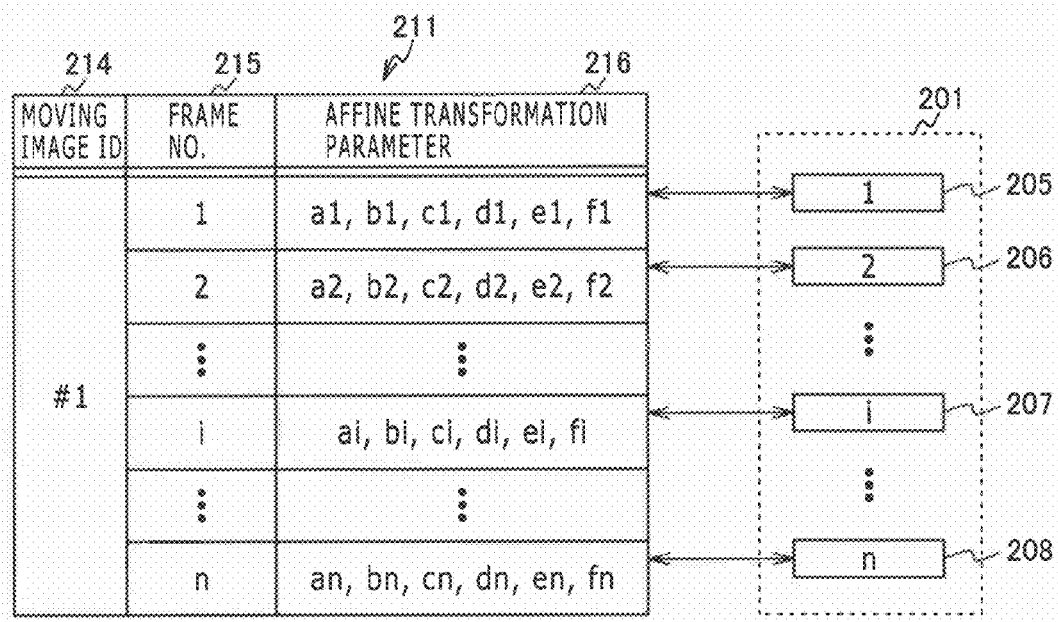
(b)

FIG. 6
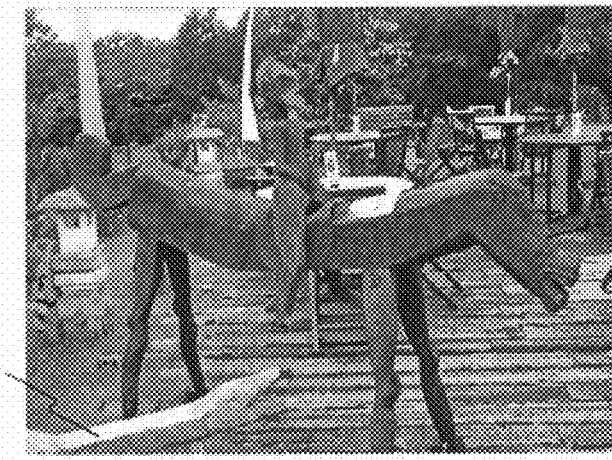
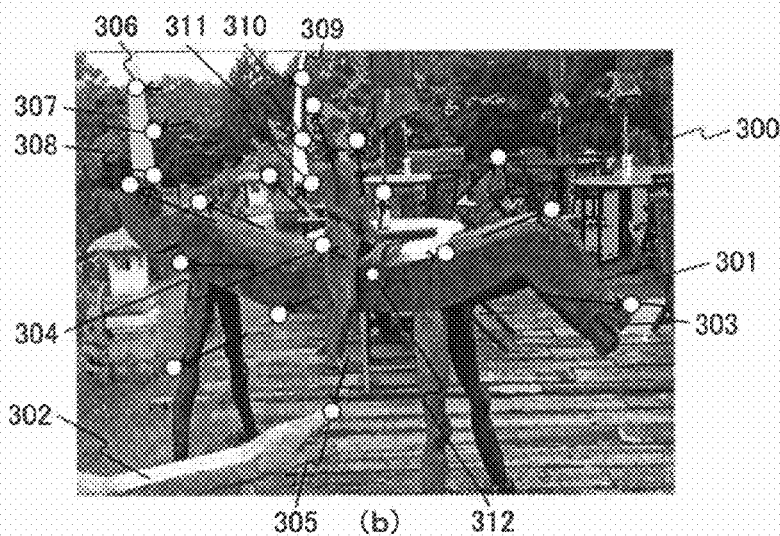
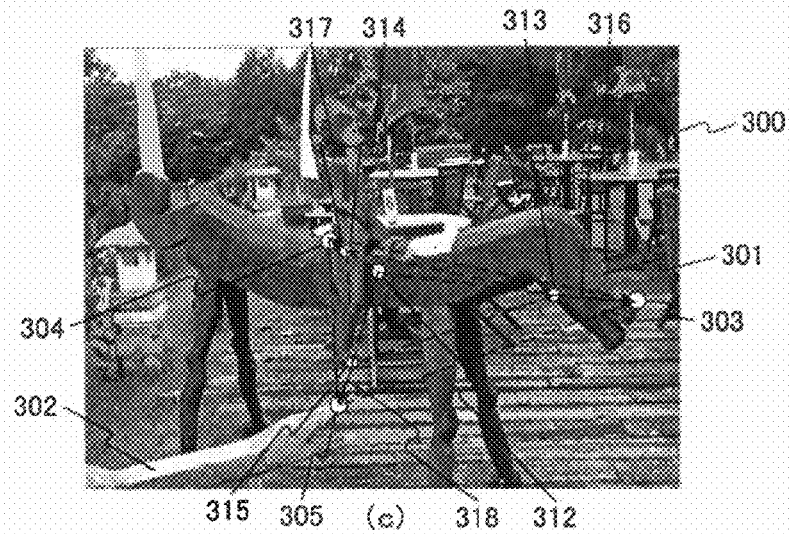

FIG.7
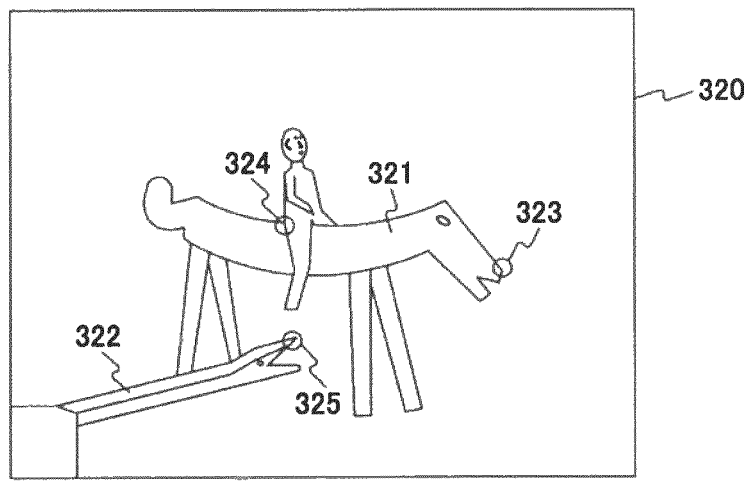
(a)
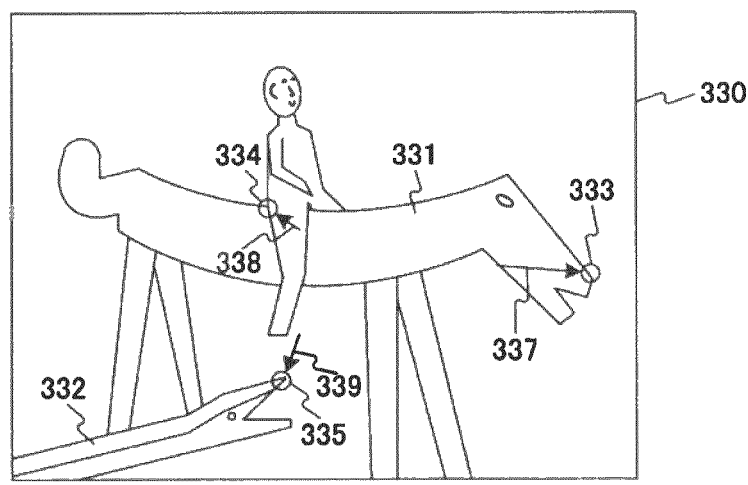
(b)
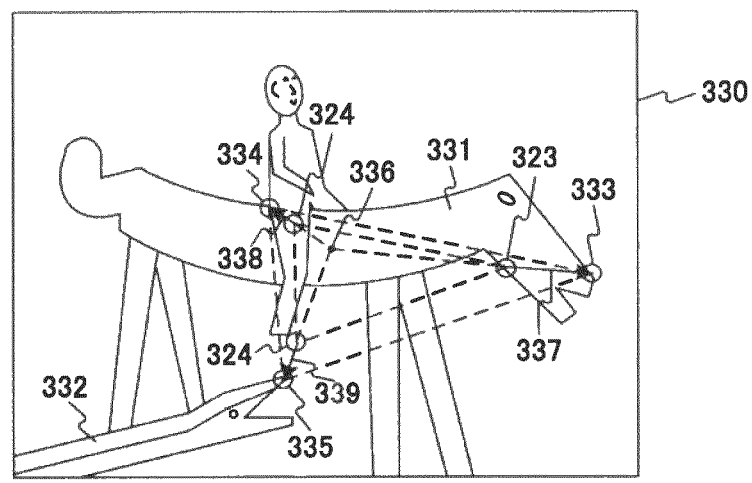
(c)

FIG.10
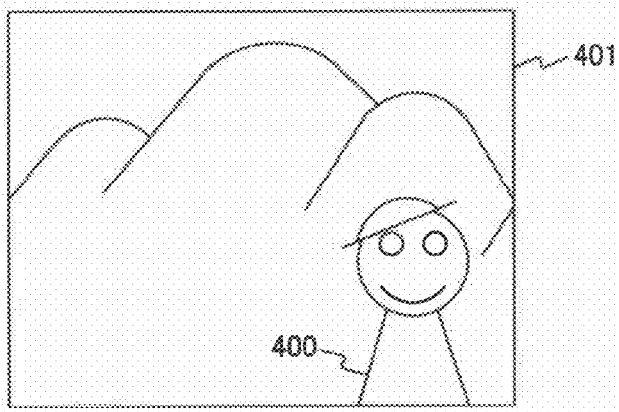
(a)
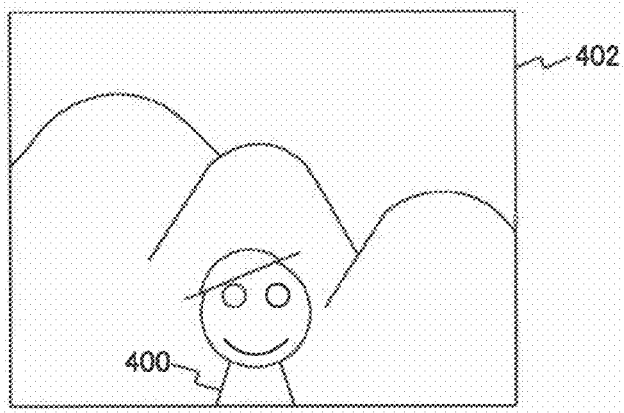
(b)
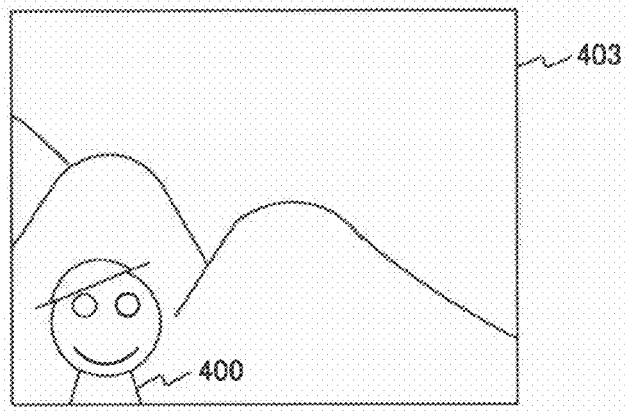
(c)

FIG.11
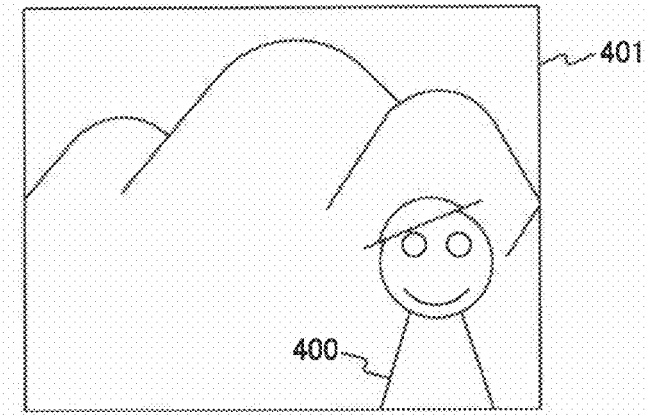
(a)
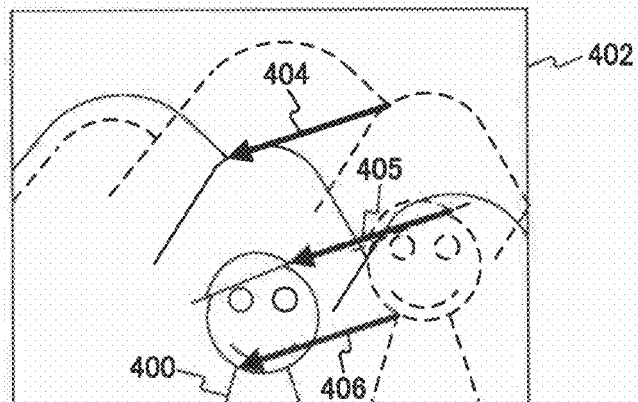
(b)
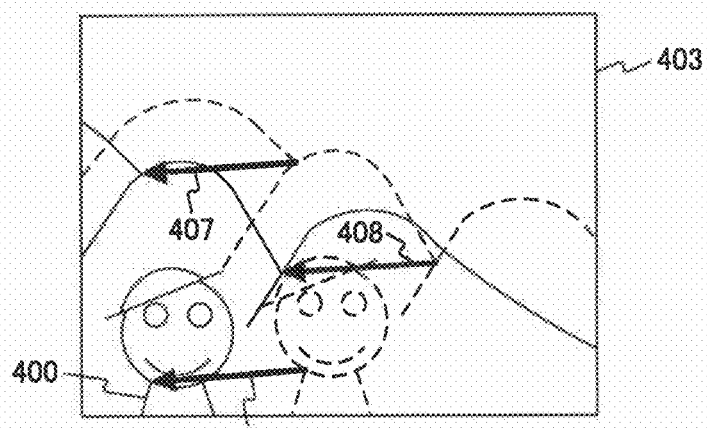
(c)

FIG.13
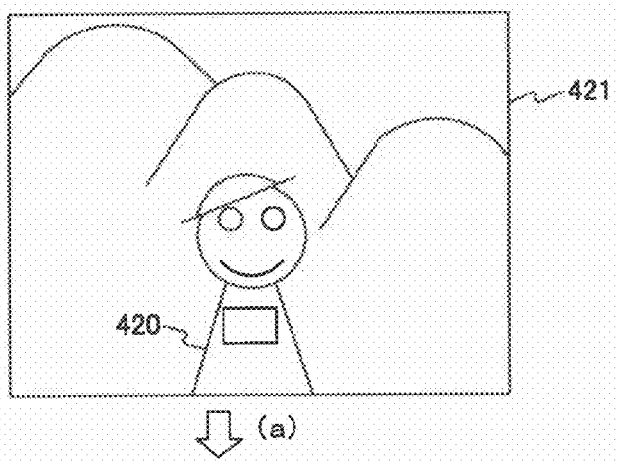
(a)
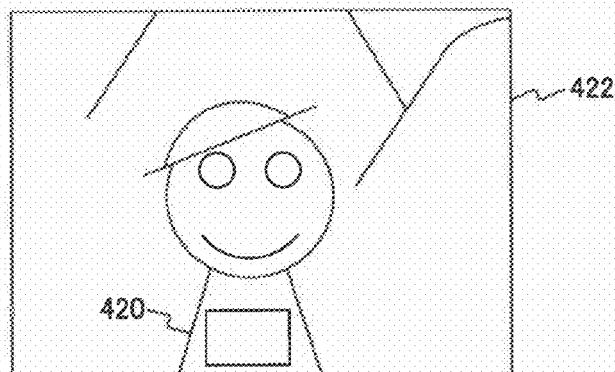
(b)
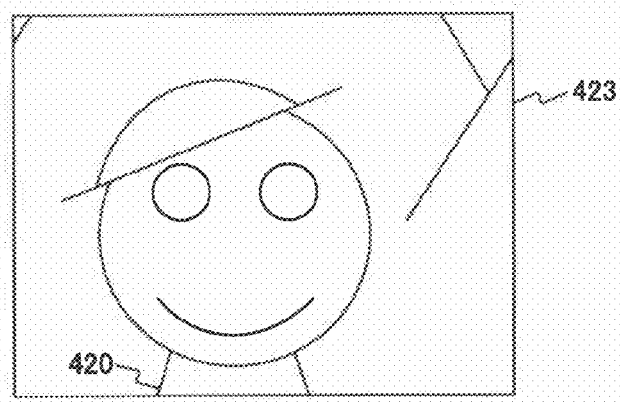
(c)

FIG.16
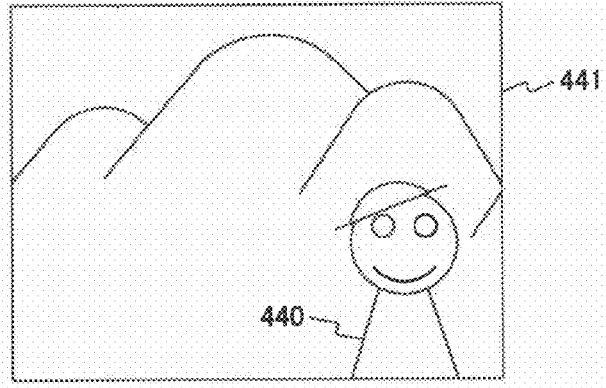
(a)
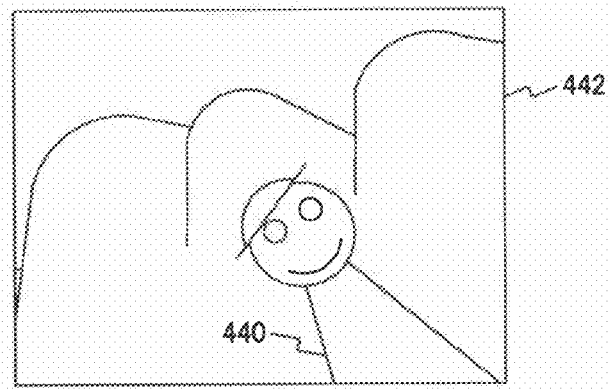
(b)
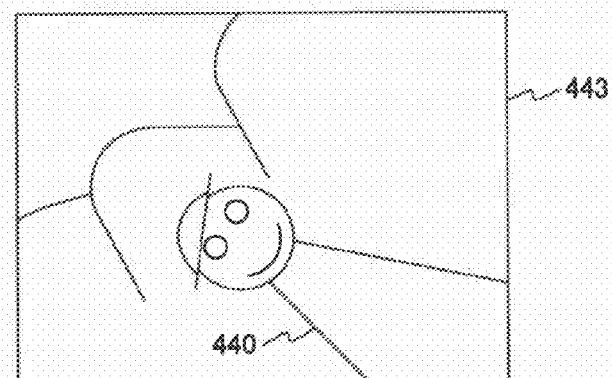
(c)

FIG.21
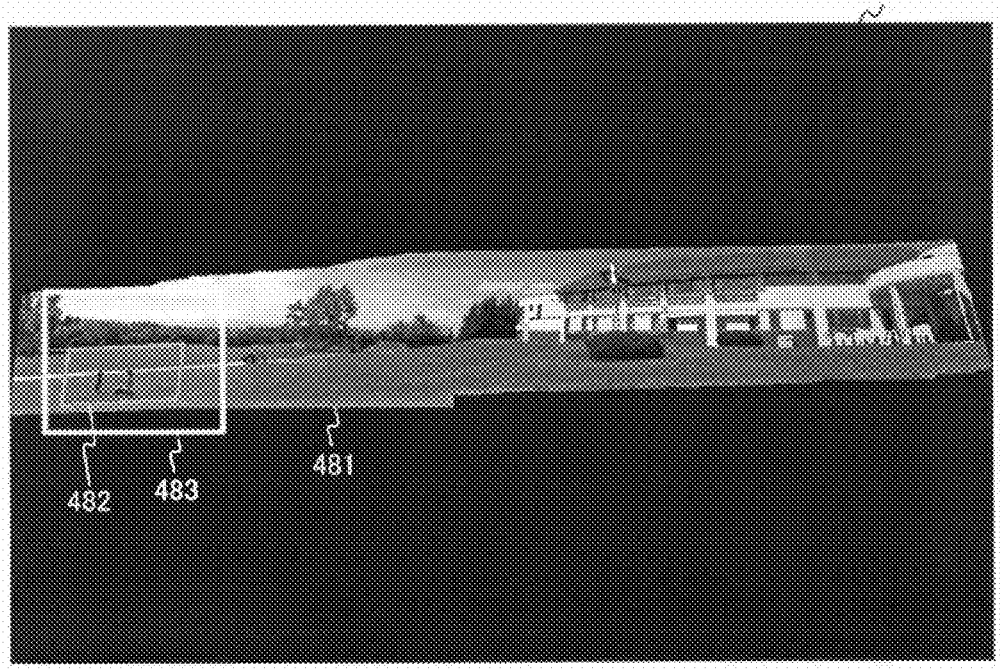
(a)
(b)

FIG.22
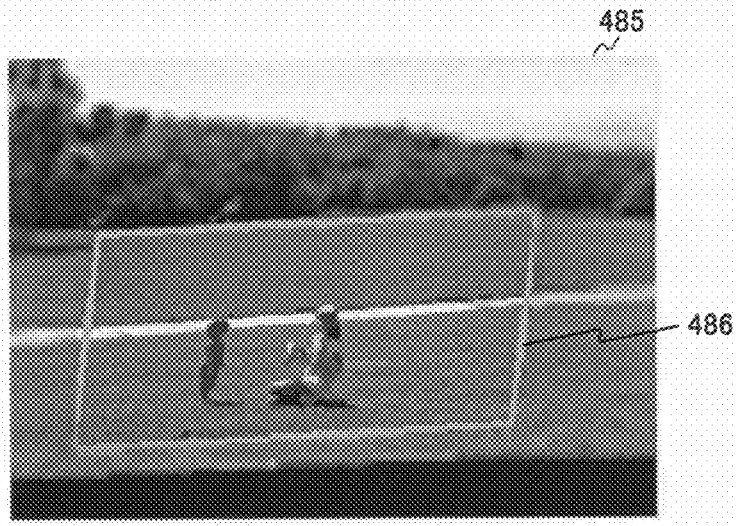
(a)
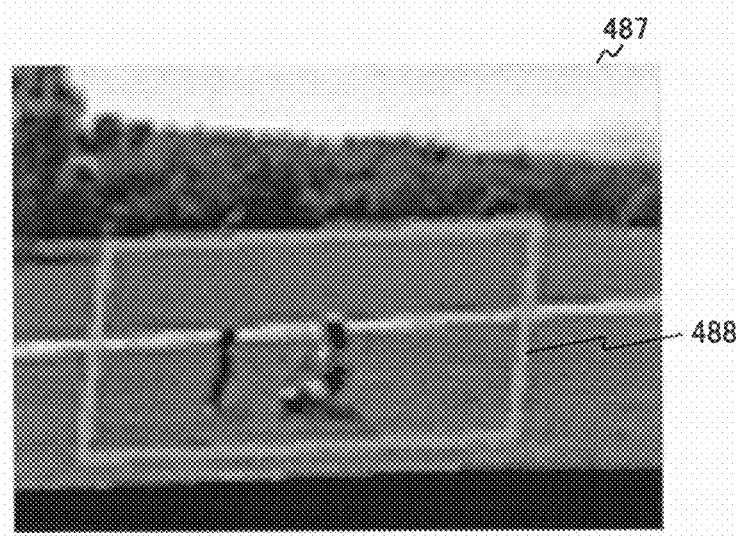
(b)

FIG. 23
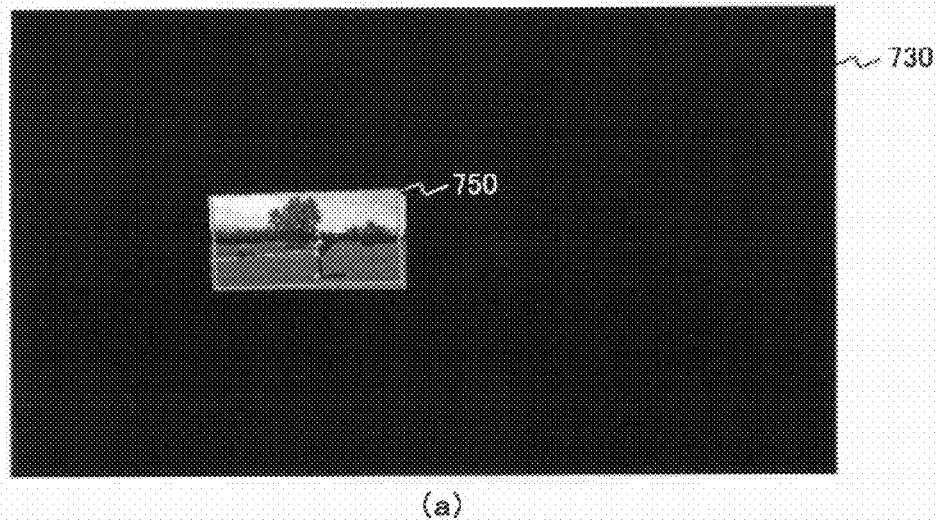
(a)
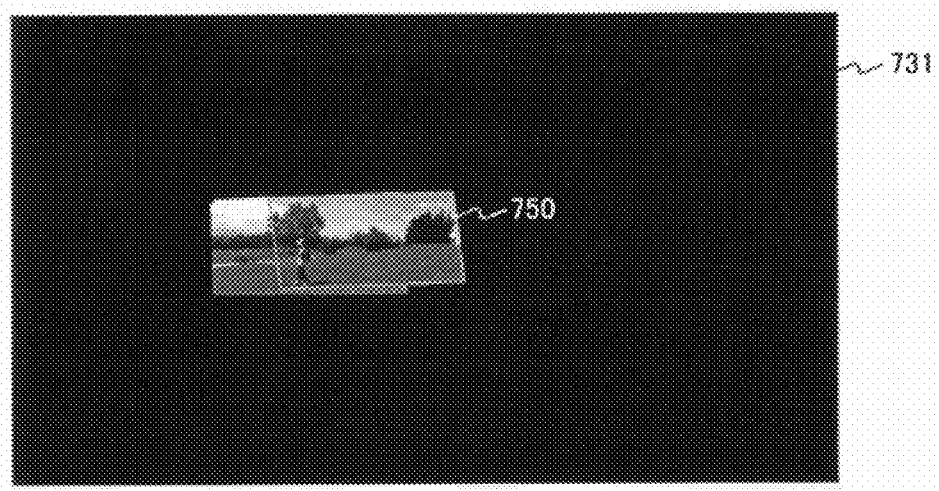
(b)
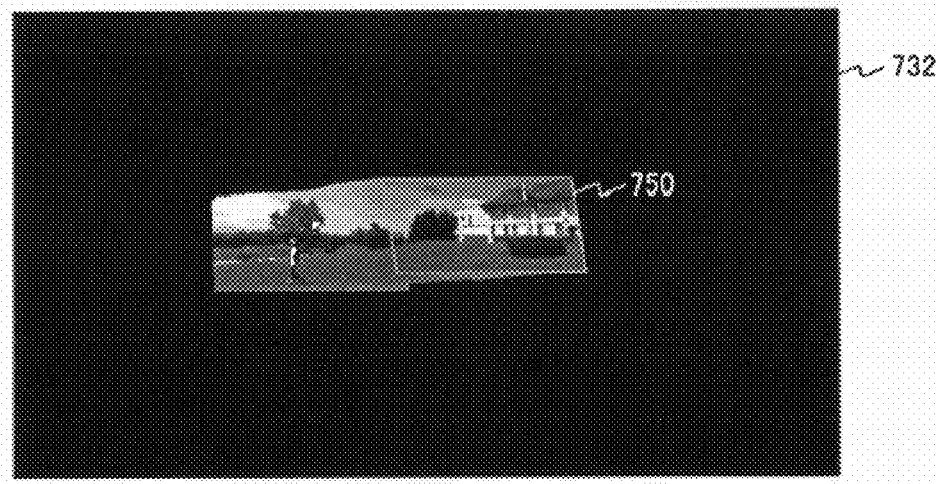
(c)

FIG.24
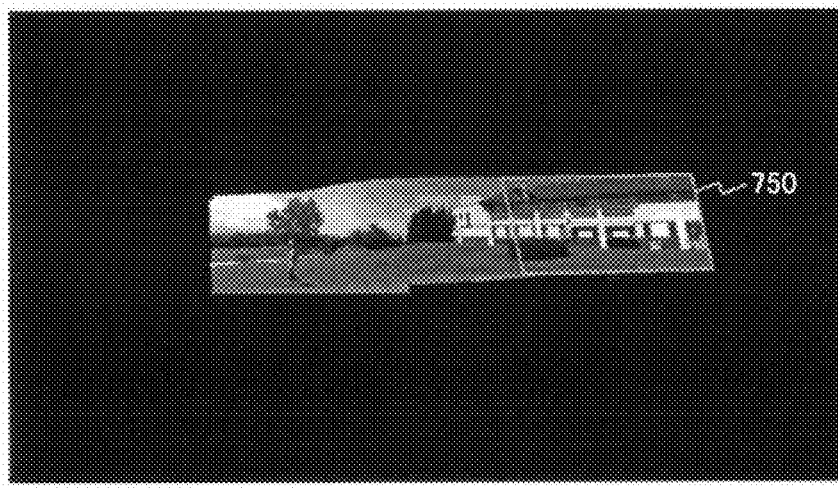
(a)
(b)
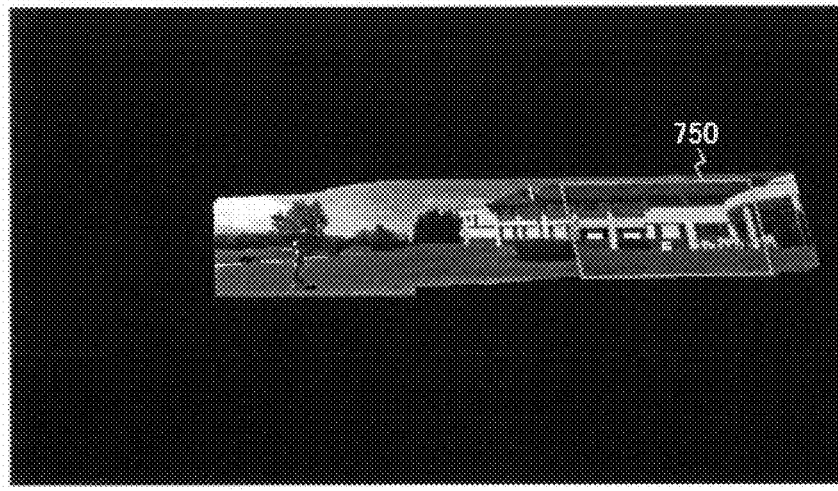
(c)

FIG.25
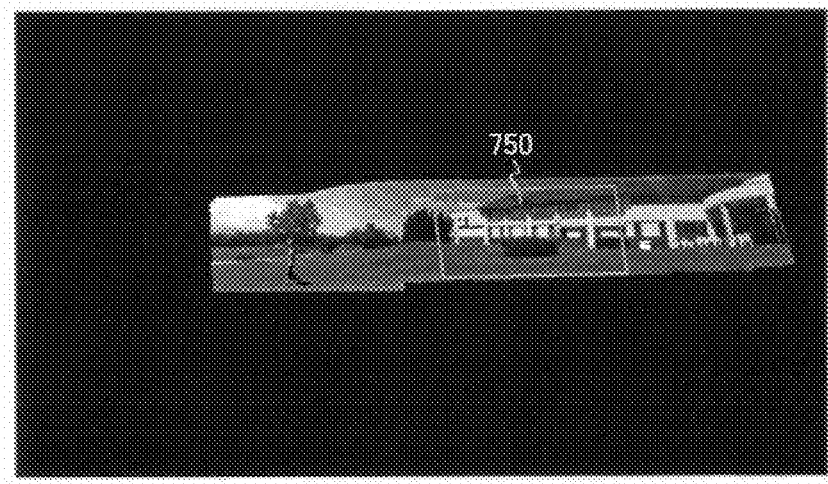
(a)
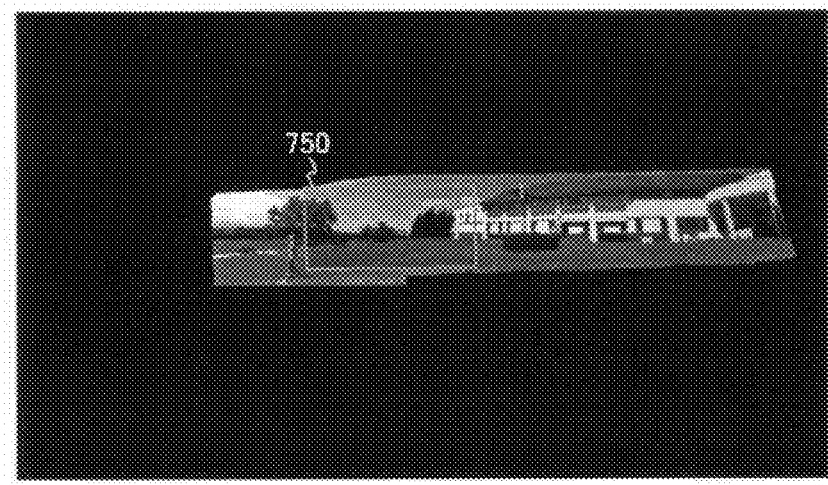
(b)
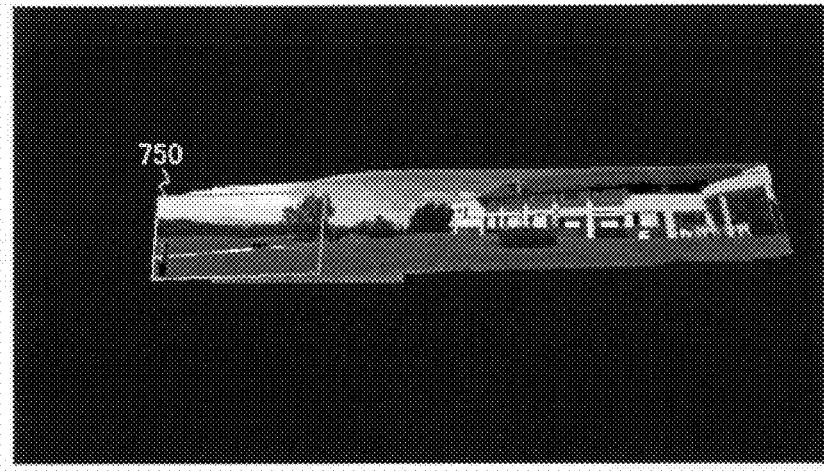
(c)

FIG.26
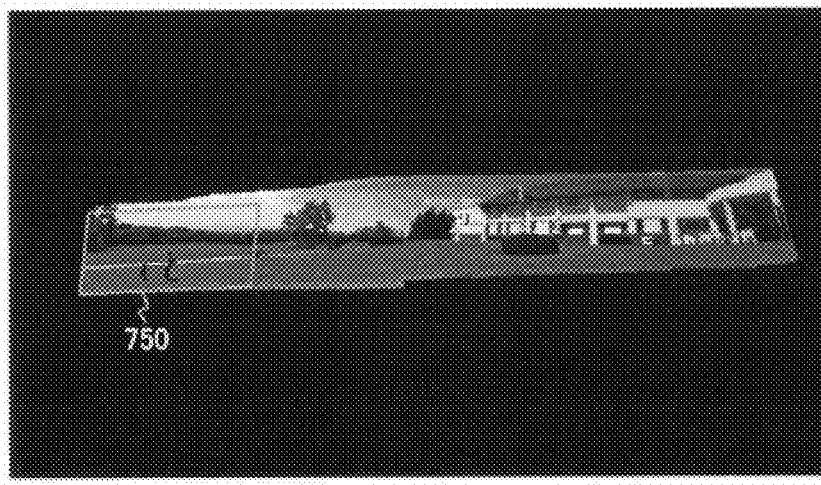
(a)
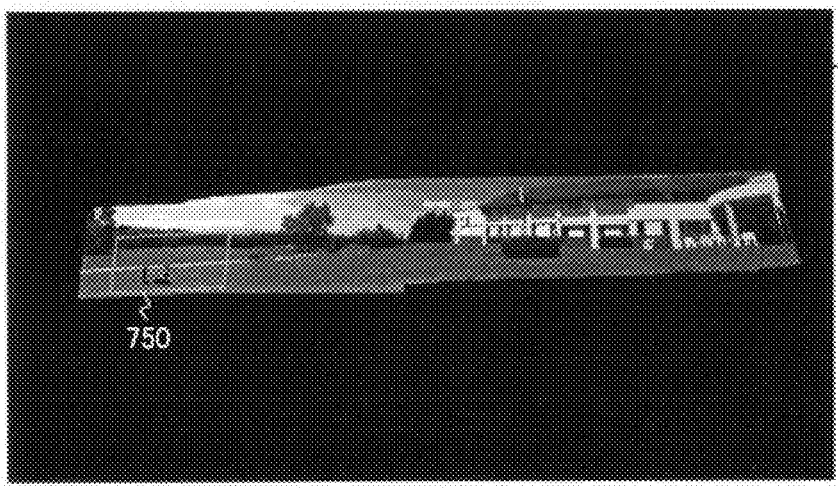
(b)
(c)

FIG. 27
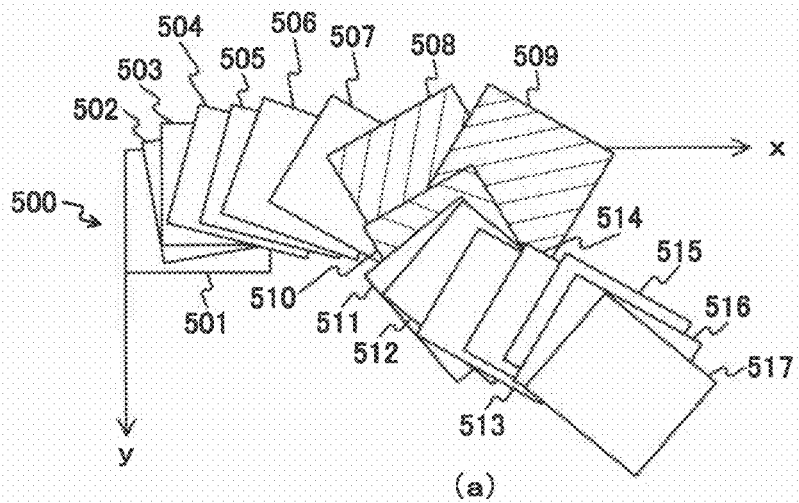
(a)
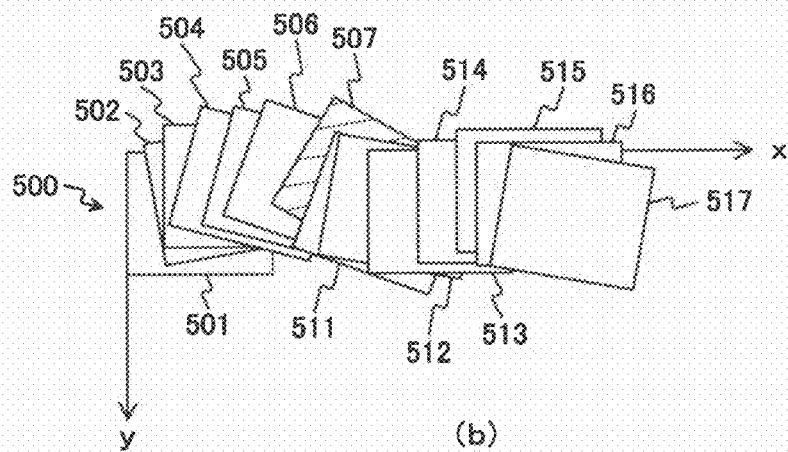
(b)
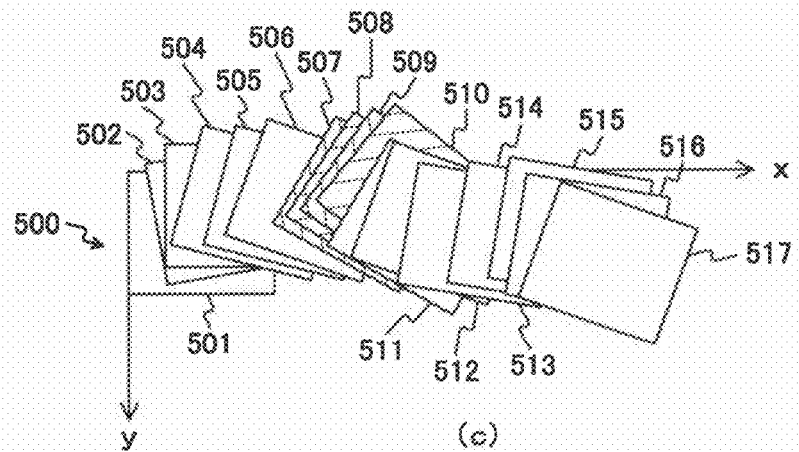
(c)

FIG.31
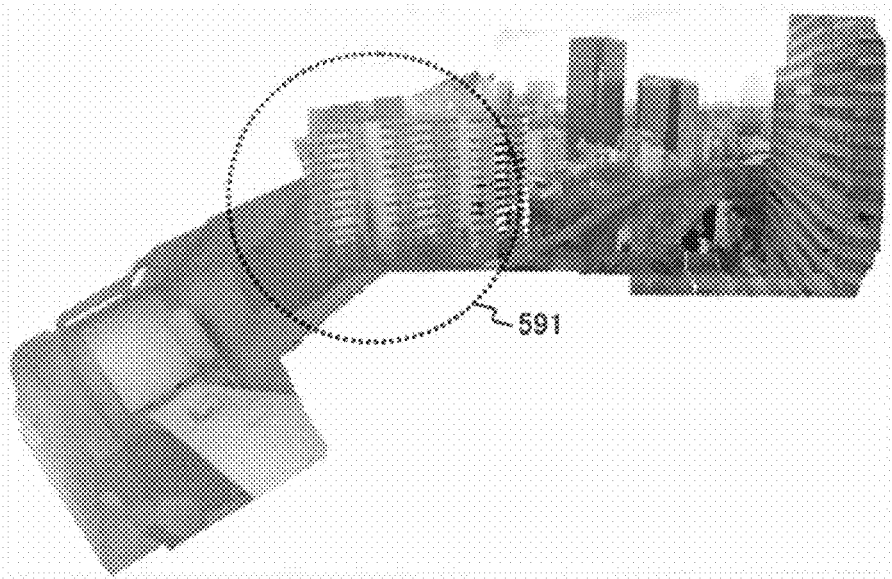
(a)
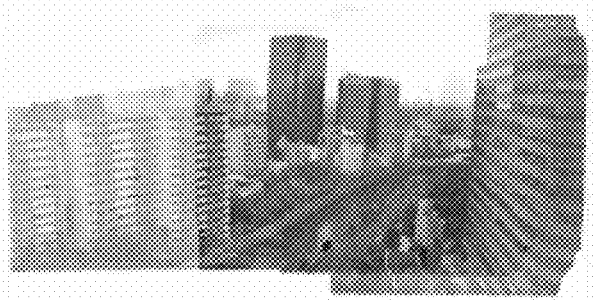
(b)
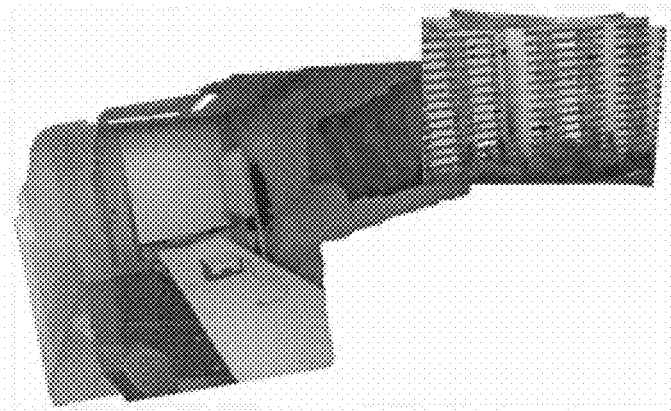
(c)

FIG.32
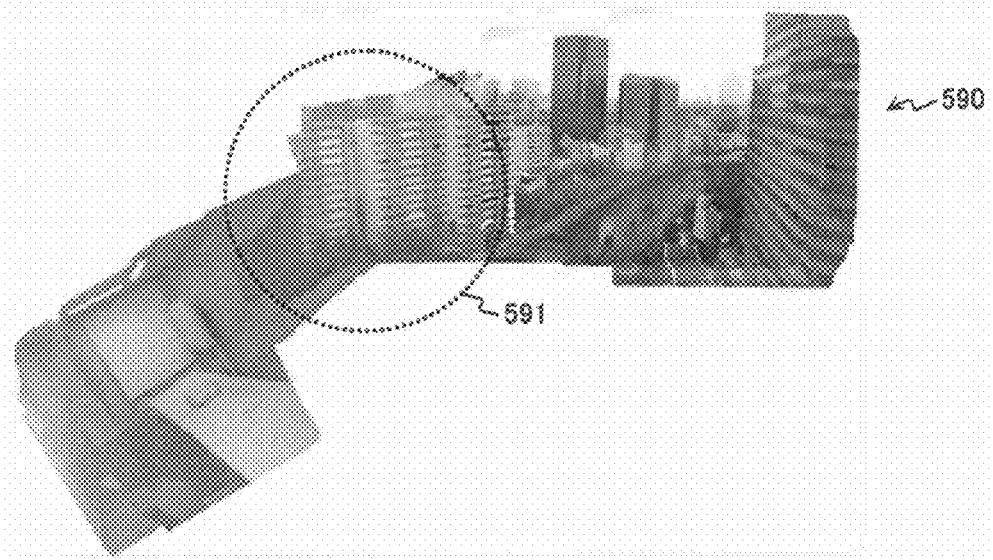
(a)
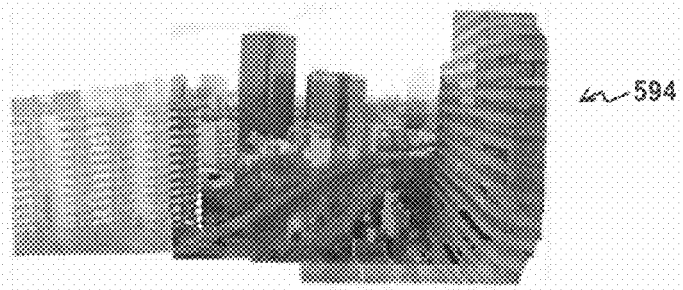
(b)
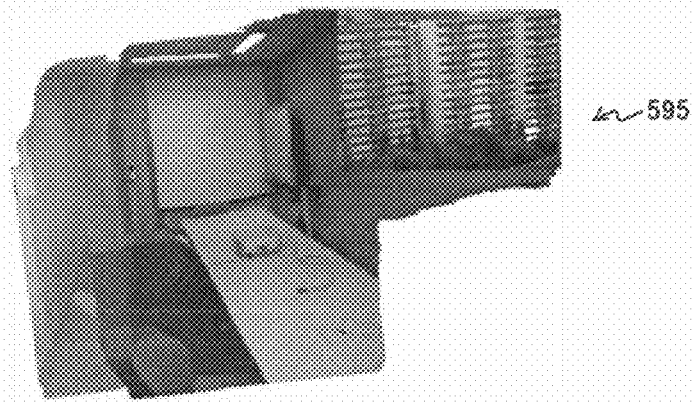
(c)

⇓ SIMD OPERATION 827    828    829

[A1]        [B1]        [C1]
[A2]   +    [B2]   =    [C2]
[A3]        [B3]        [C3]
[A4]        [B4]        [C4]

(b)

FIG.43
OUTPUT OF RESULT

FIG.46

VECTOR A = ( -1 × [0,1,2,3] (841) + 0 × [1,2,3,4] (842) + 1 × [2,3,4,5] (843) )

VECTOR B = ( -2 × [32,33,34,35] (844) + 0 × [33,34,35,36] (845) + 2 × [34,35,36,37] (846) )

VECTOR C = ( -1 × [64,65,66,67] (847) + 0 × [65,66,67,68] (848) + 1 × [66,67,68,69] (849) )

VECTOR D = ( VECTOR A + VECTOR B ) + VECTOR C

IMAGE PROCESSING APPARATUS, MOVING IMAGE REPRODUCING APPARATUS, AND PROCESSING METHOD AND PROGRAM THEREFOR

TECHNICAL FIELD

The present invention relates to an image processing apparatus and, more particularly, to an image processing apparatus, a moving image reproducing apparatus, and a processing method therein and a program for making a computer execute this processing method.

BACKGROUND ART

Recently, digital video cameras have been gaining popularity. Therefore, for example, taking of events of kindergartens with digital video cameras by parents for example is now common scene. If video taking is done by parents for example in such events, the parent often take their children mostly and, at the same time, in order to describe the events in detail, often take the scenes themselves of such events appropriately.

The moving images thus taken may be reproduced by use of a moving image reproducing apparatus in home, for example. For example, in viewing moving images taken with one's child focused, moving images in which own child is mainly included are reproduced. However, if a reproduction time is long, continuously viewing a moving image of the same subject may lower the interest of a viewer in the moving image being reproduced as the reproduction time goes by. Therefore, in order to enhance viewing interest, a method is proposed in which other images and so on associated with a currently displayed image are displayed.

For example, an image display method is proposed in which a video index (a still image) is displayed in scroll in accordance with the progress of a moving image (for example, Japanese Patent Laid-open No Hei 11-289517 (FIG. 7)).

According to the above-mentioned prior-art technology, still images of the past, the present, and the future relative to a moving image are displayed as a video index, so that the still images of the past, the present, and the future may be viewed along with a moving image currently displayed. Hence, for example, in viewing a moving image taken at an event carried out by the kindergarten of one's child, if one's child is displayed as the current moving image, the scene and the like of that event associated with the current moving image may be displayed as a past or future still image. In this case, the scene and the like of that event can be viewed while viewing the image of one's child, the contents of that event can easily be understood, thereby enhancing the interest of viewers.

However, in the above-mentioned prior-art technology, in the case where one's child is displayed as the current moving image, the scenes and so on of that event may not be displayed as the past or future still image, thereby displaying approximately the same contents of those of the current moving image. In such a case, it is required to maintain the viewers' interest in moving images.

So, a method is proposed in which, in order to allow, while viewing a central figure and so on subject to image taking, the appropriate understanding of situations around this central figure, each image configuring that moving image is converted on the basis of the moving information of an image taking apparatus and the converted images are sequentially synthesized for reproduction. However, if an image taking person quickly moves the image taking apparatus in the left and right directions for example, proper move information may not be detected. Also, for example, if an image taking person stops recording a taken image and then restarts recording a different scene, proper move information may not be detected before and after a scene change.

Thus, if proper move information of each image configuring that moving image cannot be detected, for example, synthesized images indicative of that moving image may not be displayed properly. It is therefore important to properly display synthesized images during the reproduction of a moving image to easily understand the contents of that moving image.

An object of the present invention is to provide, in viewing a moving image taken by an image taking apparatus, the easy understanding of the contents of that moving image.

DISCLOSURE OF INVENTION

In carrying out the invention and according to a first embodiment thereof, there are provided an image processing apparatus, a processing method thereof, and a program for making a computer execute this processing method, including: moving image storage means for storing a taken moving image taken by an image taking apparatus; conversion information storage means for storing, for each second taken image, conversion information for converting the above-mentioned second taken image located after a first taken image in time axis of the above-mentioned taken moving image with reference to the above-mentioned first image configuring the above-mentioned taken moving image; image holding means for holding a log image including each taken image located before the above-mentioned second taken image in the above-mentioned time axis; feature quantity extraction means for extracting a feature quantity associated with the above-mentioned second taken image; image conversion means for converting the above-mentioned second taken image on the basis of the above-mentioned conversion information; decision means for determining whether synthesis of the above-mentioned second taken image and the above-mentioned log image is necessary or not on the basis of the above-mentioned extracted feature amount; and image synthesis means for, if the synthesis of the above-mentioned second taken image and the above-mentioned log image is determined necessary by the above-mentioned decision means, synthesizing the above-mentioned converted second taken image with the above-mentioned log image held in the above-mentioned image holding means holding the synthesized image in the above-mentioned image holding means as a new log image and, if the synthesis of the above-mentioned second taken image and the above-mentioned log image is determined unnecessary by the above-mentioned decision means, holding the above-mentioned second taken image in the above-mentioned image holding means without synthesizing the above-mentioned second taken image with the above-mentioned log image held in the above-mentioned image holding means. Consequently, a function is provided that a feature quantity associated with a second taken image is extracted, the second taken image is converted on the basis of conversion information, synthesis of the second taken image and a log image is determined on the basis of the feature quantity, and, if the synthesis of the second taken image and the log information is determined to be executed, the converted second taken image is synthesized with the log image to provide a new log image, and, if the synthesis of the second taken image and the log image is determined not to be executed, the second taken image is not synthesized with the log image, the second taken image being held in the image holding means.

Also, in this first embodiment, if the synthesis of the above-mentioned second taken image and the above-mentioned log image is determined not to be executed by the above-mentioned decision means, the above-mentioned image synthesis means may erase the above-mentioned log image held in the above-mentioned image holding means and hold the above-mentioned second taken image in the above-mentioned image holding means as a new log image. Consequently, if the second taken image and the log image are determined not to be synthesized, the log image is erased and the second taken image is held in the image holding means as a new log image.

Also, in this first embodiment, if the synthesis of the above-mentioned second taken image and the above-mentioned log image is determined not to be executed by the above-mentioned decision means, the above-mentioned image synthesis means may arrange the above-mentioned second taken image at a position different from an arrangement position of the above-mentioned log image in the above-mentioned image holding means and hold the above-mentioned second taken image in the above-mentioned image holding means as new log image. Consequently, a function is provided that, if the second taken image and the log image are determined not to be synthesized, the second taken image is arranged at a position different from the arrangement position of the log image to provide a new log image.

Also, in this first embodiment, the above-mentioned feature amount extraction means may extract a feature amount by detecting a certain change in each image configuring the above-mentioned taken image and the above-mentioned decision means may determine whether the above-mentioned second taken image corresponds to a scene change point by comparing the above-mentioned extracted feature amount with a predetermined threshold value and, if the above-mentioned second taken image is found corresponding to the above-mentioned scene change point, determine that the above-mentioned second taken image and the above-mentioned log image are not synthesized together. Consequently, a function is provided that a feature quantity is extracted by detecting a certain change in each image configuring a moving image and whether the second taken image corresponds to the scene change point or not is determined by comparing this extracted feature quantity with a predetermined threshold value and, if the second taken image is found corresponding to the scene change point, the second taken image and the log image are determined not to be synthesized.

Also, in this first embodiment, the above-mentioned conversion information may include elements associated with zoom-in/zoom-out, translation, and rotation, the above-mentioned feature quantity extraction means may extract a translation component, a rotation component, and a zoom-in/zoom-out component on the basis of the above-mentioned conversion information associated with the above-mentioned second taken image, and the above-mentioned decision means may determine whether the above-mentioned synthesis is necessary by comparing at least one of the above-mentioned extracted the above-mentioned translation component, the above-mentioned rotation component, and the above-mentioned zoom-in/zoom-out component with a predetermined threshold value. Consequently, a function is provided that s translation component, a rotation component, and a zoom-in/zoom-out component are extracted on the basis of the conversion information associated with the second taken image and at least one of these extracted translation component, rotation component, and zoom-in/zoom-out component is compared with a predetermined threshold value to determine whether the synthesis is necessary or not.

Also, in this first embodiment, the above-mentioned feature quantity extraction means may extract translation components, rotation components, and zoom-in/zoom-out components on the basis of conversion information associated with each taken image from taken images located a predetermined number before the above-mentioned second taken image in the above-mentioned time axis up to the above-mentioned second taken image and compute an average value of each of the above-mentioned extracted translation components, the above-mentioned rotation components, and the above-mentioned zoom-in/zoom-out components, and the above-mentioned decision means may determine whether the above-mentioned synthesis is necessary by comparing at least one of the above-mentioned computed average values of translation components, rotation components, and zoom-in/zoom-out components with a predetermined threshold value. Consequently, a function is provided that translation components, rotation components, and zoom-in/zoom-out components are extracted on the basis of conversion information associated with each taken image from taken images located a predetermined number before the above-mentioned second taken image in the above-mentioned time axis up to the above-mentioned second taken image, average values of these extracted translation components, rotation components, and zoom-in/zoom-out components are computed respectively, and at least one of the computed average values of these extracted translation components, rotation components, and zoom-in/zoom-out components is compared with a predetermined threshold value to determine whether the synthesis is necessary or not.

Also, in this first embodiment, the above-mentioned feature quantity extraction means may extract translation components, rotation components, and zoom-in/zoom-out components on the basis of conversion information associated with each taken image from taken images located a predetermined number before the above-mentioned second taken image in the above-mentioned space axis up to the above-mentioned second taken image and compute an integrated value of each of the above-mentioned extracted translation components, the above-mentioned rotation components, and the above-mentioned zoom-in/zoom-out components, and the above-mentioned decision means may determine whether the above-mentioned synthesis is necessary by comparing at least one of the above-mentioned computed integrated values of translation components, rotation components, and zoom-in/zoom-out components with a predetermined threshold value. Consequently, a function is provided that translation components, rotation components, and zoom-in/zoom-out components are extracted on the basis of conversion information associated with each taken image from taken images located a predetermined number before the above-mentioned second taken image in the above-mentioned time axis up to the above-mentioned second taken image, integrated values of these extracted translation components, rotation components, and zoom-in/zoom-out components are computed respectively, and at least one of the computed integrated values of translation components, rotation components, and zoom-in/zoom-out components is compared with a predetermined threshold value to determine whether the synthesis is necessary or not.

In carrying out the invention and according to a second embodiment thereof, there are provided an image processing apparatus, a processing method thereof, and a program for making a computer execute this method, including: moving image storage means for storing a taken moving image taken by an image taking apparatus; conversion information storage means for storing, for each second taken image, conversion information for converting the above-mentioned second taken image located after a first taken image in time axis of the above-mentioned taken moving image with reference to the above-mentioned first taken image configuring the above-mentioned taken moving image; image holding means for holding a log image including each taken image located before the above-mentioned second taken image in the above-mentioned time axis; decision means for determining whether synthesis of the above-mentioned second taken image and the above-mentioned log image is necessary on the basis of an elapsed time from the holding of the above-mentioned log image in the above-mentioned image holding means; image conversion means for converting the above-mentioned second taken image on the basis of the above-mentioned conversion information; and image synthesis means for, if the synthesis of the above-mentioned second taken image and the above-mentioned log image is determined necessary by the above-mentioned decision means, synthesizing the above-mentioned converted second taken image with the above-mentioned log image held in the above-mentioned image holding means holding the synthesized image in the above-mentioned image holding means as a new log image and, if the synthesis of the above-mentioned second taken image and the above-mentioned log image is determined unnecessary by the above-mentioned decision means, holding the above-mentioned second taken image in the above-mentioned image holding means without synthesizing the above-mentioned second taken image with the above-mentioned log image held in the above-mentioned image holding means. Consequently, a function is provided that it is determined whether the synthesis of the second taken image and the log image is necessary or not on the basis of an elapsed time from the holding of the log image in the image holding means, and second taken image is converted on the basis of conversion information, and, if the synthesis of the second taken image and the log image is determined necessary, the converted second taken image is synthesized with the log image to provide a new log image and, if the synthesis of the second taken image and the log image is determined not necessary, the second taken image is held in the image holding means without synthesizing the second taken image with the log image.

In carrying out the invention and according to a third embodiment thereof, there are provided an image processing apparatus, a processing method thereof, and a program for making a computer execute this processing method, including: moving image storage means for storing a taken moving image taken by an image taking apparatus; conversion information storage means for storing, for each second taken image, conversion information for converting the above-mentioned second taken image located after a first taken image in time axis of the above-mentioned taken moving image with reference to the above-mentioned first image configuring the above-mentioned taken moving image; image holding means for holding a log image including each taken image located before the above-mentioned second taken image in the above-mentioned time axis; feature quantity extraction means for extracting a feature quantity associated with the above-mentioned second taken image; conversion information correction means for correcting the above-mentioned conversion information on the basis of the above-mentioned extracted feature quantity; image conversion means for converting the above-mentioned second taken image on the basis of the above-mentioned corrected the above-mentioned conversion information; and image synthesis means for synthesizing the above-mentioned converted second taken image with the above-mentioned log image held in the above-mentioned image holding means and holding the synthesized image in the above-mentioned image holding means as a new log image. Consequently, a function is provided that a feature quantity associated with the second taken image is extracted, the conversion information is corrected on the basis of this extracted feature quantity, the second taken image is converted on the basis of this corrected conversion information, and the converted second taken image is synthesized with the log image to be held in the image holding means as a new log image.

Also, in this third embodiment, the above-mentioned conversion information correction means may determine whether correction of the above-mentioned conversion information is necessary by comparing the above-mentioned extracted feature quantity with a predetermined threshold value and, if the correction of the above-mentioned conversion information is found necessary, may correct the above-mentioned conversion information and the above-mentioned image conversion means may convert the above-mentioned second taken image on the basis of the above-mentioned corrected conversion information if the above-mentioned conversion information has been corrected and, if the above-mentioned conversion information has not been corrected, may convert the above-mentioned second taken image on the basis of the above-mentioned conversion information. Consequently, a function is provided that, by comparing the extracted feature quantity with a predetermined threshold value, it is determined whether the correction of conversion information is necessary or not, and, if the correction of conversion information is determined necessary, the conversion information is corrected and, if the conversion information is corrected, the second taken image is converted on the basis of this corrected conversion information, and, if the conversion information is not corrected, the second taken image is converted on the basis of the conversion information.

Also, in this third embodiment, if correction of the above-mentioned conversion information is found necessary, the above-mentioned conversion information correction means may correct the above-mentioned conversion information to predetermined conversion information. Consequently, a function is provided that, if the correction of conversion information is determined necessary, the conversion information is corrected to predetermined conversion information.

Also, in this third embodiment, if the correction of the above-mentioned conversion information is found necessary, the above-mentioned conversion information correction means may correct the above-mentioned conversion information on the basis of conversion information associated with a taken image located before the above-mentioned second taken image in the above-mentioned time axis and conversion information associated with a taken image located after the above-mentioned second taken image. Consequently, a function is provided that, if the correction of conversion information is determined necessary, the conversion information is corrected on the basis of the conversion information associated with a taken image located before the second taken image in time axis and the conversion information associated with a taken image located after the second taken image.

In carrying out the invention and according to a fourth embodiment thereof, there are provided and image processing apparatus, a processing method thereof, and a program for making a computer execute this processing method, including: feature quantity extraction means for extracting a feature quantity associated with a taken image configuring a taken moving image taken by an image taking apparatus; decision means for determining whether division of a synthesized image is necessary on the basis of the above-mentioned extracted feature quantity; and image synthesis means for synthesizing the above-mentioned taken image with an already formed synthesized image on the basis of a moving information of the above-mentioned image taking apparatus at the time of image taking if the division of a synthesized image is found by the above-mentioned decision means not to be executed and, if the division of a synthesized image is found by the above-mentioned decision means to be executed, creating a new synthesized image different from the already formed synthesized image on the basis of the above-mentioned moving information. Consequently, a function is provided that a feature quantity associated with a taken image configuring a taken moving image taken by an image taking apparatus is extracted, it is determined whether the division of synthesized image is necessary or not on the basis of this extracted feature quantity, and, if the synthesized image is determined not to be divided, the taken image is synthesized with an already formed synthesized image on the basis of moving information, and, if the synthesized image is determined to be divided, a new synthesized image different from the already formed synthesized image is created on the basis of the moving information.

In carrying out the invention and according to a fifth embodiment thereof, there are provided a moving image reproducing apparatus, a processing method thereof, and a program for making a computer execute this processing method, including: moving image storage means for storing a taken moving image taken by an image taking apparatus; conversion information storage means for storing, for each second taken image, conversion information for converting the above-mentioned second taken image located after a first taken image in time axis of the above-mentioned taken moving image with reference to the above-mentioned first image configuring the above-mentioned taken moving image; image holding means for holding a log image including each taken image located before the above-mentioned second taken image in the above-mentioned time axis; feature quantity extraction means for extracting a feature quantity associated with the above-mentioned second taken image; image conversion means for converting the above-mentioned second taken image on the basis of the above-mentioned conversion information; decision means for determining whether synthesis of the above-mentioned second taken image and the above-mentioned log image is necessary or not on the basis of the above-mentioned extracted feature amount; image synthesis means for, if the synthesis of the above-mentioned second taken image and the above-mentioned log image is determined necessary by the above-mentioned decision means, synthesizing the above-mentioned converted second taken image with the above-mentioned log image held in the above-mentioned image holding means holding the synthesized image in the above-mentioned image holding means as a new log image and, if the synthesis of the above-mentioned second taken image and the above-mentioned log image is determined unnecessary by the above-mentioned decision means, holding the above-mentioned second taken image in the above-mentioned image holding means without synthesizing the above-mentioned second taken image with the above-mentioned log image held in the above-mentioned image holding means; and display control means for sequentially displaying a new log image held in the above-mentioned image holding means or the above-mentioned second taken image onto a display means. Consequently, a function is provided that a feature quantity associated with the second taken image is extracted, the second taken image is converted on the basis of conversion information, it is determined whether the synthesis of the second taken image and the log image is necessary or not on the basis of the feature quantity, and, if the synthesis of the second taken image and the log image is determined necessary, the second taken image is synthesized with the log image to provide a new log image, and, if the synthesis of the second taken image and the log image is determined not necessary, the second taken image is held in the image holding means without synthesizing the second taken image with the log image, and the new log image held in the image holding means or the second taken image is sequentially displayed.

According to the present invention, excellent effects are provided that, in viewing a moving image taken by an image taking apparatus, the contents of this moving image can be easily understood.

BRIEF DESCRIPTION OF DRAWINGS

FIG. 5 is a diagram schematically showing each file recorded to a moving image storage block 200 and a metadata storage block 210.

FIG. 6 shows diagrams illustrating one example of images corresponding to a frame forming moving images.

FIG. 7 shows diagrams illustrating an image with a background and so on simplified that corresponds to a frame forming moving images.

FIG. 10 shows diagrams illustrating one example of transition of moving images taken by a camera.

FIG. 11 shows diagrams illustrating an image corresponding to an immediately preceding frame in each image shown in FIG. 10 and shows one example of optical flows that is indicated by dashed lines.

FIG. 13 shows diagrams illustrating one example of transition of moving images taken by a camera.

FIG. 16 shows diagrams illustrating one example of transition of moving images taken by a camera.

FIG. 21 shows a display example (image 480) in a case where a moving image taken by a camera is reproduced and an image 484 before the current image 482 in the image 480 is affine-transformed.

FIG. 22 shows an image 485 in a case where the image area enclosed with the frame 483 shown in FIG. 21 is displayed in a zoom-in manner and an image 487 stored in the display memory 240 in a state where the current image after affine transformation is stored in the image memory 220.

FIG. 23 shows an example of transition of a moving image taken by a camera.

FIG. 24 shows an example of transition of a moving image taken by a camera.

FIG. 25 shows an example of transition of a moving image taken by a camera.

FIG. 26 shows an example of transition of a moving image taken by a camera.

FIG. 27 schematically shows a case in which images 501 through 517 configuring a moving image file 500 have been synthesized.

FIG. 31 shows examples of synthesized images formed by a moving image taken by a camera.

FIG. 32 shows examples of synthesized images formed by a moving image taken by a camera.

FIG. 41 is a diagram schematically illustrating an overview of an arithmetic operation method in which two or more data are processed by different instructions and an overview of a SIMD operation in which two or more data are processed by one instruction.

FIG. 43 shows diagrams illustrating an overview of a data structure and a processing flow in the case where image data stored in a main memory 781 in the embodiment of the present invention is filtered by a Sobel filter 830.

FIG. 46 is a diagram illustrating an overview of a vector computation method of executing vector computation on vector data 841 through 849 by use of a SIMD instruction in the case where filter processing is executed by use of the Sobel filter 830 in the embodiment of the present invention.

BEST MODE FOR CARRYING OUT THE INVENTION

The following describes in detail embodiments of the present invention with reference to accompanying drawings.

Figure 1:
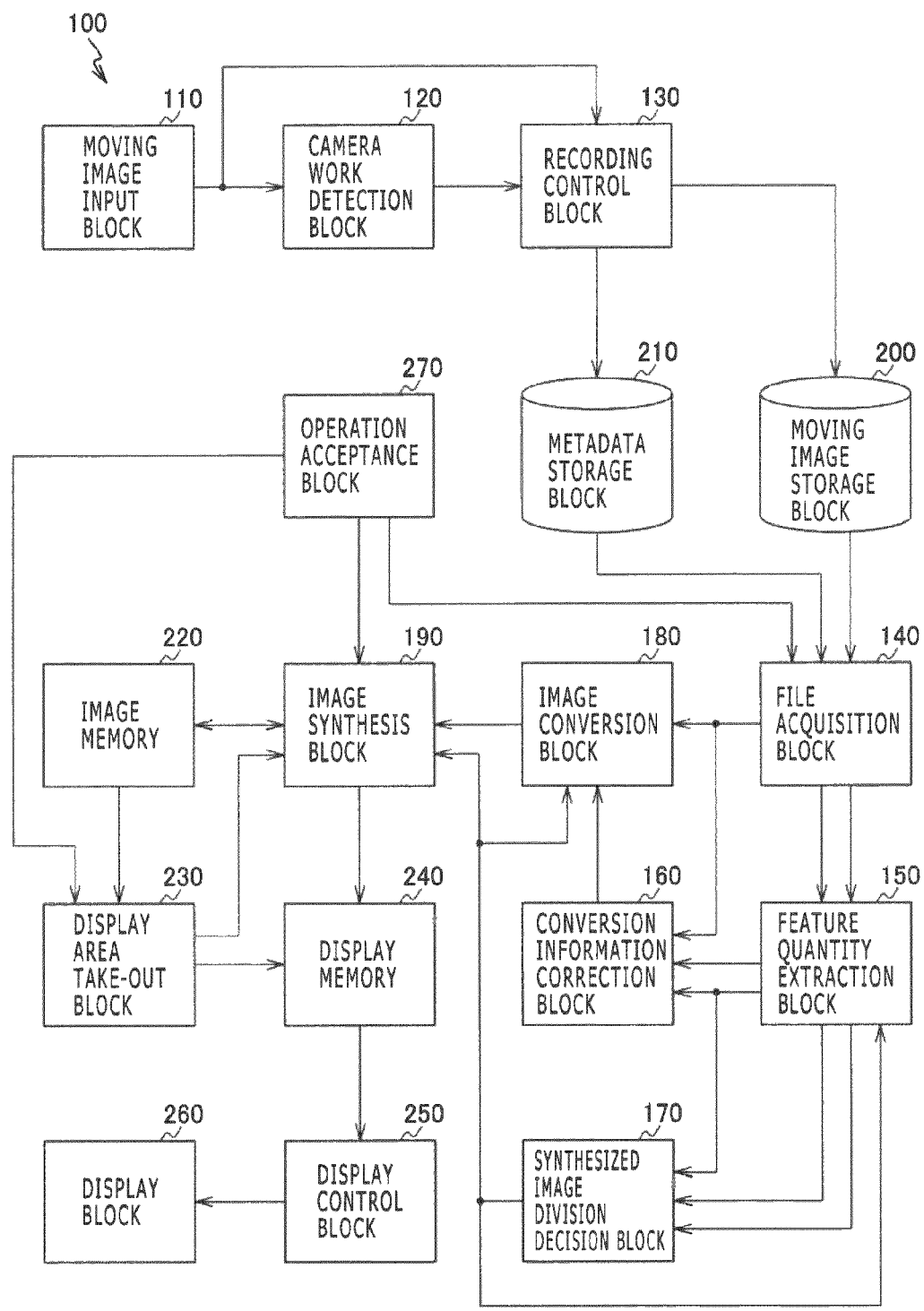
FIG. 1 is a block diagram illustrating an exemplary functional configuration of an image processing apparatus 100 practiced as one embodiment of the present invention.

FIG. 1 is a block diagram illustrating an exemplary functional configuration of an image processing apparatus 100 in an embodiment of the present invention. The image processing apparatus 100 has a moving image input block 110, a camera work detection block 120, a recording control block 130, a file capture block 140, a feature quantity extraction block 150, a conversion information correction block 160, a synthesized image division decision block 170, an image conversion block 180, and an image synthesis block 190, a moving image storage block 200, a metadata storage block 210, an image memory 220, a display area take-out block 230, a display memory 240, a display control block 250, a display block 260, and an operation acceptance block 270. The image processing apparatus 100 can be realized by a personal computer that is configured to extracts a feature amount by video analysis with respect to a moving image taken by an image taking apparatus, such as a digital camera, for example, and, by use of the extracted feature amount, execute various kinds of image processing.

The moving image input block 110 is a moving image input block through which a moving image taken by an image taking apparatus such as a digital video camera or the like (hereafter simply referred to as "camera") is entered and outputs the entered moving image to the camera work detection block 120.

The camera work detection block 120 analyzes a moving image outputted from the moving image input block 110 to detect moving information (camera work) of a camera at the time of image taking, thereby outputting an affine transformation parameter (a camera work parameter) computed on the basis of this camera moving information to the recording control block 130. Namely, the camera work detection block 120 extracts a feature point from each image configuring a moving image, extracts an optical flow (a moving vector) for the feature point, and analyzes the optical flow for the extracted feature point to select a feature point that presented a dominant movement, thereby estimating a camera work on the basis of the optical flow for the feature point that presented a dominant movement. Here, a dominant movement denotes a regular movement indicated by comparatively many optical flows among the optical flows for two or more feature points. It should be noted that the camera work detection block 120 will be detailed with reference to FIG. 2.

The recording control block 130 records a moving image outputted from the moving image input block 110 to the moving image storage block 200 as a moving image file and stores an affine transformation parameter outputted from the camera work detection block 120 to the metadata storage block 210 as a metadata file by relating the parameter with a corresponding moving image and a corresponding frame.

The moving image storage block 200 stores a moving image outputted from the moving image input block 110 to a moving image file under the control of the recording control block 130. Also, the moving image storage block 200 supplies a moving image file on request from the file capture block 140 to the file capture block 140. It should be noted that moving image files to be stored in the moving image storage block 200 will be described in detail with reference to FIG. 5.

The metadata storage block 210 stores an affine transformation parameter outputted from the camera work detection block 120 as a metadata file under the control of the recording control block 130. Also, on request from the file capture block 140, the metadata storage block 210 supplies a metadata file to the file capture block 140. It should be noted that metadata files to be stored in the metadata storage block 210 will be detailed with reference to FIG. 5.

The file capture block obtains at least one files stored in the moving image storage block 200 and the metadata storage block 210 in response to an operation input accepted by the operation acceptance block and supplies the information of each obtained file to each block. To be more specific, the file capture block 140, if a specification operation for synthesizing and reproducing a moving image has been accepted by the operation acceptance block 270, obtains the specified moving image file stored in the moving image storage block 200 and a metadata file stored in the metadata storage block 210 as related with this moving image file, outputs the moving image of the obtained moving image file and the affine transformation parameters of the metadata file to the feature quantity extraction block 150 and the image conversion block 180, and outputs the affine transformation parameters to the conversion information correction block 160. The feature quantity extraction block 150 extracts a feature quantity on the basis of each image configuring the moving image outputted from the file capture block 140 and the affine transformation parameters related with each image and outputs the extracted feature quantity to the conversion information correction block 160 and the synthesized image division decision block 170. In the embodiment of the present invention, the feature quantity extracted by the feature quantity extraction block 150 is described in terms of the scene change score in each image configuring a moving image, the components (zoom components in X-direction and Y-direction, translation component, and rotation component) of camera work extracted from affine transformation parameters, the average values associated with the predetermined number of frames of these components, and the integrated value from the start frame to the current frame of these components, by way of example. Here, the scene change score is a value computed on the basis of a color histogram in each image configuring a moving image and a value for use in detecting a scene change point. This scene change point is a position indicative of a boundary point in the case where image taking scenes in a moving image instantaneously change and the image immediately after that boundary point is the image corresponding to the scene change point. It should be noted that the feature quantity extraction block 150 will be described in detail with reference to FIG. 3. Also, each component of camera work will be described in detail with reference to FIG. 6 and FIG. 7. Further, the scene change point will be described in detail with reference to FIG. 4.

The conversion information correction block 160 corrects the affine transformation parameter outputted from the file capture block 140 on the basis of the feature quantity outputted from the feature quantity extraction block 150 and outputs the corrected affine transformation parameter to the image conversion block 180. To be more specific, the conversion information correction block 160 compares the feature quantity outputted from the feature quantity extraction block 150 with the threshold value to determine whether the affine transformation parameter outputted from the file capture block 140 is to be corrected or not and, if the affine transformation parameter is found to be corrected, corrects this affine transformation parameter, outputting the this corrected affine transformation parameter to the image conversion block 180. On the other hand, if the affine transformation parameter is found not to be corrected, the conversion information correction block 160 does not correct the affine transformation parameter and outputs nothing to the image conversion block 180. Here, in the embodiment of the present invention, the description is made by use of an example of the correction with an affine transformation parameter matrix being a unit matrix and an example of the correction in which a linear interpolation matrix is computed by use of affine transformation parameters associated with frames existing before and after a current frame to replace the affine transformation parameter matrix by this computed linear interpolation matrix. It should be noted that the correction of affine transformation parameters will be described in detail with reference to FIG. 27.

On the basis of the feature quantity outputted from the feature quantity extraction block 150, the synthesized image division decision block 170 determines whether to divide the image corresponding to the current frame from the currently formed synthesized image for reproduction and, if the image corresponding to the current frame is to be divided for reproduction, outputs information that the image corresponding to the current frame is to be divided for reproduction to the image conversion block 180 and the image synthesis block 190 and an instruction for erasing the camera work component computed up to the immediately preceding frame to the feature quantity extraction block 150. Also, when image synthesis reproduction has started, the synthesized image division decision block 170 measures a reproduction time from the start frame to the current frame to determine whether to divide for reproduction the image corresponding to the current frame from the currently formed synthesized image. Further, if the image corresponding to the current frame has been divided, the synthesized image division decision block 170 likewise measures the reproduction time from the start frame to the current frame at the time of division and, on the basis of this reproduction time, determines whether to divide and reproduce the image corresponding to the current frame from the currently formed synthesized image. It should be noted that the division of image will be described in detail with reference to FIG. 28 through FIG. 30.

The image conversion block 180 affine-transforms an image configuring a moving image of a moving image file outputted from the file capture block 140 for each frame by use of the affine transformation parameters corresponding to this image and outputs the affine-transformed image to the image synthesis block 190. Also, if the corrected affine transformation parameter has been outputted from the conversion information correction block 160, the image conversion block 180 executes affine transformation for each frame by use of this corrected affine transformation parameter. Further, if the information that the image corresponding to the current frame is to be divided for reproduction has been outputted from the synthesized image division decision block 170, the image conversion block 180 affine-transforms the image corresponding to the current frame by use of the unit matrix and outputs the affine-transformed image to the image synthesis block 190. It should be noted that this image conversion will be described in detail with reference to FIG. 10 through FIG. 20.

The image synthesis block 190 writes the image affined-transformed by the image conversion block 180 over the synthesized images of the frames up to the frame immediately before held in the image memory 220 and stores the synthesized new synthesized image into the image memory 220. Also, if the information that the image corresponding to the current frame is to be divided for reproduction has been outputted from the 170, the image synthesis block 190 erases the synthesized images corresponding to the frames up to the frame immediately before held in the image memory 220 and holds the image corresponding to the current frame in the image memory 220. Then, for the frames subsequent to the current frame, the image affine-transformed by the image conversion block 180 is written over the synthesized image held in the image memory 220 to synthesize an image. It should be noted that, if the information that the image corresponding to the current frame is to be divided for reproduction has been outputted from the synthesized image division decision block 170 in response to an operation input accepted by the operation acceptance block 270, the image synthesis block 190 is able to hold the image corresponding to the current frame in the image memory 220 at a position different from the position where the synthesized image is held with the synthesized images corresponding to the frames up to the current frame held in the image memory 220 left. This image synthesizing in the case of the image corresponding to the current frame is to be divided for reproduction will be described in detail with reference to FIG. 28 through FIG. 30.

Further, on the basis of the position of the current image in the display area outputted from the display area take-out block 230, the image synthesis block 190 writes the current image affine-transformed by the image conversion block 180 over the synthesized image held in the display memory 240 for synthesis. Here, the size of the current image synthesized in the display memory is determined in accordance with the value of display magnification. It should be noted that the synthesis of the current image in the display memory will be described in detail with reference to FIG. 20 and so on. Here, the image synthesis block 190 compresses the image affine-transformed by the image conversion block 180 and writes the compressed image over the synthesized image held in the image memory 220, thereby making the current image to be written over the synthesized image held in the display memory a taken image having a resolution higher than that of a non-compressed image or a compressed log image. Consequently, a log image at the time of outputting a synthesized image can be made a compressed image and the current image can be made a taken image having a resolution higher than that of a non-compressed image or a compressed log image.

The image memory 220 is a work buffer that holds a synthesized image created by the image synthesis block 190 and supplies the held synthesized image to the image synthesis block 190 or the display area take-out block 230. Namely, the image memory 220 is an image memory that holds a log image.

The display area take-out block 230 is for taking an image existing in a range of the display area subject to display from a synthesized image held in the image memory 220 and holds the taken out image in the display memory. It should be noted that the taking-out of images from the range of this display area will be described in detail with reference to FIG. 19, FIG. 20, and so on and the computation of the position of the current image in the display area will be described in detail with reference to FIG. 20 and so on.

The display memory 240 is a display buffer that holds image taken out from the image memory 220 by display area take-out block 230, the held image is displayed on the display block 260.

The display control block 250 sequentially displays synthesized images held in the display memory for each frame.

Under the control of the display control block 250, the display block 260 displays a image stored in the image memory 240. For example, the display block 260 may be realized a personal computer display or a television display. It should be noted that the display examples of synthesized images will be detailed with reference to FIG. 23, FIG. 26, and so on.

The operation acceptance block 270 has a keyboard made up of various input keys and a mouse (a pointing device) and, upon accepting an operation input from these mouse and so on, outputs the contents of the accepted operation input to the file capture block 140, the image synthesis block 190, or the display area take-out block 230. It is also practicable to configure at least a part of the operation acceptance block 270 and the display block 260 into one unit as a touch panel.

Figure 2:
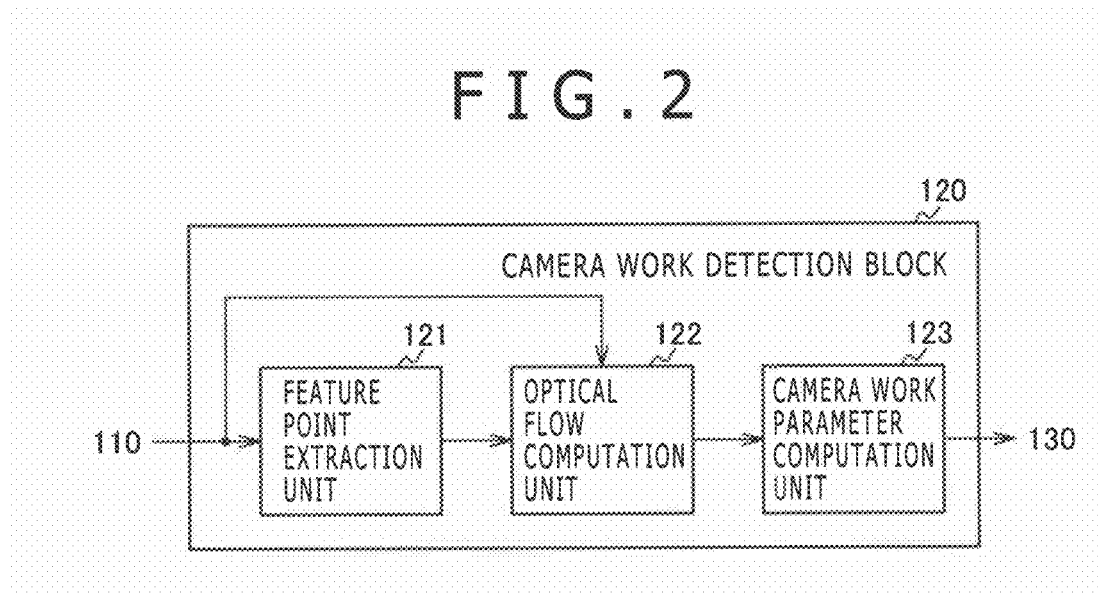
FIG. 2 is a block diagram illustrating an exemplary functional configuration of a camera work detection block 120 in the embodiment of the present invention.

Referring to FIG. 2, there is shown an exemplary functional configuration of the camera work detection block 120 in the embodiment of the present invention. The camera work detection block 120 has a feature point extraction unit 121, an optical flow computation unit 122, and a camera work parameter computation unit 123.

The feature point extraction unit 121 extracts a feature point corresponding to a frame configuring a moving image outputted from the moving image input block 110 and outputs the extracted feature point to the optical flow computation unit 122. Here, the feature point extraction unit 121 extracts a feature point from an entire image for the start frame of the frames configuring the moving image outputted from the moving image input block 110 and, for other frames than the start frame, extracts a feature point from the portion of an area newly taken as compared with an image corresponding to the immediately preceding frame. It should be noted that, for a feature point, a point that is sharp in edge gradient vertically or horizontally (generally referred to as "corner point," hereafter being referred to as "corner point") may be selected.

This corner point is a feature point that is tough for the computation of an optical flow and can be obtained by use of edge detection. It should be noted that the extraction of this corner point will be detailed with reference to FIG. 6 through FIG. 7. Also, in this example, the feature point extraction unit 121 extracts a feature point from an entire image for the start frame; for other frames than the start frame, extracts a feature point from the portion of an area newly taken as compared with an image corresponding to the immediately preceding frame; however, it is also practicable, depending on the processing performance and other factors to extract a feature point from an entire image for frames other than the start frame.

The optical flow computation unit 122 computes an optical flow for each feature point outputted from the feature point extraction unit 121 and outputs the optical flow obtained by the computation to the camera work parameter computation unit 123. To be more specific, by comparing the images corresponding to the consecutive two frames (the current frame and the immediately preceding frame) configuring a moving image outputted from the moving image input block 110, the optical flow corresponding to each feature point in the image corresponding to the immediately preceding frame is obtained as the optical flow of the current frame. Also, an optical flow is obtained for each frame configuring a moving image. It should be noted that, for a detection method of detecting an optical flow, a detection method, such as a gradient method or a block matching method, can be employed. It should also be noted that this optical flow computation will be detailed with reference to FIG. 6 through FIG. 7.

The camera work parameter computation unit 123 executes camera work parameter computation processing for extracting a camera work parameter by use of an optical flow corresponding to each feature point outputted from the optical flow computation unit 122. The computed camera work parameter is outputted to the recording control block 130. Here, in the embodiment of the present invention, each image configuring a moving image subject to reproduction is converted and synthesized respectively in accordance with camera work. For the conversion of this image, camera work is extracted by use of an optical flow computed by the optical flow computation unit 122 and a camera work parameter (a conversion parameter) is computed on the basis of this extracted work. It should be noted that, in the embodiment of the present invention, an example is employed in which affine transformation is used for a method of converting an image configuring a moving image subject to reproduction. Also, an example will be described in which, for a camera work parameter, an affine transformation parameter corresponding to the inverse matrix to a matrix of affine transformation parameters computed on the basis of an optical flow is used. Namely, in the embodiment of the present invention, if not an affine matrix indicative of a movement of a feature point between continuous images but one image of continuous images is made a reference image, an affine transformation parameter for use as conversion information is defined as an affine transformation parameter corresponding to an affine matrix indicative where an image next to this reference image moves. Also, the following describes an example in which an affine transformation parameter is used for a camera work parameter; however it is also practicable to use another image conversion method, such as projective transformation. It should be noted that another image conversion method, such as projective transformation, may be used. It should be also noted that an affine transformation parameter may be obtained by use of three vectors. Further it should also be noted that a project transformation parameter may be obtained by use of four vectors.

Here, a camera work parameter is conversion information for converting other taken images with reference to at least one taken image among the taken images configuring a taken image and includes positional information and attitude information that are described at least in a camera coordinate system. Namely, a camera work parameter includes the information associated with the position and attitude in the case where an image is being taken by an image taking person. Also, on the basis of an affine transformation parameter obtained by the camera work parameter computation unit 123, camera work by image taking person's operations, such as zoom-in, zoom-out, pan, tilt, rotation, and so on, can be presumed. It should be noted that the computation of an affine transformation parameter will be detailed with reference to FIG. 6 through FIG. 7.

Figure 3:
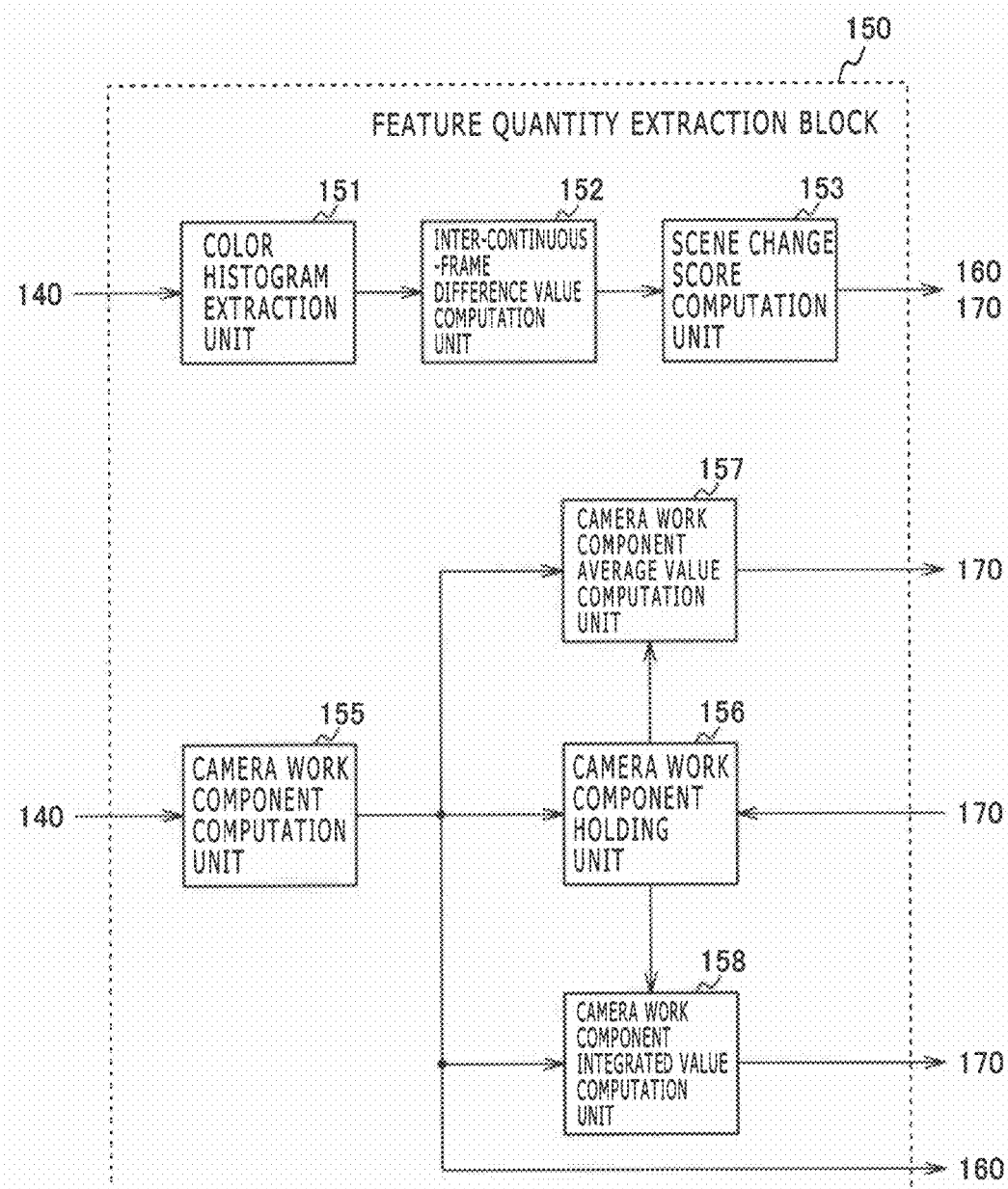
FIG. 3 is a block diagram illustrating an exemplary functional configuration of the feature quantity extraction block 150 in the embodiment of the present invention.

FIG. 3 is a block diagram illustrating an exemplary functional configuration of the feature quantity extraction block 150 in the embodiment of the present invention. The feature quantity extraction block 150 has a color histogram extraction unit 151, a inter-continuous-frame difference value computation unit 152, a scene change score computation unit 153, a camera work component computation unit 155, a camera work component holding unit 156, a camera work component average value computation unit 157, and a camera work component integrated value computation unit 158.

The color histogram extraction unit 151 extracts, for each frame, a color histogram of the each entire image configuring a moving image outputted from the file capture block 140 and outputs the extracted color histogram to the inter-continuous-frame difference value computation unit 152.

The inter-continuous-frame difference value computation unit 152 computes a difference value in the color distribution of the color histogram between two continuous frames outputted from the color histogram extraction unit 151 and outputs the computed difference value to the scene change score computation unit 153. Here, in the embodiment of this invention, a value obtained by digitizing similarity computed by use of EMD (Earth Movers Distance) is used for a difference value in the color distribution of a color histogram between two continuous frames. It should be noted that EMD is representative of the distance between color distributions and used for similar image search and the like (for example, refer to Japanese Patent Laid-open No. 2007-206919.

The scene change score computation unit 153 removes a difference of the offsets of the difference value between frames (the removal of a DC component) through a highpass filter with respect to a difference value of color distribution of a color histogram outputted from the inter-continuous-frame difference value computation unit 152, thereby computing a value after DC component removal as a scene change score, outputting the computed scene change score to the conversion information correction block 160 and the synthesized image division decision block 170. It should be noted that, in the embodiment of the present invention, an example has been described in which a difference value between two continuous frames is computed by use of the similarity computed on the basis of EMD and a scene change score is computed on the basis of this difference value; it is also practicable to compute another difference value between frames configuring a moving image in time axis to compute a scene change score on the basis of this difference value.

The camera work component computation unit 155 computes camera work components (translation components in x-direction and y-direction, zoom component, and rotation component) from the affine transformation parameters corresponding to a current frame outputted from the file capture block 140, outputs the computed camera work components to the conversion information correction block 160, the camera work component average value computation unit 157, and the camera work component integrated value computation unit 158, and holds the computed camera work components in the camera work component holding unit 156.

The camera work component holding unit 156 holds, for each frame, the camera work components up to the current frame computed by the camera work component computation unit 155 and supplies the held camera work components to the camera work component average value computation unit 157 and the camera work component integrated value computation unit 158. Also, if an instruction for erasing the camera work components computed up to the immediately preceding frame from the synthesized image division decision block 170, the camera work component holding unit 156 erases the hold camera work components.

The camera work component average value computation unit 157 computes an average value of camera work components on the basis the camera work components corresponding to the current frame outputted from the camera work component computation unit 155 and the camera work components corresponding to the frames of up to the predetermined number of frames from the immediately preceding frame held in the camera work component holding unit 156 and outputs the computed the average value of camera work components to the synthesized image division decision block 170. The number of frames for use in computing this average of camera work components may be set to about 5 for example.

The camera work component integrated value computation unit 158 computes an integrated value of camera work components on the basis of camera work components corresponding to the current frame outputted from the camera work component computation unit 155 and camera work components corresponding to the frames from the start frame held in the camera work component holding unit 156 up to the preceding frame and outputs the computed integrated value of the camera work components to the synthesized image division decision block 170. Here, if an instruction is outputted from the synthesized image division decision block 170 that the camera work components computed up to the immediately preceding frame is to be erased, each component of camera work held in the camera work component holding unit 156 is erased. Hence, if an integrated value of the camera work components subsequent to a frame next to the specified frame is computed, the camera work component integrated value computation unit 158 computes the integrated value of the camera work components by use of the components of the camera work corresponding to the current frame outputted from the camera work component computation unit 155 and the components of the camera work corresponding to each frame from the frame at the time the instruction was made held in the camera work component holding unit 156 to the immediately preceding frame.

The following describes in detail a scene change point in a moving image with reference to drawings.

Figure 4:
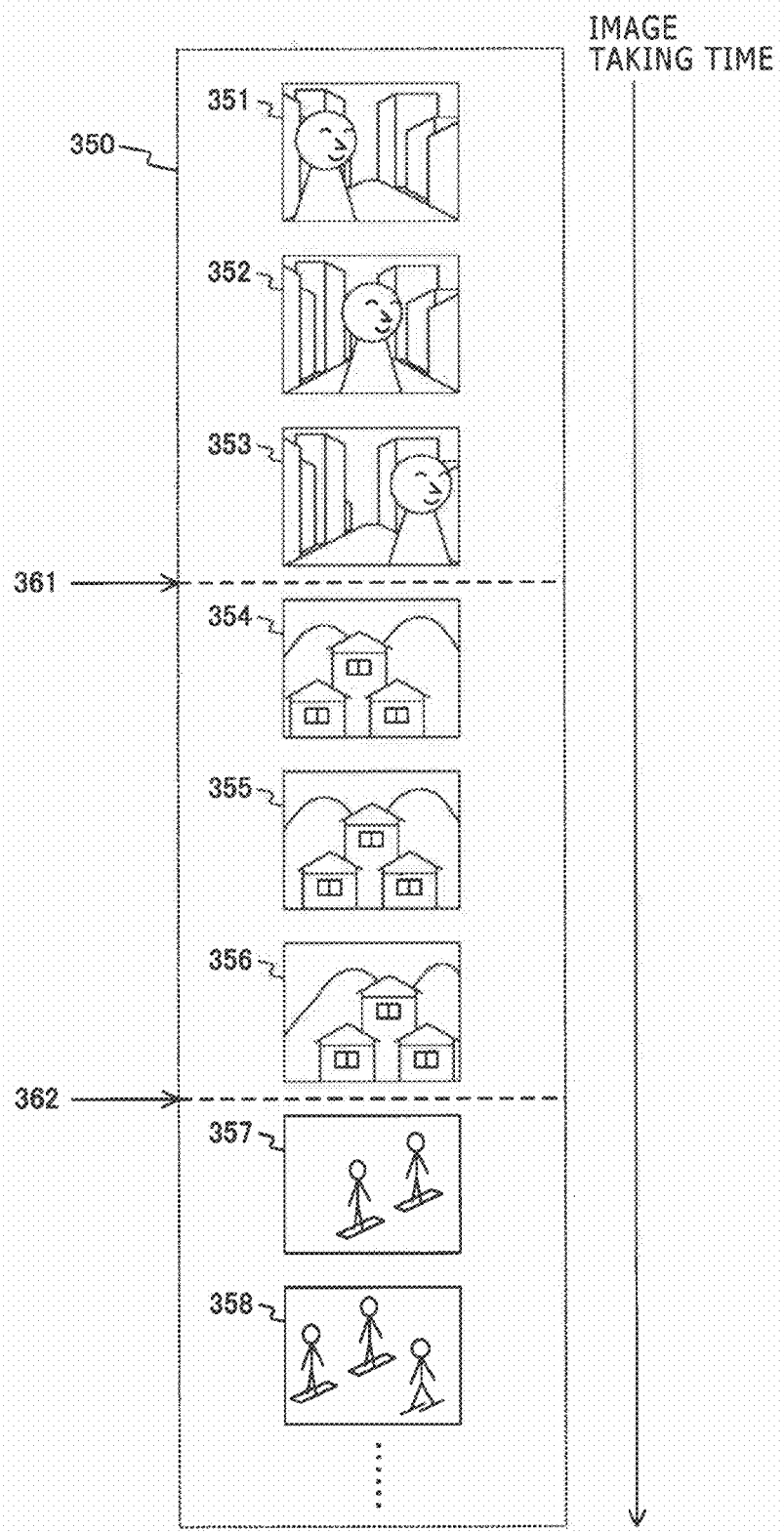
FIG. 4 schematically shows an example in which images corresponding to frames configuring a moving image are arranged in a time sequence manner.

FIG. 4 schematically shows an example in which images corresponding to frames configuring a moving image are arranged in a time sequence manner. In the figure, images 351 through 358 corresponding to the components configuring a moving image 350 taken by an image taking apparatus are schematically shown. It should be noted that, with respect to images 351 through 358, numbers, subjects and so on are shown in a simplified manner for the convenience of description. As shown in the figure, although the images 351 through 358 are images included in one moving image 350, three scenes different from each other in image taking time and location, so that with each frame in which these scenes are changed the composition, color, and so on of a subject change instantaneously. Thus, if the composition, color, and so on of a subject change instantaneously and a histogram difference value in the continuous two frame exceeds the threshold value, a scene change point is determined to be between these two continuous frame. This scene change point determination is executed by the conversion information correction block 160 and the synthesized image division decision block 170. Here, the threshold value for use in the determination of scene change points may be a value common to both the conversion information correction block 160 and the synthesized image division decision block 170 or a value different between these blocks. For example, in order to prevent the frequency division, the threshold value of the synthesized image division decision block 170 may be set higher than the threshold of the conversion information correction block 160.

For example, the images 351 through 353 are image in which a person walking on a street is taken and this person is moving, so that, although the position of the person is slightly different from image to image, the images as a whole give a generally similar impression. Hence, the histogram difference value between the two continuous frames associated with the images 351 through 353 does not exceed the threshold value, determining that there is no scene change point between these two continuous frames.

Further, images 354 through 356 are images in which houses in front of mountains are taken, which are taken by horizontally moving an image taking apparatus, so that, although the positions of subjects are slightly different horizontally from image to image, the images as a whole gives a generally similar impression. However, if a comparison is made between the image 353 and the image 354, the image taking time and location correspond to a different scene switching portion, so that the whole images are largely different from each other. Hence, the boundary between the image 356 and the image 357 is determined to be a scene change point. Also, the boundary between the image 356 and the image 357 is likewise determined to be a scene change point. Thus, if a scene change point is determined, the image immediately following that boundary point is determined to be the image corresponding to the scene change point in the embodiment of the present invention. The images corresponding to the scene change point are the images 354 and 357 for example.

Referring to FIG. 5, there is schematically shown each file recorded to the moving image storage block 200 and the metadata storage block 210 in the embodiment of the present invention. FIG. 5(a) shows moving image files 201 through 204 stored in the moving image storage block 200 and metadata files 211 through 213 stored in the metadata storage block 210 as related with the moving image files 201 through 204. Here, it is assumed that an moving image ID for identifying each moving image file stored in the moving image storage block 200 be assigned to each moving image file. For example, "#1" is assigned to the moving image file 201, "#2" is assigned to the moving image file 202, and "#n" is assigned to the moving image file 204.

FIG. 5(b) schematically shows the moving image file 201 stored in the moving image storage block 200 and the metadata file 211 stored in the metadata storage block 210 as related with the moving image file 201. Here, the moving image file 201 is a moving image file configured by n frames and these n frames are indicated as frames "1" 205 through "n" 208.

Also, the metadata 211 is stored as related with an moving image ID 214, a frame number 215, and an affine transformation parameter 216.

The moving image ID 214 is a moving image ID assigned to a corresponding moving image file; for example, "#1" assigned to the moving image file 201 is stored.

The frame number 215 is a serial number of each frame configuring a moving image of a corresponding moving image file; for example, "1" through "n" corresponding to frames "1" 205 through "n" 208 configuring a moving image of the moving image file 201 are stored.

The affine transformation parameter 216 is an affine transformation parameter computed for each frame of a moving image corresponding to the frame number 215. It should be noted that an affine parameter 216 "a1, b1, c1, d1, e1, f1" corresponding to "1" of the frame number 215 is an affine transformation parameter of unit matrix. Also, "am, bm, cm, dm, em, fm" of an affine transformation parameter 216 corresponding to "m (m is an integer of 2 or more) of the frame number 215 is an affine transformation parameter corresponding to the immediately preceding frame "m−1" of frame "m."

The following details a detection method of detecting affine transformation parameters for use in image conversion with reference to drawings.

FIGS. 6(a) through (c) show an example of an image corresponding to a frame configuring a moving image. FIG. 7(a) shows an image simplified by omitting a background and so on with an image corresponding to an immediately preceding frame corresponding to an image 300 shown in FIG. 5. FIGS. 7(b) and (c) show images simplified by omitting backgrounds and so on with an image 300 shown in FIG. 6.

Images 300, 320, and 330 shown in FIG. 6 and FIG. 7 include images of mounted horse 301, 321, and 331 and snake images 302, 322, and 332 arranged in front of these mounted horse images 301, 321, and 331. Also, as shown in FIG. 6, in the background of these images, flags, chairs, and so on exist, the flags being streaming on the wind.

The image 320 shown in FIG. 7(a) is an image obtained by simplifying an image corresponding to an immediately preceding frame corresponding to the images 300 and 330 shown in FIGS. 6(a) through (c) and FIGS. 7(b) and (c). The images 320 and 330 corresponding to two consecutive frames are images indicative of a transition in the case where a subject in the screen is gradually enlarged. Namely, at the time of this image taking, a zoom-in operation that is an operation for gradually enlarging a subject in the screen is executed.

In the embodiment of the present invention, a method is used for example in which a feature point is detected from images configuring a moving image and an optical flow corresponding to this feature point is used to compute an affine transformation parameter. In this example, a case where a corner point is used for a feature point is described.

Here, with reference to FIG. 7(a) through (c), a method is described as an example in which an optical flow corresponding to three corner points detected from the images 320 and 330 is used to compute an affine transformation parameter.

For example, it is assumed that, in the image 320 shown in FIG. 7(a), a corner point 323 near the mouth in a horse image 321, a corner point 324 near the rider's buttocks of the horse image 321, and a corner point 325 near the mouth of the snake image 322 have been detected as feature points. In this case, in the image 330 shown in FIG. 7(b), optical flows 337, 338, and 339 for the corner points 323, 324, and 325 in the image 320 are detected by a gradient method or block matching method. Then, on the basis of these detected optical flow 337, 338, and 339, the corner points 333, 334, and 335 corresponding to the corner points 323, 324, and 325 in the image 320 are detected.

Here, for example, because the horse images 321, 331 and the snake images 322, 332 included in the images 320 and 330 shown in FIGS. 7(a) and (b) are installed on the ground, these images do not move regardless of camera work. Hence, camera work can be correctly estimated on the basis of the optical flows obtained from the corner points detected in the horse images 321, 331 and the snake images 322, 332. For example, as shown in FIG. 7(c), on the basis of three optical flows 337 through 339 detected in the image 330, it can be estimated that the image 330 is an enlargement of the image shelf panel 320 around the point 336. Consequently, the camera work at the time of taking the image 330 can be determined to be a zoom-in operation around the point 336. Thus, corner points can be detected in an object that does not move regardless of camera work and, on the basis of the optical flows obtained for the corner points, the camera work having a certain regularity can be correctly detected. Hence, by use of the optical flows obtained for these corner points, affine transformation parameters can be obtained.

However, like flags streaming on the wind, an image may include an object that moves regardless of camera work. For example, the image 300 shown in FIG. 6 contains flags streaming on the wind. If corner points are detected in an object that moves regardless of camera work are detected and camera work is estimated by use of the optical flows obtained for the detected corner points, the camera work cannot be correctly estimated.

For example, the optical flows detected in the image 300 shown in FIG. 6(b) are indicated by arrows and the corner points detected by the optical flows are indicated by white circles at the ends. Here, the corner points 303 through 305 are corner points corresponding to the corner points 333 through 335 shown in FIGS. 7(b) and (c). Also, the corner points 306 through 311 are corner points detected for the flags existing in the background of the horse image 301. Then, because these flags are streaming on the wind, the movement of each flag affected by the wind is detected as an optical flow. Namely, each of the optical flows corresponding to the corner points 306 through 311 is detected for the flag that moves regardless of camera work. Hence, if an optical flow corresponding to at least one corner point of the corner points 306 through 311 is included in the three optical flows for use in the computation of affine transformation parameters, no correct camera work can be detected.

As described above, optical flows for an object that moves regardless of camera work (optical flows corresponding to the corner points 306 through 311 shown in FIG. 6(b)) and optical flows having a certain regularity with respect to camera work (optical flows other than the optical flows corresponding to the corner points 306 through 311 shown in FIG. 6(b)) may be detected from a taken image, for example.

So, in the embodiment of the present invention, an example is described in which affine transformation parameter computation processing for computing affine transformation parameters on the basis of three optical flows is executed two or more times to obtain two or more affine transformation parameters and an optimum affine transformation parameter is selected from the obtained two or more affine transformation parameters. It should be noted that, in this example, it is assumed that the size of a moving object included in each image configuring a moving image be comparatively small relative to the area of the image.

Here, affine transformation is described in a simple manner. In a two-dimensional space, let the position of move source be (x,y) and the position of move destination after affine transformation be (x',y'), then the determinant of affine transformation may be expressed by equation 1 below.

[Mathematical expression 1]

$$[x'\ y'\ 1] = [x\ y\ 1]\begin{bmatrix} a & d & 0 \\ b & e & 0 \\ c & f & 1 \end{bmatrix} \quad \text{(Equation 1)}$$

In the above expression, a through f denote affine transformation parameters. Also, affine matrix AM based on these affine transformation parameters may be expressed by an equation below. In this case, zoom component XZ in X direction, zoom component YZ in Y direction, translation component XT in X direction, translation component YT in Y direction, and rotation component θx in X direction and rotation component θy in Y direction can be obtained by the following equations, respectively. It should be noted that in the case of a unit matrix, a=e=1, b=c=d=f=0 are satisfied.

[Mathematical expression 2]

$$AM = \begin{bmatrix} a & b & c \\ d & e & f \end{bmatrix}$$

$$XZ = \sqrt{a^2 + d^2}$$

$$YZ = \sqrt{b^2 + e^2}$$

$$XT = c$$

$$YT = f$$

$$\theta_x = \tan^{-1}\left[\frac{d}{a}\right]$$

$$\theta_y = \tan^{-1}\left[\frac{b}{e}\right]$$

As described above, camera work components (X-direction and Y-direction zoom components, translation component, and rotation component) can be obtained from affine transformation parameters. It should be noted that the rotation component will be described with reference to FIG. 8.

Figure 8:
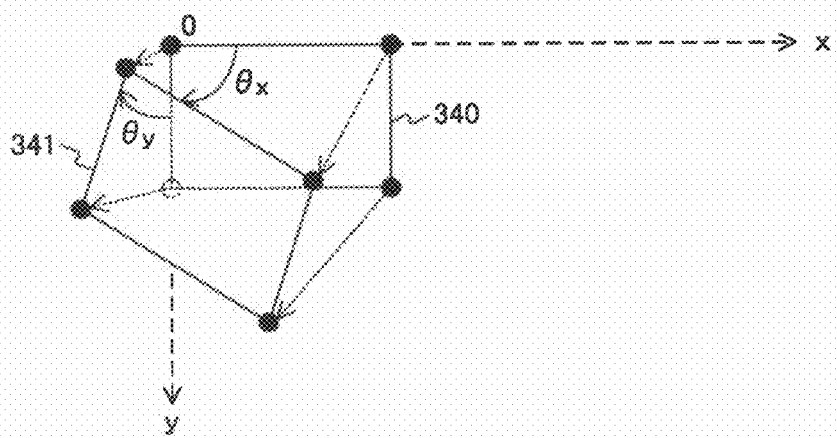
FIG. 8 shows a case in which a rectangle 340 was converted by use of predetermined affine transformation parameters.

FIG. 8 shows a case in which a rectangle 340 was converted by use of predetermined affine transformation parameters. As shown in the figure, let a rectangle after the conversion of the rectangle 340 by use of predetermined affine transformation parameters be a rectangle 341 in xy coordinates with the two sides of the rectangle 340 being x-axis and y-axis in contact with an apex corresponding to the origin that is one apex of the rectangle 340. In this case, let an angle formed by the side of the x-axis side of the rectangles 340 and 341 be rotation component θx and an angle formed by the side of the y-axis side of the rectangles 340 and 341 be rotation component θy.

The following describes a computation method of computing an average value and an integrated value of camera work components.

An average value of camera work components is a value obtained by dividing, by a predetermined number, a value obtained by adding the components of camera work corresponding to a predetermined number of frames. For example, in the computation of an average value of translation components in X-direction of camera work components, the average number can be obtained by "(XT1+XT2+XT3+XT4+XT5)/5," if the predetermined number is 5 and the translation components in X-direction of camera work components of frames 1 through 5 subject to the computation are XT1 through 5. It should be noted that it is also practicable to use an average speed obtained by dividing a value obtained by adding the components of camera work by an elapsed time between the frames subject to computation, instead of using the average value of the components of camera work.

Also, an integrated value of camera work components is a value obtained by adding the components of camera work corresponding to each frame from the start frame to the current frame. For example, in the computation of an integrated value of translation components of X-direction of camera work components, if the translation components of X-direction of camera work components of the frames 1 through 5 from the start frame to the current frame are XT1 through 5, then the integrated value can be obtained by "XT1+XT2+XT3+XT4+XT5."

The following describes an affine transformation parameter computation method.

First, in an image corresponding to a current frame that is one of the frames configuring a moving image, three feature points are selected from the feature points from which optical flows were detected. For example, three corner points are randomly selected from the corner points (indicated by white circles) detected in the image 300 shown in FIG. 6(b). It should be noted that, if a projective transformation parameter is used for a camera work parameter, four feature points are randomly selected.

Next, affine transformation parameters are computed by use of the three optical flows corresponding to the three selected feature points. For example, affine transformation parameters are computed by use of the optical flows (indicated by arrows connected to white circles) corresponding to the three corner points out of the corner points (indicated by white circles) in the image 300 shown in FIG. 6(b). The affine transformation parameters can be obtained by use of equation 1.

Next, on the basis of the obtained affine transformation parameters, a score of the affine transformation parameters is obtained. To be more specific, by use of the obtained affine transformation parameters, the positions of the move destinations of all feature points in an image corresponding to the immediately preceding frame of the current frame are obtained. Then, a comparison is made between the position of the move destination of the feature point obtained by use of the affine transformation parameters and the position of the feature point detected in the current frame to compute a difference value between the positions of the two feature points corresponding to each other. For the difference value, an absolute distance between the two corresponding position is computed, for example. Then, a comparison is made between the computed difference value and a preset threshold for each feature point to compute the number of feature points with the difference value smaller than the threshold value as the score of affine transformation parameters. Thus, three feature points are randomly selected from the feature points from which optical flow were detected and the processing of computing a score of affine transformation parameters is repeated the predetermined number of times on the basis of the optical flows corresponding to these feature points, thereby computing two or more scores of affine transformation parameters. This predetermined number of times may be appropriately set in accordance with the type of images subject to comparison or the processing performance and so on of the image processing apparatus 100 or set by use of a fixed value. This predetermined number of times may be 20 or so by taking the processing performance of the image processing apparatus 100 into consideration, for example.

For example, assume that three corner points other than the corner points 306 through 311 from the corner points detected in the image 300 shown in FIG. 6(*b*). If an affine transformation parameter is computed by use of three optical flows corresponding to the three corner points thus selected, an affine transformation parameter for converting the image corresponding to the immediately preceding image in accordance with certain rules is obtained because, as described above, these three optical flow have a certain regularity. Hence, for a difference value to be obtained for corner points other than the corner points 306 through 311, between the position of a corner point obtained by use of an affine transformation parameter and the position of a corner point detected in the current frame, a comparatively small value is computed. Hence, the score of affine transformation parameters takes a large value.

On the other hand, assume that three corner points including at least one of the corner points 306 through 311 be selected from the corner points detected in the image 300 shown in FIG. 6(*b*). If an affine transformation parameter is computed by use of three optical flows corresponding to the three corner points thus selected, an affine transformation parameter not converting the image corresponding to the immediately preceding frame is obtained because an optical flow having no certain regularity is included in these three optical flows. Hence, for a difference value between the position of a corner point obtained by the use of an affine transformation parameter and the position of a corner point obtained in the current frame, a comparatively large value is obtained at a given corner point. Hence, the score of affine transformation parameters takes a small value.

Next, of the obtained two or more scores of affine transformation parameters, the affine transformation parameter having the largest score value is selected as a representative affine transformation parameter. Then, an inverse matrix to a matrix of representative affine transformation parameters is computed and the affine transformation parameters of this inverse matrix are recorded to the metadata storage block 210 as related with the current frame. Consequently, in the affine transformation of an image configuring a moving image, the affine transformation can be executed by use of an optimum affine transformation parameter.

As described above, if an object (a moving object) that moves, such as a human being, car, or the like, is included in each image configuring an moving image and, if the size of such a moving object relative to the area of the image is comparatively small, camera work can be extracted without being affected by the moving object.

In addition, by extracting camera work, motions considered intentionally made by an image taking person, such as zoom-in, zoom-out, pan, tilt, and rotation, can be estimated. It should be noted that, in equation 1, an affine transformation parameter can be computed on the basis of two optical flows where a=e, d=−b. For example, if an image is affine-transformed by use of an affine transformation parameter computed on the basis of three optical flows for example, a rectangular image may be converted into a parallelogram. In contrast, if an image is affine-transformed by use of an affine transformation parameter computed on the basis of two optical flows, at least one of translation, rotation, and zoom (with zoom ratio being the same in xy directions) can be executed with the image in a rectangle state. In the embodiment of the present invention, an example is used for description in which image conversion is executed by use of a affine transformation parameter computed on the basis of three optical flows; the embodiment of the present invention is also applicable if image conversion is executed by use of affine transformation parameter computed by use of two optical flows.

The following describes an operation of the image processing apparatus 100 in the embodiment of the present invention with reference to drawings.

Figure 9:
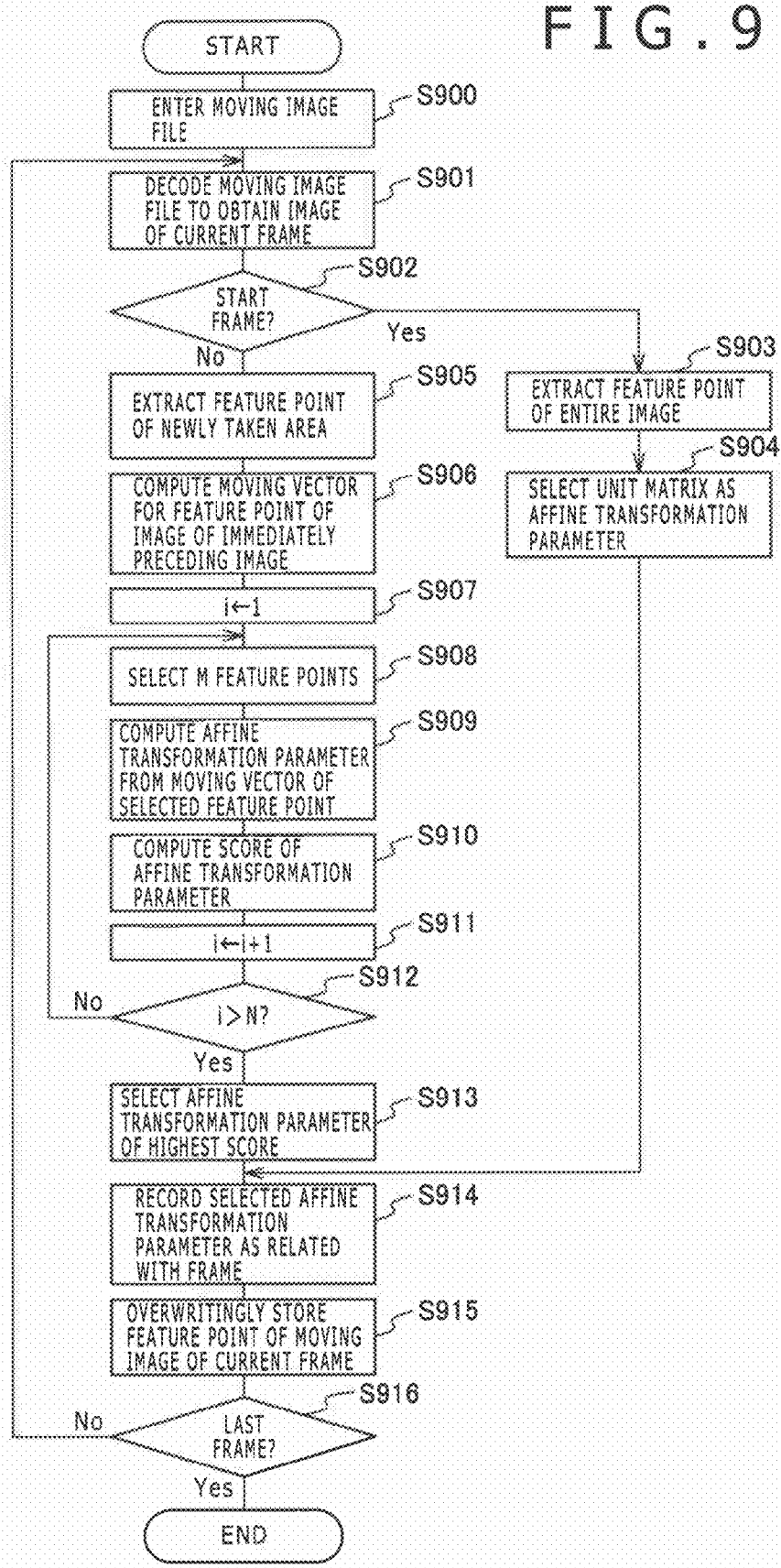
FIG. 9 is a flowchart indicative of a processing procedure of affine transformation parameter detection processing by the image processing apparatus 100 in the embodiment of the present invention.

Referring to FIG. 9, there is shown a flowchart indicative of a processing procedure of the affine transformation parameter detection processing by the image processing apparatus 100 in the embodiment of the present invention.

First, a moving image file is entered in the moving image input block 110 (step S900). Next, the moving image file entered in the moving image input block 110 is decoded and an image of one frame is obtained in a time sequence manner (step S901). Next, it is determined whether the obtained one frame is the start frame of the moving image data entered in the image processing apparatus 100 (step S902). If the obtained one frame is found to be the start frame (step S902), then feature points are extracted from the entire image corresponding to this start frame (step S903). For example, as shown in FIG. 6(*b*), two or more corner points are extracted in the image. Next, affine transformation parameters of a unit matrix are selected as the affine transformation parameter (step S904), upon which the procedure goes to step S914.

On the other hand, if the obtained one frame is found not to be the start frame (step S902), feature points are extracted from an area newly taken with reference to an image corresponding to an immediately preceding frame (step S905). Namely, the feature points already extracted in an image corresponding to an immediately preceding frame can be obtained by an optical flow corresponding to this feature point, so that these feature points are not extracted in the image corresponding to the current frame.

Next, an optical flow for each of the feature points extracted from the image corresponding to the immediately preceding frame are computed (step S906). Namely, as shown in FIG. 6(*b*), an optical flow for each corner point is computed.

Next, variable i is initialized to "1" (step S907). Next, from the feature points from which optical flows were computed, M feature points are selected (step S908). For example, if the affine transformation parameter is used for a camera work parameter, three feature points are randomly selected. Also, if the projective transformation parameter is used for a camera work parameter, four feature points are randomly selected. Next, on the basis of the M optical flows computed for the selected M feature points, affine transformation parameters are computed (step S909).

Next, on the basis of the computed affine transformation parameters, a score of the affine transformation parameters is computed (step S910). To be more specific, by use of the affine transformation parameters obtained by computation, the potions of the move destinations of all feature points in the image corresponding to the immediately preceding frame are obtained. Then, a comparison is made between the position of the feature point obtained by the affine transformation parameter and the position of the feature point in the image corresponding to the current frame obtained in the computation of optical flows in step S906 to compute a difference value between the positions of two corresponding feature points for each of the feature points. For the difference value, an absolute distance between the two corresponding positions is computed, for example. Next, a comparison is made between the computed difference value and a preset threshold value for each of the feature points, to obtain, as the score of affine transformation parameters, the number of feature points whose difference values are smaller than the threshold value.

Next, "1" is added to variable i (step S911) to determined whether variable i is greater than constant N (step S912). If variable i is less than constant N (step S912), then the procedure returns to step S908 to repeat the affine transformation parameter score computation processing (steps S908 through S910). For example, 20 may be used for constant N.

On the other hand, if variable i is greater than constant N (step S912), an affine transformation parameter having the greatest value is selected as a representative affine transformation parameter from the obtained scores of affine transformation parameters (step S913). Next, affine transformation parameters corresponding to the inverse matrix to a matrix of the selected affine transformation parameters are recorded to the metadata storage block 210 as related with the current frame (step S914). It should be noted that, if the current frame is the start frame, the affine transformation parameters of the selected unit matrix are recorded to the metadata storage block 210 as related with the start frame. Next, the image corresponding to the current frame and the feature points in this image are stored in an overwrite manner (step S915).

Next, it is determined whether the current frame is the last frame of the moving image entered in the moving image input block 110 (step S916). If the current frame is not the last frame (step S916), the procedure returns to step S901 to repeat the affine transformation parameter detection processing (steps S901 through S915). On the other hand, if the current frame is the last frame (step S916), the affine transformation parameter detection processing comes to an end.

In the embodiment of the present invention, the description has been made by use of an example in which, for the detection of a camera work parameter, affine transformation parameters are detected on the basis of optical flows detected in an image configuring a moving image; however, it is also practicable to arrange a sensor, such as an acceleration sensor or a gyro sensor for example or a zoom button for use in zoom operations onto the camera, detect a movement amount of the camera at the time of image taking, and obtain a camera work parameter on the detected camera movement amount. It should be noted that the camera movement amount detected at the time of image taking can be used when determining whether the camera work parameter obtained by the camera work parameter computation unit 123 are correct or not. Also, it is applicable to detect two or more camera work parameters by the camera work parameter computation unit 123 in advance and, on the basis of the camera movement amount detected at image taking, one of these camera work parameters.

The following describes in detail a case in which one moving image is synthesized/reproduced by use of the affine transformation parameter computed by the camera work detection block 120 with reference to drawings. It should be noted that images shown in FIG. 10 through FIG. 18 are shown in a simplified manner and the movement amount between two consecutive frames is shown large for the convenience of description.

First, a case is described in which, at the time of image taking by the camera, the direction of the lens of the camera has been moved up, down, to the left, or to the right relative of the position of the camera with magnification kept unchanged.

FIG. 10 shows one example of a transition of a moving image taken by a camera. FIG. 10 shows images 401 through 403 corresponding to continuous frames included in a moving image in which a person 400 was taken with mountains in the background. In this example, an image taking person is taking an image by moving the lens of the camera to the right side and up. In this case, the person 400 included in the moving image taken by the camera moves from right to left and down in the images configuring that moving image.

FIG. 11 shows, dashed lines, the image corresponding to the immediately preceding frame in each image shown in FIG. 10 and one example of optical flows to be detected. The image 401 shown in FIG. 11(a) is the same as the image 401 shown in FIG. 10(a). The solid line portion of the image 402 shown in FIG. 11(b) is the same as that of the image 402 shown in FIG. 10(b) and the dashed line portion of the image 402 shown in FIG. 11(b) is the same as the solid line portion of the image 401 shown in FIG. 11(b). Arrows 404 through 406 in the image 402 shown in FIG. 11(b) are indicative of an example of optical flows detected from the image 402. Likewise, the solid line portion of the 403 shown in FIG. 11(c) is the same as that of the image 403 shown in FIG. 10(c) and the dashed line portion of the image 403 shown in FIG. 11(c) is the same as the solid line portion of the image 402 shown in FIG. 11(b). Arrows 407 through 409 in the image 403 shown in FIG. 11(c) are indicative of an example of optical flows detected from the image 403.

As shown in FIGS. 11(b) and (c), the person 400 and the background mountains included in the image move as the camera moves. On the basis of the optical flows detected by this movement, the affine transformation parameter can be obtained for each frame.

Figure 12:
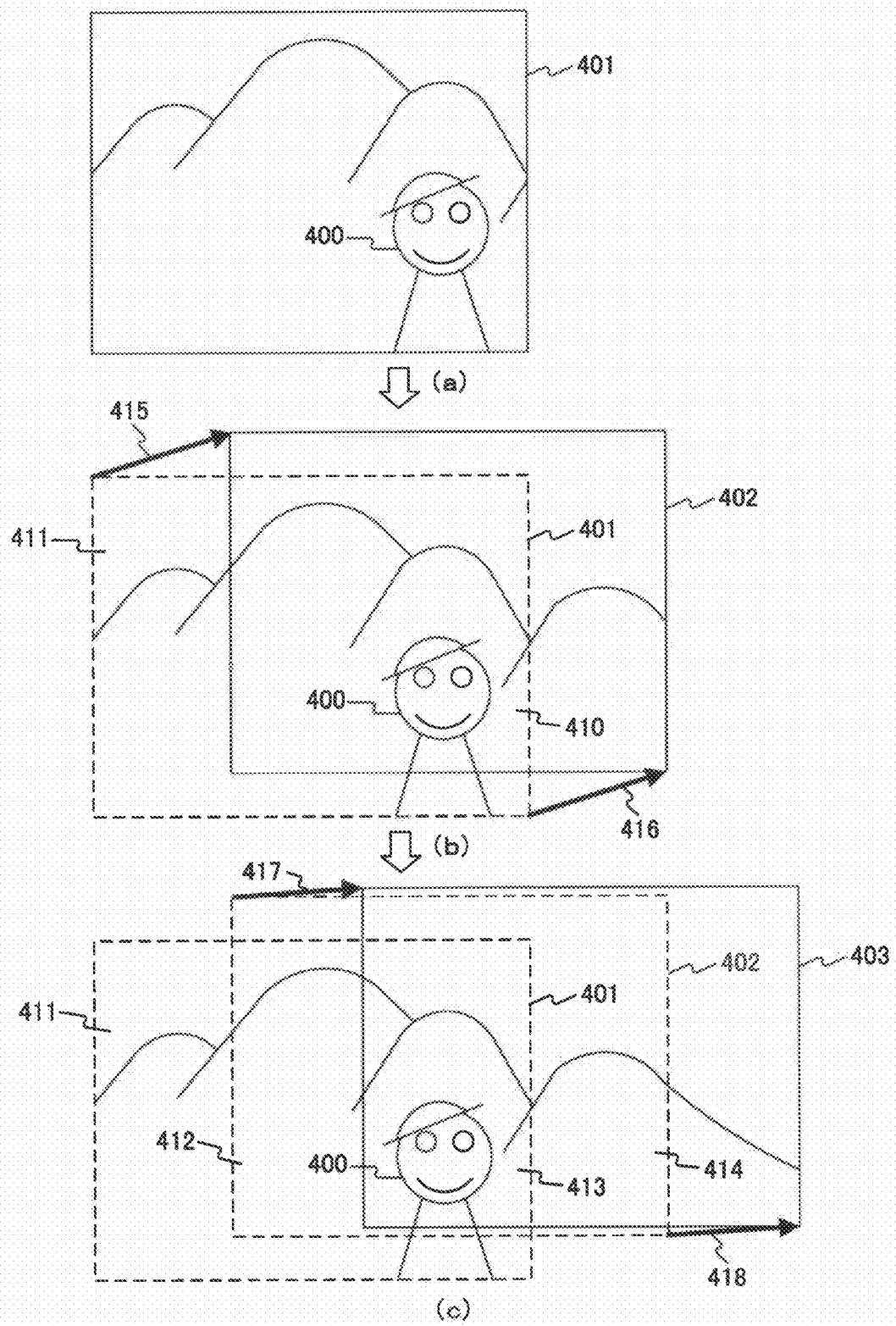
FIG. 12 shows diagrams illustrating an exemplary image synthesis in the synthesis of moving images including images 401 through 403 shown in FIG. 10.

FIG. 12 shows an image synthesis example in which a moving image including the images 401 through 403 shown in FIG. 10 are reproduced while being synthesized. It should be noted that, in the embodiment of the present invention, each image configuring two moving images is synthesized, so that, as the reproduction time goes by, the image displayed on the display block 260 becomes larger than a normal image. For this reason, an image to be displayed first is displayed in a comparatively smaller than the size of a display area of the display block 260. It should be noted that it is also practicable for the user to specify the size and position of an image to be displayed first.

As shown in FIG. 12(a), only an image 401 corresponding to the start frame is displayed first. Here, let a matrix (a matrix of 3×3) of affine transformation parameters corresponding to the image 401 be A1, then the value of A1 is obtained and the image 401 is affine-transformed by the obtained A1 matrix with reference to the position and size of the image 401 of the start frame. Here, because A1 is unit matrix, the position and size of the image 401 are not converted. Next, if the image 402 corresponding to the next frame is synthesized, the image 402 is affine-transformed by use of the affine transformation parameters related with this frame. To be more specific, let the matrix of affine transformation parameters corresponding to the image 402 be A2 and the matrix of affine transformation parameters corresponding to the image 401 be A1, then the value of A2×A1 is obtained and the image 402 is affine-transformed by use of the obtained matrix of A2×A1 with reference to the position and size of the image 401 of the start frame. In the image shown in FIG. 12(b), only the position of the image 402 is converted. Then, the image 402 affine-transformed by the affine transformation parameter is written over the image 401 corresponding to the immediately preceding frame. Namely, of the areas of the image 401, the image of the image 402 is written over an area 410 that overlaps the image 402. Also, of the areas of the image 401, an area 411 that does not overlap the image 402 is synthesized with the image of image 401. Namely, if the image 402 corresponding to the second frame is displayed, an image obtained by synthesizing the entire portion of the image 402 and a portion corresponding to the area 411 in the image 401 is displayed as shown in FIG. 12(b). Also, it is practicable to display, around the current frame, an image frame indicative of the most recent image among the displayed images. In FIG. 12(b), an image frame is displayed around the image 402. Also, the affine transformation parameters used for affine-transforming the image 402 are held in the image conversion block 180.

Next, if the image 403 corresponding to the following frame is synthesized, the image 403 is affine-transformed by use of the affine transformation parameters related with this frame. Namely, the image 403 is affine-transformed by the affine transformation parameters obtained by use of the matrix of affine transformation parameters corresponding to the image 403 and the matrix of affine transformation parameters corresponding to the image 402 used for the immediately preceding affine transformation. To be more specific, let the matrix of affine transformation parameters for the image 403 be A3, the matrix of affine transformation parameters for the image 402 be A2, and the matrix of affine transformation parameters for the image 401 be A1, then A1×A2×A3 is obtained and the image 403 is affine-transformed by the obtained matrix A1×A2×A3 with reference to the position and size of the image 401 of the start frame. In the image shown in FIG. 12(c), only the position of the image 403 is converted. Then, the image 403 affine-transformed by affine transformation parameters is written over the synthesized image of the image 401 and the image 402 corresponding to the preceding frame. Namely, of the areas of the synthesized image of the image 401 and the image 402, areas 413 and 414 that overlap the image 403 are written over by the image of the image 403. Also, of the areas of the synthesized image of the image 401 and the image 402, areas 411 and 412 that do not overlap the image 403, the synthesized image of the image 401 and the image 402 is synthesized. Namely, if the image 403 corresponding to the third frame is synthesized, the whole portion of the image 403, and an image that a portion corresponding to the area 411 of the image 401 and a portion corresponding to the areas 412 of the image 402 is synthesized are displayed as shown in FIG. 12(c). Further, if an image frame indicative of the most recent image among the displayed images is to be displayed around an image corresponding to the current frame, an image frame is displayed around the image 403 shown in FIG. 12(c). Namely, the affine transformation parameters obtained by multiplying the matrixes of the affine transformation parameters corresponding to the images 402 and 403 are held in the image conversion block 180. Thus, in the affine transformation of the image corresponding to the current frame, the image corresponding to the current frame is affine-transformed by use of the affine transformation parameters obtained by use of the matrix the affine transformation parameters corresponding to the current frame and the matrix of the affine transformation parameters corresponding to each frame before the immediately preceding frame. The affine transformation parameters obtained in this affine transformation are held in the image conversion block 180 to be used for a next affine transformation. This holds the same with the examples shown in FIG. 15 and FIG. 18

The following describes a case where magnifications are changed at the image taking by camera with the direction of the lens kept unmoved.

FIG. 13 shows one example of transitions of a moving image taken by camera. FIG. 13 shows images 421 through 423 corresponding to continuous frames included in the moving image in the case where a person 420 was taken with mountains in the background. In this example, an image taking person is taking an image while raising the magnification of the camera lens. In this case, the person 420 included in the moving image being taken by the camera grows in size in images configuring the moving image. It should be noted that, although the camera positions moves a little in raising magnification, this description is made without regard to the movement of camera position.

Figure 14:
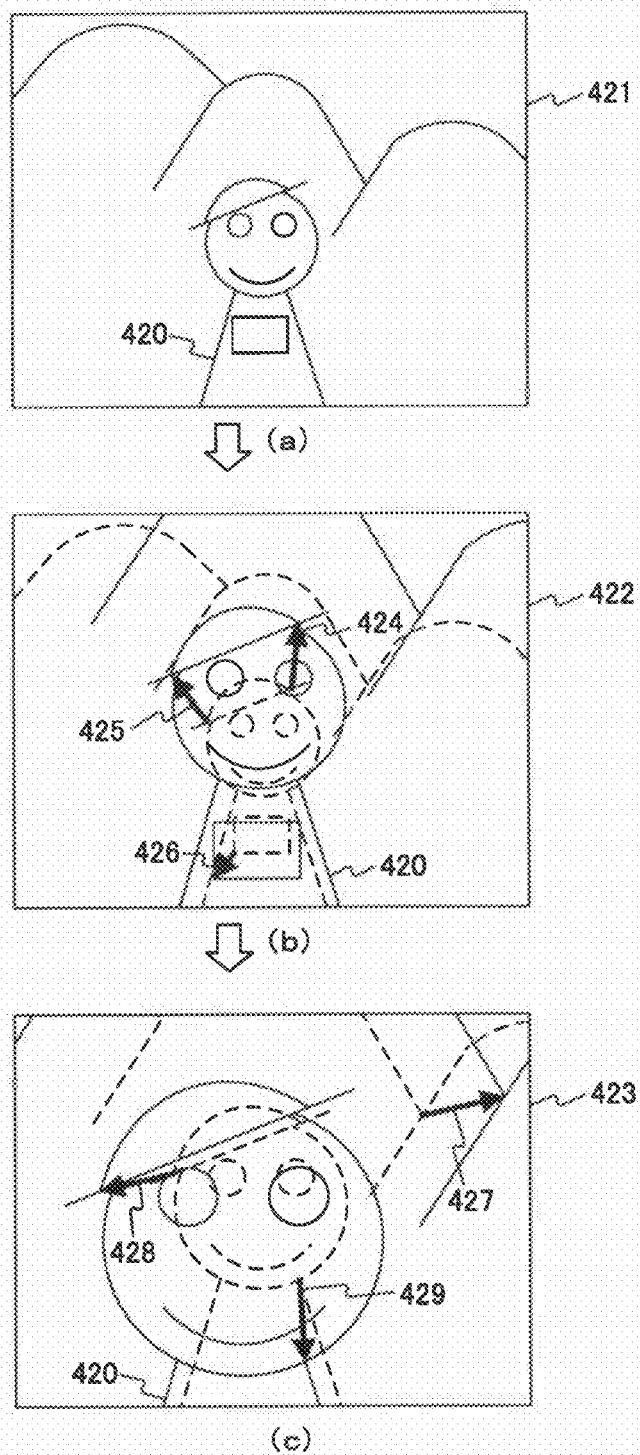
FIG. 14 shows diagrams illustrating, by dashed lines, images corresponding to an immediately preceding frame in each image shown in FIG. 13 and shows one example of an optical flow to be detected.

FIG. 14 shows images in dashed lines corresponding to the immediately preceding frame and shows optical flows to be detected, in each of the images shown in FIG. 13. An image 421 shown in FIG. 14(a) is the same as the image 421 shown in FIG. 13(a). A solid line portion of an image 422 shown in FIG. 14(b) is the same as that of the image 422 shown in FIG. 13(b), a dashed line portion of the image 422 shown in FIG. 14(b) is the same as that of the image 422 shown in FIG. 13(b), and a dashed line portion of the image 422 shown in FIG. 14(b) is the same as that of the image 421 shown in FIG. 13(a). Arrows 424 through 426 in the image 422 shown in FIG. 14(b) are indicative of one example of optical flows detected from the image 422. Likewise, a solid line portion of the image 423 shown in FIG. 14(c) is the same as that of the image 423 shown in FIG. 13(c) and a dashed line portion of the image 423 shown in FIG. 14(c) is the same as the solid line portion of the image 422 shown in FIG. 13(b). Arrows 427 through 429 in the image 423 shown in FIG. 14(c) are indicative of one example of optical flows detected from the image 423.

As shown in FIGS. 14(b) and (c), the sizes of the person 420 and the background mountains included in the image changes in accordance with a change in magnification. On the basis of optical flows to be detected by this change, affine transformation parameters can be obtained for each frame.

Figure 15:
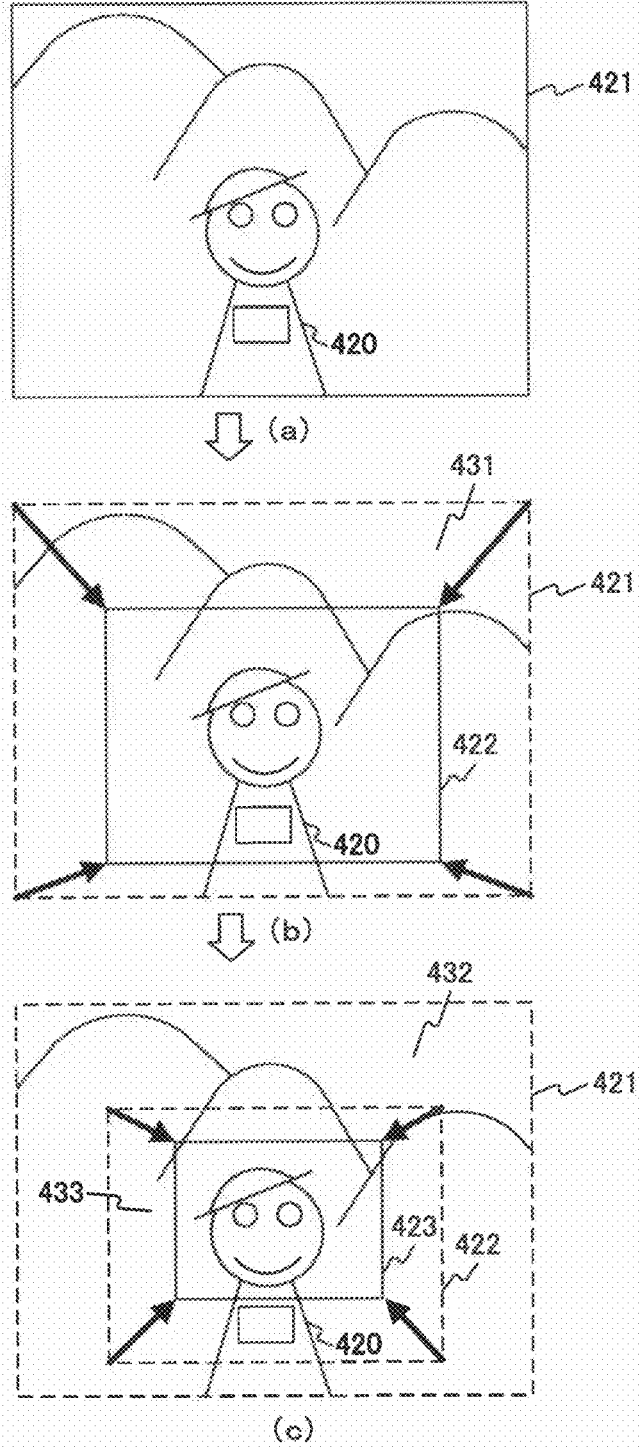
FIG. 15 shows diagrams illustrating an exemplary synthesis in the synthesis of moving images including images 421 through 423 shown in FIG. 13.

FIG. 15 shows an example of display in the case where the image including the images 421 through 423 shown in FIG. 13 is reproduced.

As shown in FIG. 15(a), first, only the image 421 corresponding to the start frame is displayed. Next, if the image 422 corresponding to the following frame is synthesized, the image 422 is affine-transformed by use of the affine transformation parameters related with this frame. In an image shown in FIG. 15(b), only the size of the image 422 is converted. Then, the image 422 affine-transformed by affine transformation parameters is written over the image 421 corresponding to the immediately preceding frame. Namely, of the areas of the image 421, an area overlapping the image 422 is overwritten with the image of the image 422. In this case, because the image 421 overlaps all areas of the image 422, so that the image 421 is overwritten with all images of the image 422. Also, of the areas of the image 421, an area 431 not overlapping the image 422 is synthesized with the image of image 421. Namely, if the image 402 corresponding to the second frame is displayed, an image obtained by synthesizing the entire portion of the image 422 and a portion corresponding to the area 431 in the image 421 is displayed as shown in FIG. 15(b). Also, it is practicable to display, around the current frame, an image frame indicative of the most recent image among the displayed images. In FIG. 15(b), an image frame is displayed around the image 422. Also, the affine transformation parameters used for affine-transforming the image 422 are held in the image conversion block 180.

Next, if the image 423 corresponding to the following frame is synthesized, the image 423 is affine-transformed by use of the affine transformation parameters related with this frame. Namely, the image 423 is affine-transformed by the affine transformation parameters obtained by multiplication of the matrix of affine transformation parameters corresponding to the image 423 and the matrix of affine transformation parameters corresponding to the image 422 used for the immediately preceding affine transformation. In the image shown in FIG. 15(c), only the size of the image 423 is converted. Then, the affine-transformed image 423 is written over the synthesized image of the images 421 and 422 corresponding to the preceding frame. Namely, of the areas of the synthesized image of the images 421 and 422, an area overlapping the image 423 is overwritten with the image of image 423. In this case, the image 423 overlap all areas of images 421 and 422, so that the synthesis image of the images 421 and 422 is overwritten with all images of the image 423. Also, of the areas of the synthesis image of the images 421 and 422, the synthesis image of the images 421 and 422 are synthesized for the areas 432 and 433 not overlapping the image 423. Namely, if the image 423 corresponding to the third frame is synthesized, the whole portion of the image 423, a portion corresponding to the area 432 of the image 421, and a portion corresponding to the area 433 of the image 422 are synthesized as shown in FIG. 15(c). Namely, if the image 423 corresponding to the third frame is displayed, an image obtained by synthesizing the entire portion of the image 423 and a portion corresponding to the area 432 in the image 421 is displayed as shown in FIG. 15(b). Also, it is practicable to display, around the current frame, an image frame indicative of the most recent image among the displayed images. In FIG. 15(b), an image frame is displayed around the image 423. Also, the affine transformation parameters used for affine-transforming the image 423 are held in the image conversion block 180. Namely, the affine transformation parameters obtained by use of the affine transformation parameters each of the images 422 and 423 are held in the image conversion block 180.

The following describes a case in which a camera is rotated around the image taking direction at the time of image taking by the camera with the camera lens direction and magnification kept unchanged.

FIG. 16 shows one example of transitions of moving images taken by the camera. FIG. 16 shows images 441 through 443 corresponding to continuous frames included in the moving image in the case where a person 440 was taken with mountains in the background. In this example, an image taking person is taking an image while rotating the camera around the image taking direction. In this case, the person 440 included in the moving image taken by the camera rotates in the images configuring that moving image. It should be noted that, although the camera positions moves a little by camera rotation, this description is made without regard to the movement of camera position.

Figure 17:
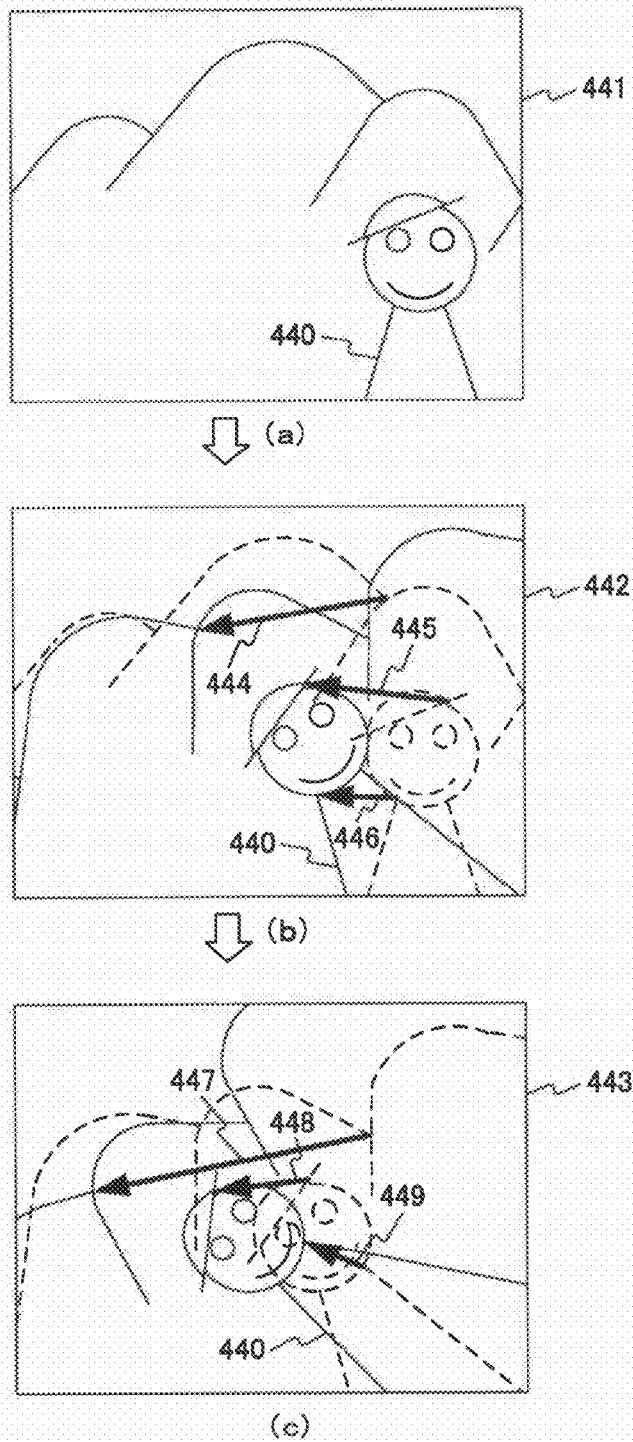
FIG. 17 shows diagrams illustrating, by dashed lines, images corresponding to an immediately preceding frame in each image shown in FIG. 16 and shows an exemplary optical flow to be detected.

FIG. 17 shows images corresponding to the immediately preceding frame by dashed lines in each of the images shown in FIG. 15 and shows one example of optical flows to be detected. An image 441 shown in FIG. 17(a) is the same as the image 441 shown in FIG. 16(a). Also, a solid line portion of an image 442 shown in FIG. 17(b) is the same as that of the image 442 shown in FIG. 16(b) and a dashed line portion of the 442 shown in FIG. 17(b) is the same as the solid line portion of the image 441 shown in FIG. 16(a). Also, arrows 444 through 446 shown in FIG. 17(b) are indicative of optical flows detected from the image 442. Likewise, a solid line portion of the image 443 shown in FIG. 17(c) is the same as that of the image 443 shown in FIG. 16(c) and a dashed line portion of the image 443 shown in FIG. 17(c) is the same as the solid line portion of the image 422 shown in FIG. 16(b). Arrows 447 through 449 in the image 443 shown in FIG. 17(c) are indicative of one example of optical flows detected from the image 443.

As shown in FIGS. 17(b) and (c), the person 440 and the mountains in the background included in the image rotatively move as the camera rotates. On the basis of optical flows detected by this rotational movement, affine transformation parameters can be obtained for each frame.

Figure 18:
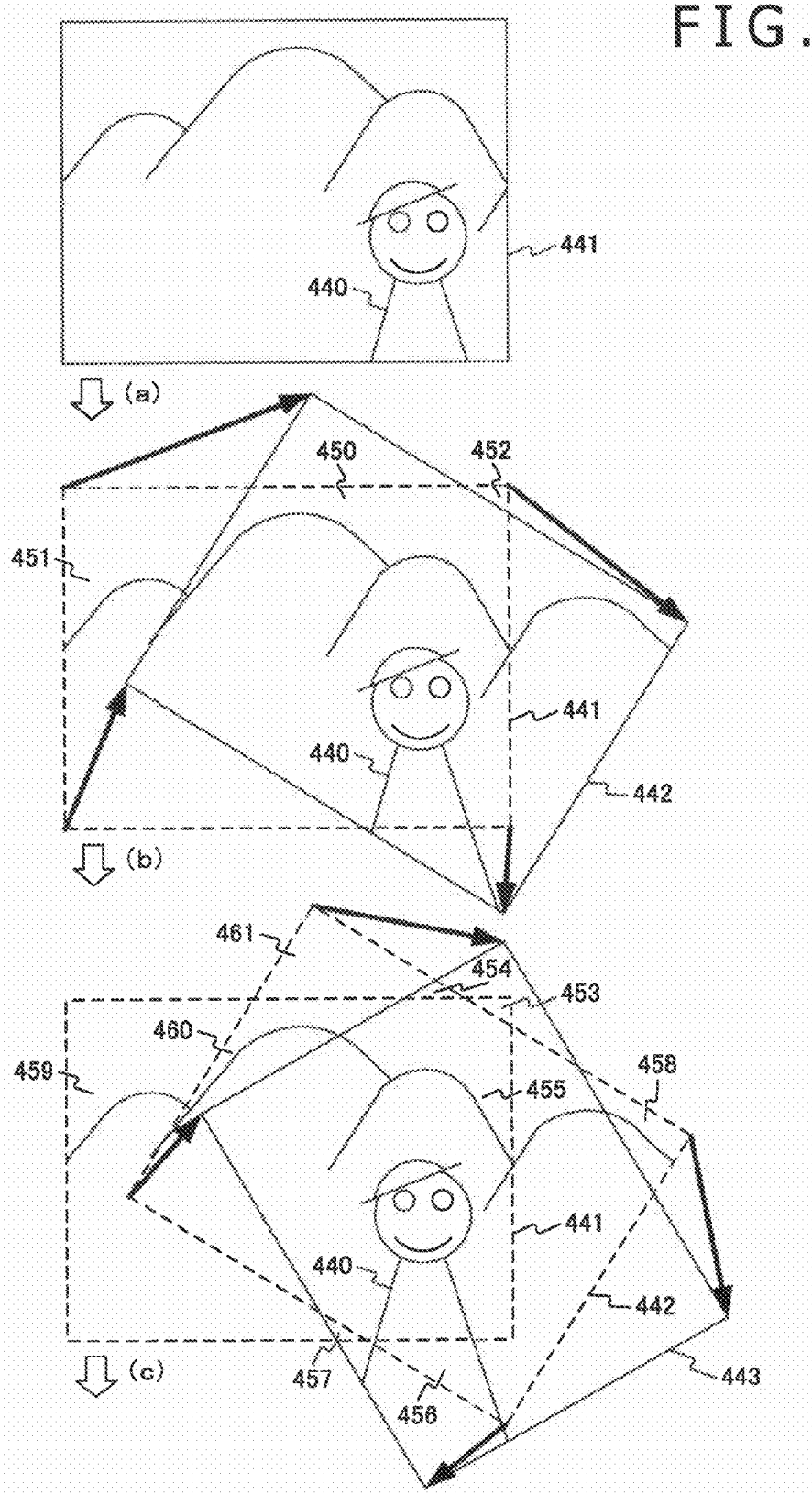
FIG. 18 shows diagrams illustrating an exemplary synthesis in the synthesis of images including images 441 through 443 shown in FIG. 16.

FIG. 18 shows an example of synthesis in the case where a moving image including the images 441 through 443 shown in FIG. 16 is synthesized.

As shown in FIG. 18(a), first, only the image 441 corresponding to the start frame is displayed. Next, if the image 442 corresponding to the following frame is synthesized, the image 442 is affine-transformed by use of the affine transformation parameters related with this frame. In an image shown in FIG. 18(b), only the angle of the image 442 is converted. Then, the image 442 affine-transformed by affine transformation parameters is written over the image 441 corresponding to the immediately preceding frame. Namely, of the areas of the image 441, an area 450 overlapping the image 442 is overwritten with the image of the image 442. Also, of the areas of image 441, the areas 451 and 452 not overlapping the image 442 are synthesized with the image of the image 441. Namely, if the image 442 corresponding to the second frame is displayed, an image obtained by synthesizing the entire portion of the image 442 and a portion corresponding to the area 451 and 452 is displayed as shown in FIG. 18(b). Also, it is practicable to display, around the current frame, an image frame indicative of the most recent image among the displayed images. In FIG. 18(b), an image frame is displayed around the image 442. Also, the affine transformation parameters used for affine-transforming the image 442 are held in the image conversion block 180.

Next, if the image 443 corresponding to the following frame is synthesized, the image 443 is affine-transformed by use of the affine transformation parameters related with this frame. Namely, the image 443 is affine-transformed by the affine transformation parameters obtained by use of the matrix of affine transformation parameters corresponding to the image 443 and the matrix of affine transformation parameters corresponding to the image 442 used for the immediately preceding affine transformation. In the image shown in FIG. 18(c), only the angle of the image 443 is converted. Then, the affine-transformed image 443 is written over the synthesized image of the images 441 and 442 corresponding to the preceding frame. Namely, of the areas of the synthesized image of the images 441 and 442, the areas 453 through 457 overlapping the image 443 are overwritten with the image of image 443. Also, of the areas of the synthesized image of the images 441 and 442, the areas 458 through 461 not overlapping the image 443 are further synthesized with the synthesized image of the images 441 and 442. Namely, if the image 443 corresponding to the third frame is displayed, an image obtained by synthesizing the entire portion of the image 443 and a portion corresponding to the area 459 in the image 441 and a portion corresponding to the area 458 and 461 in the image 442 is displayed as shown in FIG. 18(c). Also, it is practicable to display, around the current frame, an image frame indicative of the most recent image among the displayed images. In FIG. 18(c), an image frame is displayed around the image 443. Also, the affine transformation parameters used for affine-transforming the image 443 are held in the image conversion block 180. Namely, the affine transformation parameters obtained by use of the affine transformation parameters for each of the images 442 and 443 are held in the image conversion block 180.

Figure 19:
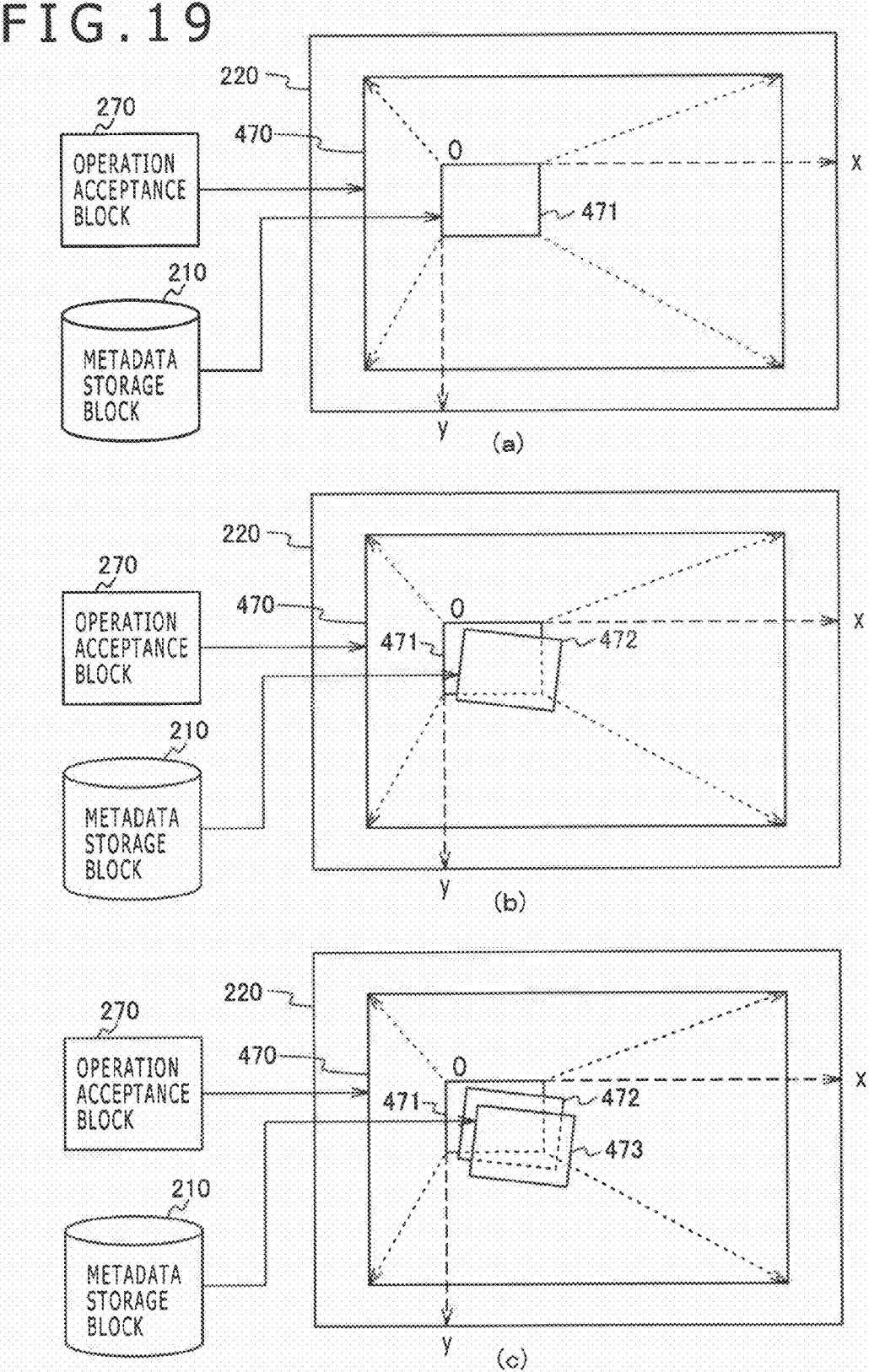
FIG. 19 schematically shows a relation between each frame of a moving image file stored in the moving image storage block 200 in the embodiment of the present invention and a display area.

FIG. 19 schematically shows a relation between each frame of a moving image file stored in the moving image storage block 200 in the embodiment of the present invention and a display area. Here, only the operation acceptance block 270, the metadata storage block 210, and the image memory 220 are illustrated and the other configuration is omitted.

Also, the following description uses an example in which, for frames "1" through "3" configuring the moving image file 201 shown in FIG. 5(b), a synthesized image is created in the image memory 220 by use of the affine transformation parameter 216 stored in the metadata file 211. It should be noted that FIG. 19 shows an example in which one moving image is held in the image memory 220; it is also practicable to hold two or more moving images in the image memory 220 to create a synthesized image.

FIG. 19(a) shows a case in which frame 1 (205) that is the first frame among the frames configuring the moving image file 201 shown in FIG. 5(b) is stored in the image memory 220. For example, as shown in FIG. 19(a), an image 471 corresponding to frame 1 (205) of the moving image file 201 is stored in the image memory 220. Here, the position and size of the image 471, in the image memory 220, corresponding to the first frame may be stored at a predetermined position or at a position specified by the user through the operation acceptance block 270. Alternatively, for example, use of a metadata file related with a moving image to be reproduced, the size of a synthesized image to be created by each frame configuring this moving image may be computed to determine a position at which the image 471 is stored on the basis of this computation. It should be noted that the following description is made on the assumption that an upper left position of the image 471 arranged on the image memory 220 be the origin, the horizontal direction (horizontal axis) be x-axis, and vertical direction (vertical axis) be y-axis.

As shown in FIG. 19(a), a display area with the image 471 arranged on the image memory 220 is a display area 470. The display area 470 may be determined in accordance with a value of display magnification accepted by the operation acceptance block 270 on the basis of the position and size of a synthesized image created by a moving image, for example. For example, the position of the display area 470 for the image 471 may be determined by affine transformation parameters. Namely, if a display magnification "0.5 times" for zooming out the current image is specified, the display area is set by use of affine transformation parameters that double the zoom components in the x-direction and the y-direction. Also, in the case of translating or rotating the display area relative to the current image, the position and range of the display area can be determined by use of affine transformation parameters.

FIG. 19(b) shows a case in which frame 2 (206) among the frames configuring the moving image file 201 shown in FIG. 5(b) is stored in the image memory 220. In this case, as described above, the image 472 corresponding to frame 2 (206) is converted by use of affine transformation parameters 216 stored in the metadata file 211 as related with frame numbers 215 "1" and "2" to be written over the images 471.

FIG. 19(c) shows a case in which frame 3 among the frames configuring the moving image file 201 shown in FIG. 5(b) is stored in the image memory 220. Also in this case, as described above, the image 473 corresponding to frame 3 is converted by use of affine transformation parameters stored in the metadata file 211 as related with frame numbers 215 "1" through "3" to be written over the images 471 and 352.

As described above, displaying images existing in the range of the display area arranged on the image memory 220 allows the synthesized images being reproduced to be sequentially displayed. Here, if the current image is affine-transformed to be synthesized in the image memory 220, resolution conversion processing for converting to a low resolution and compression processing may be executed for picture quality conversion. Hence, if the current image is display in a zoom-in manner by increasing a display magnification, a synthesized image including the current image may be blurred. Therefore, in this example, for the current image being reproduced, a synthesized image is displayed by use of the image before being synthesized in the image memory 220. The following describes in detail this display method with reference to drawings.

Figure 20:
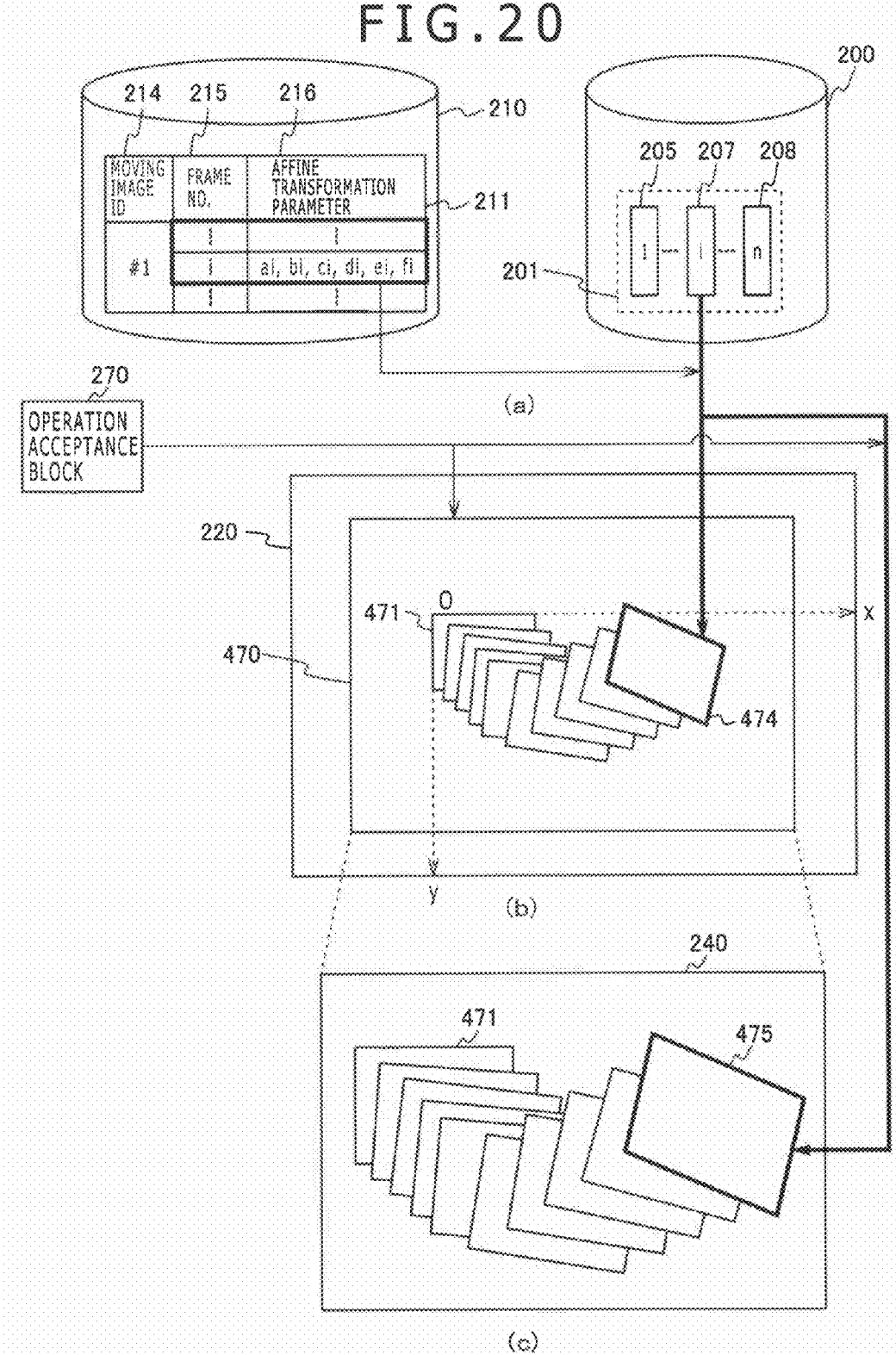
FIG. 20 schematically shows flows of the frames of a moving image file stored in the moving image storage block 200 in the embodiment of the present invention.

FIG. 20 schematically shows flows of the frames of a moving image file stored in the moving image storage block 200 in the embodiment of the present invention. Here, only a relationship of the operation acceptance block 270, the moving image storage block 200, the metadata storage block 210, the image memory 220, and the display memory is illustrated, the illustration of other configurations being omitted. It should be noted that FIG. 20 shows an example in which one moving image is displayed on the display block 260; the synthesis is also executed when two or more moving images are displayed on the display block 260.

FIG. 20(a) shows the moving image file 201 and the metadata file 211 shown in FIG. 5(b) in a simplified manner. In what follows, an example is described in which an image corresponding to frame i (207) configuring the moving image file 201 is displayed. Namely, it is assumed that, for images corresponding to frame 1 through "i−1" configuring the moving image file 201, synthesized images have been already created.

FIG. 20(b) schematically shows the image memory 220 in which the synthesized images with the images corresponding to the frames configuring the moving image file 201 are synthesized are held. As shown in FIG. 19(b), the image 471 corresponding to frame 1 (661) configuring the moving image file 201 is first held in the image memory 220. Then, after the image 471 is held in the image memory 220, the images corresponding to frames 2 through "i−1" configuring the moving image file 201 are sequentially affine-transformed by use of the values of affine transformation parameter 216 stored in the metadata file 211 as related with frames 2 through "i−1" and the affine-transformed images are sequentially written over the image memory 220 to be held therein. Then, from among the synthesized images held in the image memory 220, the display area take-out block 230 takes out the images existing in the display area for each frame.

With the synthesized images by the images corresponding to frame 1 through "i−1" held in the image memory 220, an image corresponding to frames i (207) configuring the moving image file 201 is affine-transformed by use of the affine transformation parameter 216 stored in the metadata file 211 as related with frame 1 through i and the affine-transformed current image 474 is written over the image memory 220 to be held therein. Next, from among the synthesized images held in the image memory 220, the display area take-out block 230 takes images existing in the display area 470 and holds the taken out images in the display memory 240 as shown in FIG. 20(c), for example.

FIG. 20(c) schematically shows the display memory 240 in which the images taken out by the display area take-out block 230 are held. Here, the current image 475 corresponding to the current frame of the images taken out by the display area take-out block 230 is not the current image 474 taken out from the image memory 220 by the display area take-out block 230 but the image affine-transformed by the image conversion block 180 as taken from the moving image storage block 200. Here, the storage position of the current image 475 in the display memory can be determined on the basis of the position and size of the current image 474 in the image memory 220 and the position and size of the display area 470 in the image memory 220. For example, let the matrices of affine transformation parameters stored in the metadata file 211 as related with "1" through "i" of frame number 215 be A1, ... , Ai and the matrix (for example, the matrix with reference to the image memory 220) of affine transformation parameters for determining the display area 470 be C, then, with reference to the position of the image 471, the storage position of the current image 475 in the display memory may be determined by use of Inv (C)×A1× ... ×Ai.

As shown in FIG. 20(*c*), the image taken out by the display area take-out block 230 is held in the display memory 240 and the image taken out of the moving image storage block 200 and affine-transformed by the image conversion block 180 is written over the image taken out by the display area take-out block 230 to be held in the display memory 240. Then, the image held in the display memory 240 is displayed on the display block 260. Thus, for the current image, an image before being held in the image memory 220 after being processed for reduction for example after affine transformation may be used to display a comparatively fine current image. Also, if zoom-in for example was executed by a user operation, the current image can be displayed in a fine state.

As described above, because an image taken out of the moving image storage block 200 and affine-transformed may be used for a current image instead of a synthesized image held in the image memory 220, an image that is comparatively fine can be viewed. The display examples will be described in detail with reference to FIG. 21 and FIG. 22.

FIG. 21(*a*) shows a display example in a case where a moving image taken by a camera is reproduced. In this example, an image 480 is shown in which a moving image is being reproduced taking a parent and a child playing in a turfed garden in front of a large building with a camera being horizontally moved. Here, in the image 480, an image 481 synthesized by images corresponding to frames configuring the moving image is panoramically formed. Also, the image corresponding to the current frame in the image 480 is a current image 482.

Here, a case in which an image area enclosed with a frame 483 is displayed in a zoom-in manner will be described. In zoom-in/zoom-out display of an image displayed on the display block 260, the user can specify a desired display magnification by operating a display magnification specification key on the operation acceptance block 270. For example, as shown in FIG. 21(*a*), if the image 480 is displayed on the display block 260 and the image area enclosed with the frame 483 is displayed in a zoom-in manner, the user can specify a display magnification and a position by operating the display magnification specification key on the operation acceptance block 270, thereby displaying the image area enclosed with the frame 483 in a zoom-in manner.

FIG. 21(*b*) shows an image 484 before the current image 482 in the image 480 is affine-transformed.

FIG. 22(*a*) shows an image 485 in a case where the image area enclosed with the frame 483 shown in FIG. 21(*a*) is displayed in a zoom-in manner. The image 485 shown in FIG. 22(*a*) is an image synthesized in the display memory 240 in a state before the current image after affine transformation is stored in the image memory 220. Thus, in this area of the current image 486, a comparatively fine image before being stored in the image memory 220 is displayed. Hence, when the current image 486 is compared with an area other than this area, the current image 486 that is comparatively finer than another area can be seen. On the other hand, an image 487 shown in FIG. 22(*b*) is an image stored in the display memory 240 in a state where the current image after affine transformation is stored in the image memory 220. If the image is displayed like this, an image about the same as an image of another area is displayed also in an area of an image 488.

Namely, according to the embodiment of the present invention, in executing image synthesis display, a log image held in the display memory 240 may be compressed, but, for a current image, an uncompressed image or an image having a higher resolution than that of the log image may be used, thereby realizing image synthesis display of high picture quality.

The following describes a display example in which a moving image actually taken by a camera is synthesized and reproduced. In the display example shown below, among the display areas of the display block 260, a synthesized image is displayed only in an area in which images corresponding to a current frame or a preceding frame configuring at least any one of the moving images and the other areas are blackened. Also, the image corresponding to the current image is framed. It should be noted that in the display example shown below, a display example halfway in the reproduction of one moving image is shown. Further, actually, synthesized images are sequentially displayed for each frame; however, in the figure, display examples at the predetermined number of frame intervals are shown and the illustration of synthesized images displayed between these frames is omitted. Hence, in the figure, the movement of the frame corresponding to the current frame is large.

FIGS. 23 through 26 show examples of transitions of a moving image taken by a camera. In these figures, images 730 through 741 configuring a moving image are shown in which the moving image of a parent and a child playing in a turfed garden in front of a large building were taken by moving the camera mainly in the horizontal direction. It should be noted that this moving image is the same as the moving image shown in FIG. 21 and FIG. 22.

In the images 730 through 741 shown in these figures, the image corresponding to the current frame is an image 750. It should be noted that in the images 730 through 741 shown in these figures, the current image is denoted by the same reference numeral 750 even if there is a difference between synthesized images. As shown in these figures, image-taking subjects (the turfed garden and so on) included in a taken image are fixed to the screen and the image 750 corresponding to the current frame moves on the screen as the camera moves. Displaying like this allows the viewer to see that the current image corresponding to the current frame goes in accordance with the movement of the camera in the display area shown black on the display block 260. Also, in the case that the current image moves on a synthesized image, the position on the synthesized image and the position of the current image move in accordance.

In the above description, reproduction examples have been mainly used in which, in the reproduction of a moving image, images configuring the moving image are synthesized by converting these images by use of affine transformation parameters. Consequently, moving images of any type can be reproduced for viewing in a panoramically developed state.

However, some moving image types and some detected affine transformation parameters may not allow proper synthesis for reproduction by panoramically developing a moving image. For example, moving images subject to reproduction may include a moving image (an unedited moving image) not edited from a state taken by a camera and a moving image (an edited moving image) edited after being taken by a camera. Unedited moving images may include a moving image including a portion with a part or all thereof being out of focus, a moving image including a portion in which an unwanted person abruptly crossed before the camera during image taking, a moving image including in an image a drastic movement of the camera during image taking, or a moving image in which another scene is taken with the image-taken moving image record button pressed, for example. Also, edited moving images may include a moving image in which different scenes are linked by editing, for example.

For example, if an unedited moving image is out of focus or the camera and so on drastically moved during image taking, the proper detection of affine transformation parameters cannot be executed, possibly resulting in the error detection of affine transformation parameters. If the error detection of affine transformation parameters is done in this manner, proper conversion of images cannot be executed. Also, for example, if different scenes are linked by editing in an edited moving image, it is possible that these different scenes are developed or synthesized as one synthesized image. Therefore, in the embodiment of the present invention, in the synthesized reproduction of a moving image, the correction of affine transformation parameters or the division of a synthesized image may be executed on the basis of a feature quantity extracted from each image configuring the moving image, thereby properly synthesizingly reproducing by panoramically developing moving images of more types for the enjoyment of synthesized reproduction.

First, the correction of affine transformation parameters will be described. In the embodiment of the present invention, the correction of affine transformation parameters is executed if the feature quantity extracted from each image configuring a moving image satisfies a predetermined condition. Consequently, the conversion of an image in a large size at a position completely separate from the movement of a camera can be suppressed and the quality of a synthesized image eventually formed panoramically can be enhanced. Here, the predetermined condition associated with the correction of affine transformation parameters is that a scene change score is higher than a threshold value or at least one of the components of camera work is higher than a threshold value, for example. Also, the condition may be the satisfaction of these two requirements at the same time. Here, at a position where a scene change point is determined, the error detection of affine transformation parameters is possible, so that the correction can prevent the failure as a synthesized image.

Further, for the affine transformation parameter correction method includes a method of correction by the replacement with a unit matrix or a method of correction by a matrix (for example, a linear interpolation matrix) that suppresses camera work speed. Consequently, high-speed camera work can be suppressed to enhance the viewability of a moving image. Also, even if the error detection of affine transformation parameters is made, the influence on the synthesis of images subject to an image associated with this error detection can be suppressed. It should be noted that the affine transformation parameter correction method will be described in detail with reference to FIG. 27.

It should be noted that, as far as the viewability as a moving image is not lost, it may be desirable for some applications not to correct affine transformation parameters as long as possible, including high-speed camera work. Therefore, it is also practicable to make setting to disable the correcting in response to an operation input from the operation acceptance block 270.

The following describes a case of dividing a synthesized image. In the embodiment of the present invention, if a feature quantity extracted from each image configuring a moving image satisfies a predetermined condition, a synthesized image is provided that is different from a synthesized image formed by preceding images. Consequently, a discontinuous moving image can be separated, thereby preventing the forming of inconsistent synthesized images. Also, because the images corresponding to scenes can be dispersed, the moving image search ranging over a long time can be easily done.

Here, predetermined conditions associated with the division of synthesized images may include that a scene change score is over a threshold value, at least one of the components of camera work is over a threshold value, at least one of the average values of camera work components is over a threshold value, at least one of the integrated values of camera work components is over a threshold value (threshold determination of zoom-in/zoom-out ratio, threshold determination of panning or tilting angle, and so on), or a reproduction time from the start frame (here, the first frame after division is included) is over a threshold value. It is also practicable that the predetermined condition is the satisfaction of at least two of these requirements. It should be noted that the synthesized image division method will be described in detail with reference to FIG. 28 through FIG. 30.

The following describes in detail the above-mentioned predetermined conditions associated with the division of synthesized images.

For example, if a scene change score of over a threshold value, it can be determined that a position corresponding to that scene change score is a scene change point. Thus, the position determined to be a scene change point may be a cut point (edit point) or a position at which a subject showed a great change although in a same scene. Therefore, dividing an image corresponding to the position determined to be a scene change point can prevent the forming of a synthesized image with entirely different subjects synthesized.

Also, if the components of camera work are used for a condition in the case of dividing a synthesized image, it is preferable to components of camera work over a comparatively long time rather than instantaneous camera work components. Namely, it is preferable to use an average value (a value to which a lowpass filter was applied) of the components for the past several frames rather than the components of camera work associated with one frame to execute threshold determination. This can prevent excessive division. Further, if camera work has a movement for a certain continuous time, a case in which transition to a next scene can be assumed with the taken moving image record button (the REC button) pressed, so that the position of division can be correctly determined.

Also, excessive division can be prevented by using a condition for synthesized image division that a scene change score is over a threshold value or at least one of the average values of camera work components is over a threshold value, for example.

Also, an integrated value of zoom components of the integrated values of camera work components is a variation amount of zoom-in/zoom-out component of camera work components corresponding to the current frame for the start frame (here, the first frame after division is included) configuring a moving image and this integrated value of zoom components can be used for threshold determination. For example, if zoom-in operations are excessively done at the time of image taking by a camera, the current image in a synthesized image being synthesized for reproduction may become too small, thereby possibly making the current image difficult to see. Therefore, if a variation amount of the zoom-in/zoom-out components of camera work components become large, providing a new synthesized image obtained by dividing a synthesized image can make the moving image associated with synthesized reproduction easy to view. Also, in the case of image taking by following a certain subject from the rear over a long period of time for example, the same effects as a zoom-in operation of the camera is obtained.

Therefore, by executing the similar division processing can make a moving image associated with synthesized reproduction easy to view.

Further, an integrated value of translation components of the integrated values of camera work components is a variation amount of the translation components of the camera work components corresponding to the current frame for the start frame (here, the first frame after division is included) configuring a moving image and this integrated value of translation components can be used for threshold determination. It should be noted that this integrated value of translation components may be considered as a panning angle or a tilting angle. For example, in the actual image taking by a camera, it is difficult to make a distinction between the case where an image taking person holding a camera takes an image by rotating the image taking person and the case where an image taking person holding a camera directed in one direction takes an image by moving sideways. However, the rotational angle of the camera in the case where the image taking person rotates for image taking is reflected to the size of a synthesized image. Hence, the division processing can be executed by assuming that a panning angle or a tilting angle be the same as a translation component. For example, if panning operations are excessively executed in the image taking by a camera, a synthesized image during synthesized reproduction may become too horizontally long. On the other hand, if tilting operations are excessively executed in the image taking by a camera, a synthesized image during synthesized reproduction may become too vertically long. Hence, it is possible that an image corresponding to the current frame or a synthesized image is difficult to see. Therefore, if a variation amount of the translation components of camera work components becomes large, providing a new synthesized image obtained by dividing a synthesized image can make a moving image associated with the synthesized reproduction easy to view.

The following describes the case in which the condition to be satisfied is that a reproduction time from the start frame (here, the first frame after division is included) is over a threshold value. For example, if a moving image taken for a long time is displayed as one panoramic synthesized image and the image taking range in an image taking space is especially narrow, many frame overlaps occur, thereby possibly losing an amount of information associated with that moving image. For example, if many frame overlaps occur, images comparatively late in reproduction time are written over images comparatively early in reproduction time. Hence, the image comparatively early in reproduction time may not be displayed as included in a synthesized image, thereby deteriorating the functionality as an index of synthesized images and viewability. Therefore, forcibly dividing a synthesized image for a certain period of time (for example, 5 minutes) can enhance the functionality as an index of synthesized images and the viewability of synthesized images.

It should be noted that, if the time for the division interval of a synthesized image is too short, the viewability as a moving image may lower, so that a minimum reproduction time (for example, 5 seconds) may be set. Namely, if the above-mentioned predetermined condition associated with the division of a synthesized image is satisfied, no division processing is executed within a range of a minimum reproduction time after the division of a synthesized image.

Thus, by separating a synthesized image at a discontinuous point or the like of a scene in a moving image, the function as an index of synthesized images to be displayed can be enhanced and the viewability of each synthesized image can be enhanced by providing consistency as a moving image.

It should be noted that, on the basis of each element, these division determinations may be executed independently or the division may be made only when two or more elements satisfy the condition at the same time. Also, for example, in the detection of affine transformation parameters for each image configuring a moving image, detection results that the correspondence between feature points cannot be obtained and so on may be stored in the metadata storage block 210 as related with frames and, on the basis of these detection results, whether or not the correction or division is necessary may be determined. Namely, if a threshold value is exceeded but the detection results show normal detection, the correction may be determined to be unnecessary.

The following describes in detail an example in which a part of the affine transformation parameters related with images is corrected to create a synthesized image, with reference to drawings.

FIG. 27 schematically shows a case in which images 501 through 517 configuring a moving image file 500 have been synthesized. FIG. 27(*a*) shows a case in which the images 501 through 517 have been synthesized by use of the affine transformation parameters related with the images 501 through 517, and FIGS. 27 (*b*) and (*c*) show examples in which the images 501 through 517 have been synthesized by use of the affine transformation parameters with a part of the affine transformation parameters related with the images 501 through 517 corrected.

In these figures, an example is used in which, in the images 501 through 517 configuring the moving image file 500, a man abruptly crossed in front of the camera during image taking of a section of images 508 through 510 internally indicated by hatching, so that proper affine transformation parameters could not be obtained for the images 508 through 510. It is also assumed that, in the images 501 through 517, at least one of the translation component and the rotation component of the components of camera work corresponding to the image 508 through 510 is over a threshold value, the images 508 through 510 satisfying the above-mentioned correction condition.

Thus, if the images 508 through 510 are affine-transformed by use of the affine transformation parameters related with the images 508 through 510 with at least one of the translation component and the rotation component of the components of camera work exceeding a threshold value, it is possible that the images 508 through 510 are converted regardless of the movement of the camera. For example, as shown in FIG. 27(*a*), regardless of the movement of the camera, the images 508 through 510 may be converter larger than the conversion amount of other images. In such a case, in the synthesized image formed by the images 501 through 517, a part of the images 508 through 510 is largely different from a part of the actual subject, thereby making it highly possible that the synthesized image being reproduced and the synthesized image to be finally formed are difficult to see. Hence, if the above-mentioned correction condition is satisfied, correcting the affine transformation parameters thereof allows to prevent the synthesized image from being largely different from the part of actual subject, thereby making the synthesized image being reproduced and the synthesized image to be finally formed easy to view.

For this affine transformation parameter correction method, a correction method of correcting a matrix of affine transformation parameters to a unit matrix and a correction method of executing linear interpolation on the basis of a matrix of affine transformation parameters related with the images in cross direction are described in the embodiment of the present invention.

First, the correction method of correcting a matrix of affine transformation parameters to a unit matrix will be described. For example, let three continuous images be images n−1 through n+1 and a matrix of the affine transformation parameters related with the images be Rn−1, Rn, Rn+1; then, if a feature amount associated with image n satisfies the correction condition, the conversion information correction block 160 makes correction to Rn=E (unit matrix). For example, as shown in FIG. 27(a), if at least one of the translation component and the rotation component of the components of camera work corresponding to the images 508 through 510 is over a threshold value, the conversion information correction block 160 corrects the matrix of these affine transformation parameters to a unit matrix. Then, the images 508 through 510 are converted by the unit matrix after correction.

Thus, because the images 508 through 510 are converted by use of a unit matrix, the images 508 through 510 are not actually converted when seen with reference to the image 507, thereby being synthesized at the same position of the image 507 immediately before. Namely, as shown in FIG. 27(b), the images 508 through 510 are written over the position of the image 507 internally indicated by hatching. It should be noted that the image 511 immediately after the image 510 is normally converted by use of the affine transformation parameters related with the image 511.

The following describes the correction method of executing linear interpolation on the basis of a matrix of affine transformation parameters related with images in cross direction. For example, let three continuous images be images n−1 through n+1 and a matrix of affine transformation parameters related with the images be Rn−1, Rn, Rn+1; then, if a feature amount associated with image n satisfies the correction condition and a feature amount associated with images n−1, n+1 does not satisfy the correction condition, the conversion information correction block 160 makes correction to Rn={(Rn−1)+(Rn+1)}/2. Also, for example, let five continuous images be images n−2 through n+2 and a matrix of affine transformation parameters associated with the images be Rn−2 through Rn+2; then if a feature amount associated with images n−1, n, n+1 satisfies the correction condition and a feature amount associated with images n−2, n+2 does not satisfy the correction condition, the conversion information correction block 160 makes correction to Rn−1, Rn, Rn+1={(Rn−2)+(Rn+2)}/2. Namely, the correction is made by use of an average value of the matrices of the affine transformation parameters associated with the two images located before and after the image with the feature amount thereof satisfying the correction condition for example as a linear interpolation matrix. Also, if images of which feature amounts satisfy the correction condition continue, the preceding image that is the image located before these continuous images and the succeeding image that is the image located after these continuous images are extracted. It should be noted that the preceding image and the succeeding image are the images adjacent in cross direction to the above-mentioned continuous images among the images of which feature amounts do not satisfy the correction condition. Then, correction is made by use of an average value of the matrices of the affine transformation parameters associated with the extracted preceding image and succeeding image.

For example, let the matrices of the affine transformation parameters associated with the images 507 through 511 be A7 through A11, then, if at least one of the translation component and the rotation component of the components of camera work corresponding to the images 508 through 510 is over a threshold value as shown in FIG. 27(a), the conversion information correction block 160 computes a linear interpolation matrix ((A7+A11)/2) by use of the matrices A7, A11 associated with the images 507 and 511 located before and after the images 508 through 510, thereby making correction to A8 through A10=(A7+A11)/2 on the basis of this linear interpolation matrix. Then, the images 508 through 510 are sequentially converted by matrix ((A7+A11)/2) after correction.

Namely, because the images 508 through 510 are converted by use of a linear interpolation matrix, the images 508 through 510 are converted by an average value of the conversion amounts of the image 507 and the image 511 located before and after the images 508 through 510 and, as shown in FIG. 27(c) for example, the converted images are written over the image 507 internally indicated by hatching, thereby sequentially synthesizing the images 508 through 510. Next, normal conversion is executed on the image 511 immediately after the image 510 by use of the affine transformation parameters associated with the image 511.

Thus, in the conversion of images satisfying the correction condition, correcting the affine transformation parameters thereof allows easy viewing of a synthesized image being reproduced or a created synthesized image. For example, in the images 501 through 517 shown in FIG. 27(a), if the affine transformation parameters associated with the images 508 through 510 are unlikely affine transformation parameters (if the feature amount is over a threshold value), the images 507 through 517 are converted in the direction different from the movement of the camera. For this, correcting the affine transformation parameters associated with the images 508 through 510 can prevent the conversion of the images 507 through 517 in a direction different from the movement of the camera, thereby making a synthesized image being reproduced or a created synthesized image easy to view.

It should be noted that, in the embodiment of the present invention, the case in which an affine transformation matrix is corrected to a unit matrix or the case in which an affine transformation matrix is corrected to a linear interpolation matrix was described for the correction method of correcting affine transformation parameters; it is also practicable to compute an average value of matrices after addition by sequentially adding the matrices of affine transformation parameters related with the images up to the predetermined number of the images subject to correction, thereby making the correction to this matrix of average values, for example.

The following describes in detail an example in which, if the division is determined to be necessary, a synthesized image different from a synthesized image created by a preceding image is created, with reference to drawings.

Figure 28:
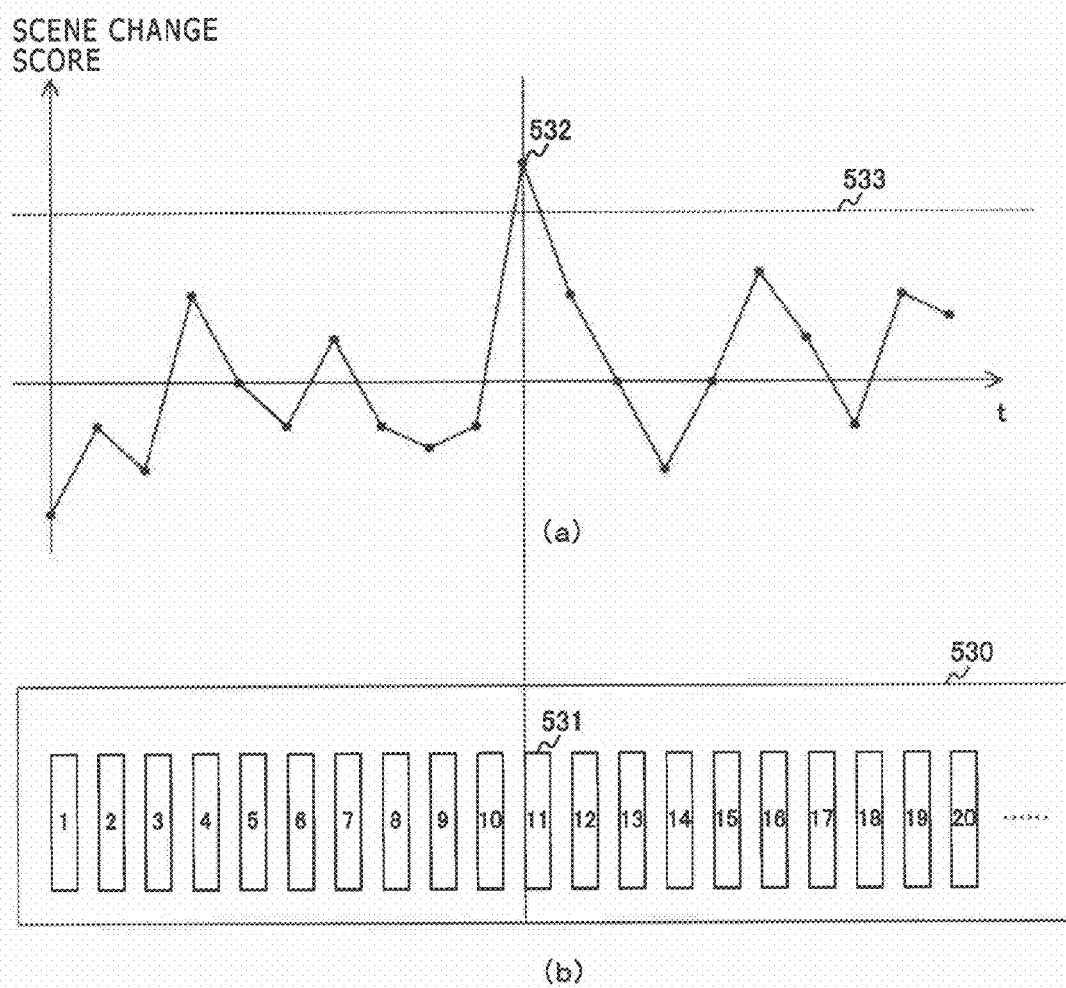
FIG. 28 schematically shows a relation between each frame configuring a moving image and a scene change score computed for each frame.

FIG. 28 schematically shows a relation between each frame configuring a moving image and a scene change score computed for each frame. A graph shown in FIG. 28(a) is indicative, in a time sequence, of scene change scores computed for each frame configuring a moving image, the horizontal axis indicative of image taking time and the vertical axis indicative of scene change score. In addition, a dotted line 533 is indicative of a threshold value for determining whether an image corresponding to each frame corresponds to a scene change point. Namely, if a scene change score is over the dotted line 533, the image corresponding to this scene change score is determined to be an image corresponding to the scene change point. For example, of the frames 1 through 20 configuring a moving image 530, the position indicative of a scene change score computed for the frame 11 (531) is indicated by a point 532. In this case, the point 532 is over a point 533, so that the image corresponding to the frame 11 (531) is determined to be corresponding to the scene change point. It should be noted that, of the frames 1 through 20, the scene change scores other than that of the frame 11

(531) are below the dotted line 533, so that the image is determined not to be an image corresponding to the scene change point. It should be noted that this scene change score determination is executed by the conversion information correction block 160 and the synthesized image division decision block 170.

Figure 29:
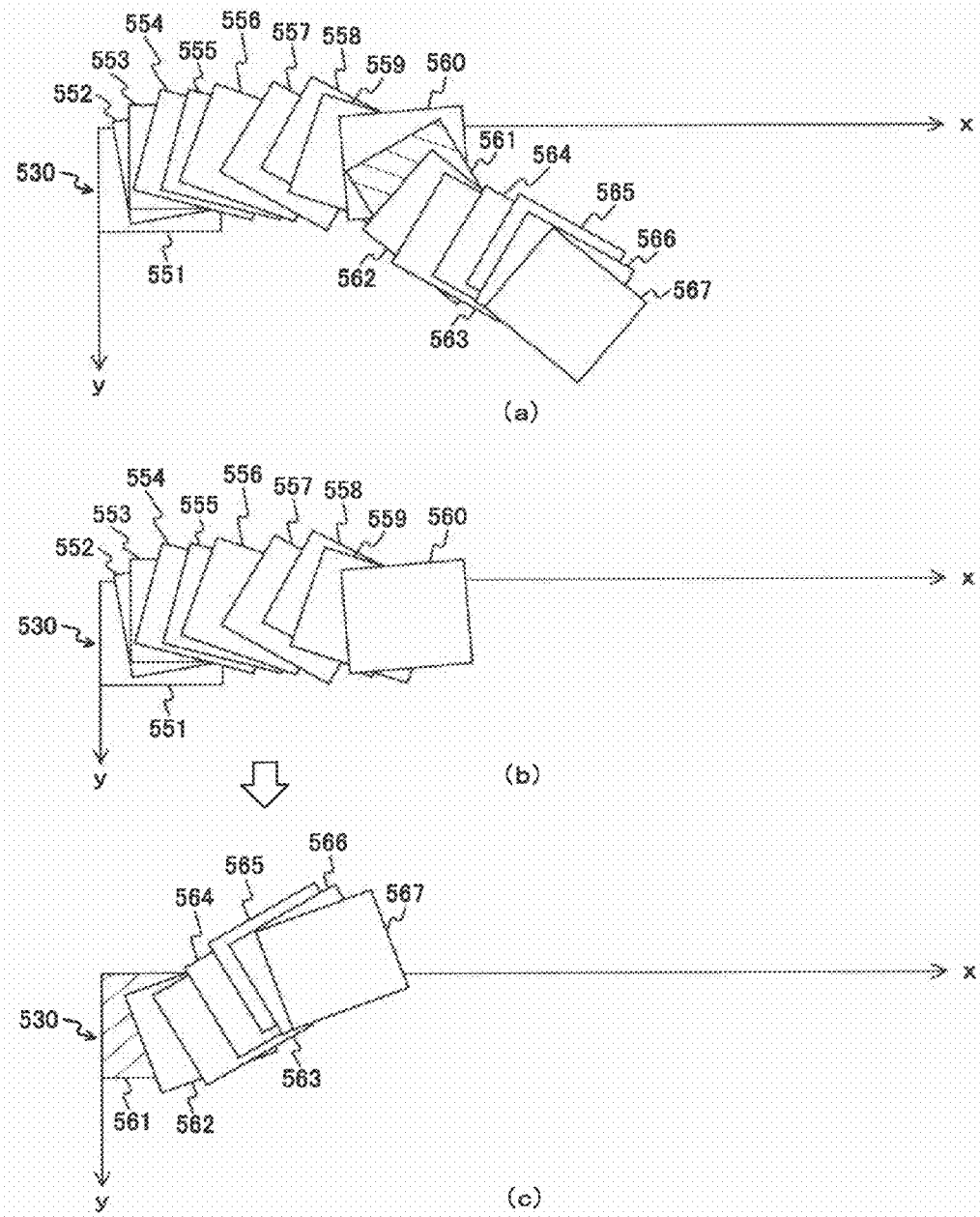
FIG. 29 schematically shows a case in which images 551 through 567 configuring the moving image 530 have been synthesized.

FIG. 29 schematically shows a case in which images 551 through 567 configuring the moving image 530 shown in FIG. 28(b) have been synthesized. FIG. 29(a) shows a case in which the images 551 through 567 have been synthesized by use of the affine transformation parameters associated with the images 551 through 567 and FIGS. 29(b) and (c) show transitions in a case where a part of the images 551 through 567 is divided for synthesis. It should be noted that the images 551 through 567 configuring the moving image 530 shown in FIG. 29 are the images corresponding to the frames 1 through 17 shown in FIG. 28(b) and the image 561 internally indicated by hatching is an image corresponding to the frame 11 (531) shown in FIG. 28(b). Namely, the image 561 is an image corresponding to a scene change point. Also, it is assumed that at least one of the average values of the camera work components corresponding to the image 561 be over a threshold value. Here, in this example, if the scene change score corresponding to the current image is over a threshold value and at least one of the average values of the camera work components is over a threshold value, the current image is not converted by use of the affine transformation parameters related with this current image, a synthesized image being newly created separate from the current synthesized image.

As shown in FIG. 28(a), if it is determined that the scene change score computed in the frame 11 (531) is over a threshold value and the image 561 is an image corresponding to the scene change point, it is highly possible that the image 561, although included in the moving image 530, is an image taken in a scene different from the images 551 through 560. Also, it is highly possible that the images 562 through 567 after the image 561, although taken in the same scene as the image 561, are images taken in a scene different from the images 551 through 560. In this case, as shown in FIG. 29(a), if the images 561 through 567 taken in a scene different from the images 551 through 560 are written over the images 551 through 560 for synthesis, a synthesized image including two different scenes is formed, so that the two different scenes are synthesized at unrelated positions, possibly making it difficult for viewers to see. Also, because at least one of the average values of the camera work components corresponding to the image 561 is over a threshold value, a movement higher than a certain level is detected with respect to the predetermined number of frames.

Therefore, as shown in FIG. 29(b), if the current image becomes the image 561 satisfying the division condition after the synthesized reproduction has been made up to the image 560, the images 551 through 560 are erased as shown in FIG. 29(c), the image 561 being held at the position of holding the start frame. Then, the images 562 through 567 subsequent to the image 561 are sequentially synthesized. In this example, it is described that, if the current image satisfies the division condition, the synthesized image formed by images before the current image is erased and the synthesized reproduction starts from the current image; however it is also practicable to execute the synthesized reproduction from the current image with the synthesized image formed by images before the current image displayed. Namely, every time a scene change is executed, positions at which a moving image is synthesized may be changed to sequentially create synthesized images. This division processing is shown in FIG. 30.

Figure 30:
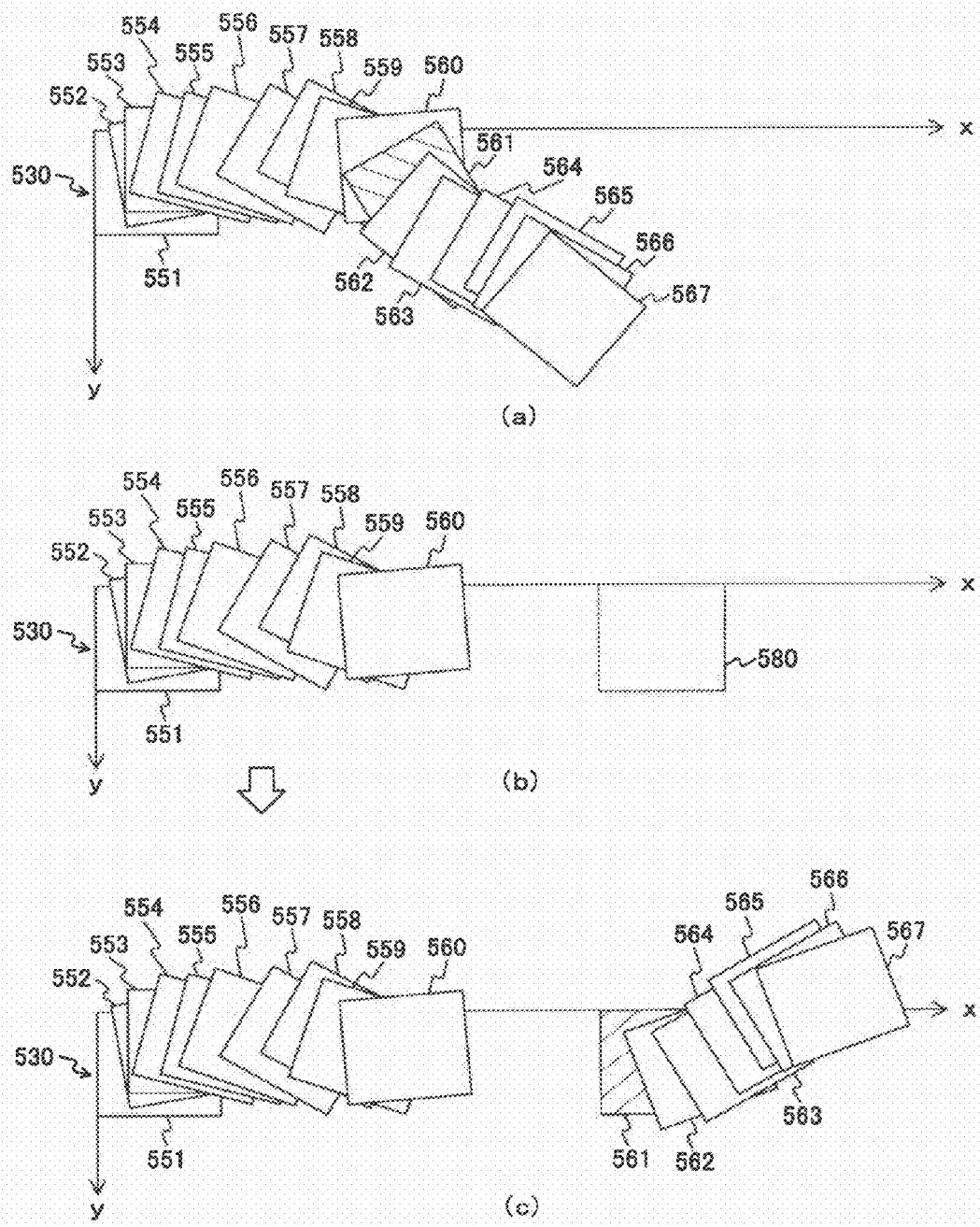
FIG. 30 schematically shows a case in which the images 551 through 567 configuring the moving image 530 have been synthesized.

FIG. 30 schematically shows a case in which the images 551 through 567 configuring the moving image 530 shown in FIG. 28(b) have been synthesized. It should be noted that a synthesized image shown in FIG. 30(a) is the same as the synthesized image shown in FIG. 29(a). FIGS. 30(b) and (c) show that a part of the images 551 through 567 is divided for synthesis, being indicative of a transition in the case where a synthesized image before division is left. It should be noted that this processing is the same as shown in FIG. 29 except that a synthesized image before division is left and the current image is arranged at a position different from the position of the synthesized image before division.

As shown in FIG. 30(b), the arrangement position of an image corresponding to the start frame configuring a moving image is set to the origin of xy coordinates and the arrangement position of an image satisfying the division condition is set as an arrangement position 580 on xy coordinates. Then, as shown in FIG. 30(b), if the current image becomes the image 561 satisfying the division condition after the synthesized reproduction has been executed up to the image 560, the image 561 is held at the arrangement position 580 different from the position of the synthesized image formed by the images 551 through 560 as shown in FIG. 30(c). Next, the images 562 through 567 after the image 561 are sequentially synthesized with the synthesized image formed by the images 551 through 560 left. It should be noted that it is also practicable to set beforehand a holding position of an image satisfying the division condition or determine the arrangement position on the basis of the size of the synthesized image such that the arrangement position is different from that of an already formed synthesized image. Further, FIG. 30 describes an example of setting the right side of an already formed synthesized image for the holding position of an image satisfying the division condition; it is also practicable to set another direction as the holding position.

The following shows a display example of a synthesized image formed by a moving image actually taken by a camera.

FIG. 31 and FIG. 32 show examples of synthesized images formed by a moving image taken by a camera. FIG. 31 shows synthesized images 590, 592, 593 formed by a moving image in the case where, when an image taking person inside a building is taking an image outdoors through a window, the image taking person changes the direction of the camera to the left side by a comparatively speedy panning operation to take an image indoors. Namely, in the synthesized image 590, the image on the right side is a comparatively early image and, to the left side, the images are later. In addition, a part of an image enclosed by a dotted-line circle 591 shown in FIG. 31(a) is a part in which the camera direction was changed by a comparatively speedy panning operation. Thus, if the camera direction was changed by a comparatively speedy panning operation, it is sometimes difficult to properly detect the affine transformation parameters at the position where that panning operation was executed, so that the subjects before and after the panning operation may be synthesized regardless of the image taking space. For example, as shown in FIG. 31(a), the outdoor subject and the indoor subject that are actually apart from each other are synthesized by the part enclosed by the dotted-line circle 591. Therefore, executing the above-mentioned division of the synthesized image or the above-mentioned correction of affine transformation parameters allows the creation of a synthesized image in accordance with subjects. It should be noted that, in this example, it is assumed that the affine transformation parameter correction condition and the synthesized image division condition be satisfied in the portion of an image enclosed by the dotted-line circle 591 shown in FIG. 31(a).

FIGS. 31(b) and (c) show transitions in the case where the above-mentioned synthesized image division was executed. It should be noted that the synthesized image 529 shown in FIG. 31(b) is a synthesized image corresponding to the right-side part of the synthesized image 590 shown in FIG. 31(a). Here, halfway in the forming of the synthesized image 592 shown in FIG. 31(b), the synthesized image division condition is satisfied in the image part enclosed by the dotted-line circle 591 shown in FIG. 31(a), so that the synthesized image 592 shown in FIG. 31(b) is erased. Then, the image satisfying the synthesized image division condition is displayed at the arrangement position of the start frame and the subsequent images are sequentially synthesized to form the synthesized image 593. Thus, in the case where a moving image including different scenes is synthesized for reproduction, if a change occurs from the first scene to another scene, another synthesized image different from the first scene can be reproduced to allow the user to view a synthesized image in accordance with the scene. It should be noted that, in this example, an already formed synthesized image is erased and then another synthesized image is reproduced; it is also practicable to reproduce another synthesized image with an already formed synthesized image left.

FIG. 32 shows synthesized images 590, 594, 595 formed by a moving image in the case where, when an image taking person inside a building is taking an image outdoors through a window, the image taking person changes the direction of the camera to the left side by a comparatively speedy panning operation to take an image indoors, like the case shown in FIG. 31. It should be noted that the synthesized image 590 and the dotted-line circle 591 are the same as shown in FIG. 31(a).

FIGS. 32(b) and (c) show transitions of display in the case where the above-mentioned affine transformation parameter correction and synthesized image division were executed. It should be noted that the synthesized image 594 shown in FIG. 32(b) is a synthesized image corresponding to the right-side part of the synthesized image 590 shown in FIG. 32(a). Here, halfway in the forming of the synthesized image 594 shown in FIG. 32(b), the affine transformation parameter correction condition and the synthesized image division condition are satisfied in the image part enclosed by the dotted-line circle 591 shown in FIG. 32(a), so that the affine transformation parameter correction is executed, but the synthesized image 594 shown in FIG. 32(b) is erased. Then, the image satisfying the synthesized image division condition is displayed at the arrangement position of the start frame and the subsequent images are sequentially synthesized to form the synthesized image 595. In this case, immediately after the division, if the synthesized image division condition is satisfied, no division is executed, but, if the affine transformation parameter correction condition is satisfied, the affine transformation parameters are sequentially corrected. Thus, the synthesized image 595 shown in FIG. 32(c) is different from the synthesized image 593 shown in FIG. 31(c) because the affine transformation parameter correction was sequentially executed. Namely, because the affine transformation parameter correction was executed in the left-side part of the image enclosed by the dotted-line circle 591 shown in FIG. 32(a), the change in the horizontal direction can be reduced as compared with the synthesized image 593 shown in FIG. 31(c), thereby properly correcting the image part in which a comparatively speedy panning operation was done.

It should be noted that, with the synthesized images 593, 595 shown in FIG. 31(c) and FIG. 32(c), a part of the outdoor subject is synthesized on the right side but the outdoor subject and the indoor subject can be synthesized by adjusting the threshold value, for example. It should be noted that, at the time of reproducing a moving image, images later in time axis are written over images earlier in time axis for synthesis. Hence, in the proximity where the division was executed, images of the scene immediately after the division are overlapped on images of the scene immediately before the division, so that the scene immediately before the division can be made less obvious. Thus, in synthesizing for reproducing a moving image including different scenes, if a change occurs from the first scene to another scene, the synthesized image of another scene can be reproduced as a synthesized image different from the first scene, thereby allowing the user to view the synthesized image in accordance with the scene. Also, the affine transformation parameters not properly detected due to a comparatively speedy panning operation can be corrected to reduce the unnecessary change in the synthesized image. It should be noted that, in this example, an already formed synthesized image is erased and then another synthesized image is reproduced; it is also practicable to reproduce another synthesized image with an already formed synthesized image left.

The following describes an operation of the image processing apparatus 100 in the embodiment of the present invention with reference to drawings.

Figure 33:
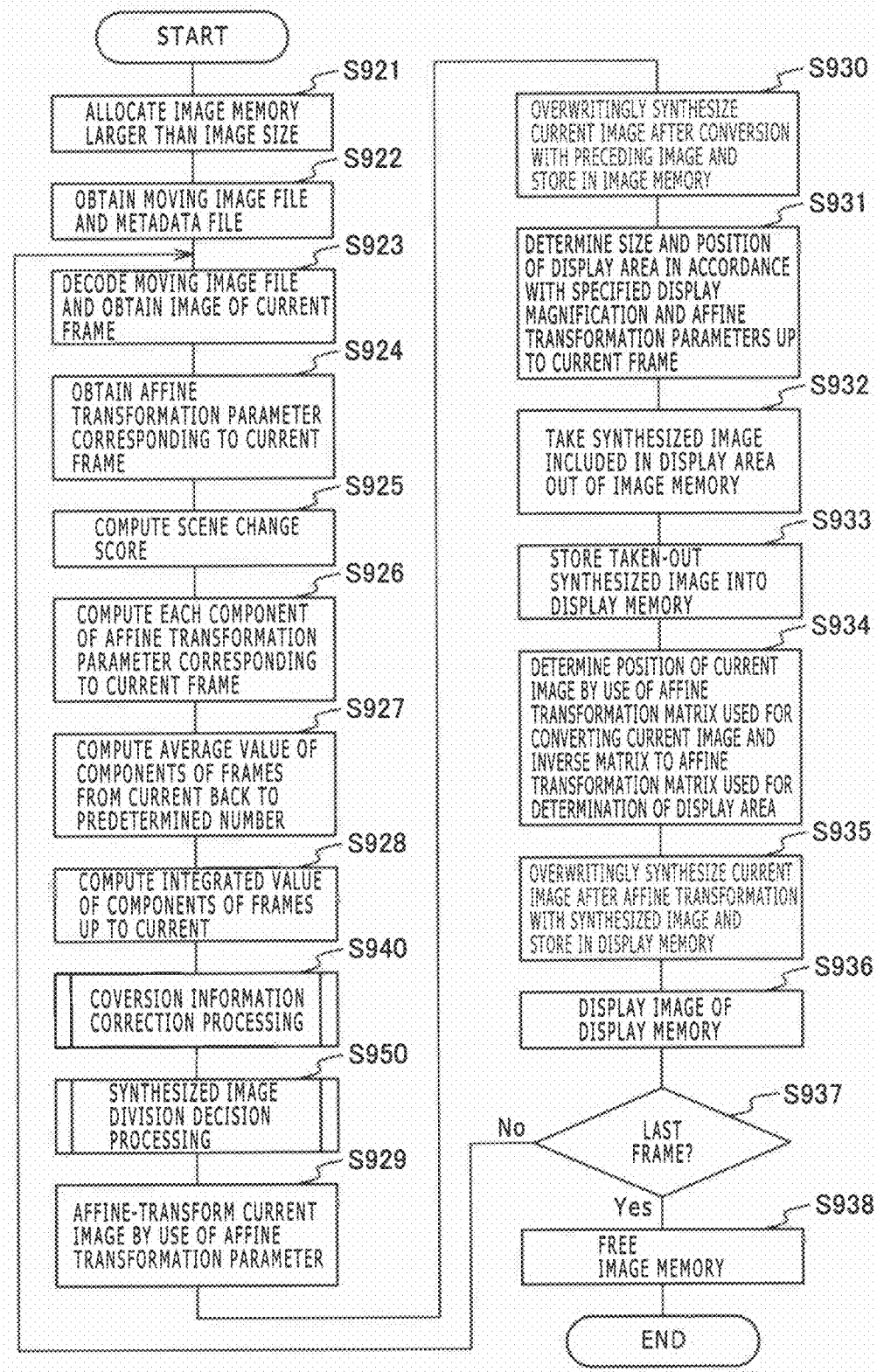
FIG. 33 is a flowchart indicative of a processing procedure of the moving image reproduction processing by the image processing apparatus 100 in the embodiment of the present invention.

FIG. 33 shows is a flowchart indicative of a processing procedure of the moving image reproduction processing by the image processing apparatus 100 in the embodiment of the present invention. It should be noted that, in this example, if information that an image corresponding to the current frame is to be divided for display is outputted from the synthesized image division decision block 170, the synthesized image of the images corresponding to frames before the current frame is erased.

First, a work buffer larger in size of an image configuring a moving image is allocated in the image memory 220 (step S921). Next, the file capture block 140 obtains moving image files selected through the operation acceptance block 270 from the moving image storage block 200 and obtains a metadata file associated with these moving image files from the metadata storage block 210 (step S922).

Next, the file capture block 140 decodes the moving image file to obtain the current frame that is one of the frames configuring the moving image file (step S923). Next, the file capture block 140 obtains the affine transformation parameters corresponding to the captured current frame from the metadata file (step S924). Here, if the current frame is the start frame, the affine transformation parameters of a unit matrix are obtained.

Next, the feature quantity extraction block 150 computes a scene change score for an image corresponding to the current frame (step S925). Next, the camera work component computation unit 155 computes each component of camera work from the affine transformation parameters corresponding to the current frame (step S926). Next, the camera work component average value computation unit 157 computes an average value of camera work components on the basis of each component of camera work corresponding to the current frame and each component of camera work corresponding to each frame up to the predetermined number of frames from the frame immediately before held in the camera work component holding unit 156 (step S927). Next, the camera work component integrated value computation unit 158 computes an integrated value of camera work components on the basis of each component of camera work corresponding to the current frame and each component of camera work corresponding to each frame up to the frame immediately before from the start frame held in the camera work component holding unit 156 (step S928).

Then, conversion information correction processing is executed (step S940). It should be noted that this conversion information correction processing will be described in detail with reference to FIG. 34. Next, synthesized image division decision processing is executed (step S950). It should be noted that this synthesized image division decision processing will be described in detail with reference to FIG. 35.

Next, the image conversion block 180 affine-transforms the image corresponding to the current frame by use of affine transformation parameters (step S929). Here, if the information that the image corresponding to the current frame is to be divided for reproduction is outputted from the synthesized image division decision block 170, affine transformation is executed by use of a unit matrix, so that the actual image is not converted. Also, if the information that the image corresponding to the current frame is to be divided for reproduction is not outputted from the synthesized image division decision block 170 and the affine transformation parameters are corrected by the conversion information correction block 160, the affine transformation is executed by use of the corrected affine transformation parameters. On the other hand, if the information that the image corresponding to the current frame is to be divided for reproduction is not outputted from the synthesized image division decision block 170 and the affine transformation parameters are not corrected by the conversion information correction block 160, affine transformation is executed by use of the affine transformation parameters corresponding to the current frame. It should be noted that, if the current frame is the start frame, affine transformation is executed by use of a unit matrix, so that the actual image is not converted.

Next, the image synthesis block 190 writes the image corresponding to the affine-transformed current frame over the synthesized image of each image corresponding to frames before this current frame for synthesis and stores the image with the image corresponding to the current frame synthesized into the image memory 220 (step S930). Here, if the information that the image corresponding to the current frame is to be divided for reproduction is outputted from the synthesized image division decision block 170, only the image corresponding to the current frame is stored in the image memory 220 because the synthesized image of each image corresponding to the frames before the current frame was erased.

Next, the display area take-out block 230 determines the position and size of a display area by use of the affine transformation parameters corresponding to the specified display magnification and position (step S931). Next, the display area take-out block 230 takes a synthesized image included in the display area from the image memory 220 (step S932). Next, the display area take-out block 230 stores the synthesized image taken out of the image memory 220 into the display memory 240 (step S933).

Next, the display area take-out block 230 determines the position of a current image in the display memory 240 by use of a matrix of affine transformation parameters used for the conversion of the current image and an inverse matrix to the matrix of affine transformation parameters used for the determination of the display area (step S934). Next, the image synthesis block 190 writes the affine-transformed current image over the synthesized image stored in the display memory 240 for synthesis (step S935). Next, the synthesized image stored in the display memory 240 is displayed on the display block 260 (step S936). Here, if the information that the image corresponding to the current frame is to be divided for reproduction is outputted from the synthesized image division decision block 170, only the image corresponding to the current frame is displayed on the display block 260 because the synthesized image of each image corresponding to the frames before the current frame was erased.

Next, it is determined whether, of the frames configuring an entered moving image file, the current frame is the end frame or not (step S937). If the current frame is not the end frame (step S937), then the procedure returns to step S923 to repeat the moving image synthesized reproduction processing (step S923 through S936). On the other hand, if the current frame is the end frame (step S973), the allocated work buffer is freed (step S938) to end the moving image reproduction processing.

Figure 34:
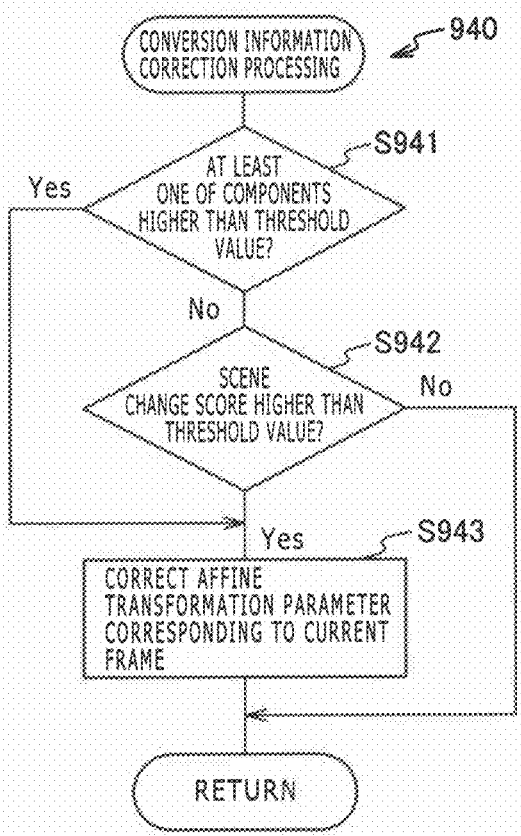
FIG. 34 is a flowchart indicative of a conversion information correction processing procedure of the processing procedures of the moving image reproduction processing by the image processing apparatus 100 in the embodiment of the present invention.

FIG. 34 is a flowchart indicative of a conversion information correction processing procedure (the processing procedure of step S940 shown in FIG. 33) of the processing procedures of the moving image reproduction processing by the image processing apparatus 100 in the embodiment of the present invention. In this example, the affine transformation parameters corresponding to the current frame are corrected on the basis whether at least one of the components of camera work corresponding to the current frame is over a threshold value or not and whether a scene change score is over a threshold value or not. Also, an example is described in which a matrix of affine transformation parameters determined to be corrected is corrected to a unit matrix.

First, the conversion information correction block 160 determines whether at least one of the components of camera work corresponding to the current frame is over a threshold value or not (step S941). If at least one of the components of camera work corresponding to the current frame is not over a threshold value (step S941), the conversion information correction block 160 determines whether a scene change score computed for the current frame is over a threshold value or not (step S942). If the scene change score computed for the current frame is not over a threshold value (step S942), it is unnecessary to correct the affine transformation parameters corresponding to the current frame, so that the operation of the conversion information correction processing ends.

On the other hand, if at least one of the components of camera work corresponding to the current frame is over a threshold value (step S941) or if the scene change score computed for the current frame is over a threshold value (step S942), then the conversion information correction block 160 corrects the matrix of affine transformation parameters corresponding to the current frame to a unit matrix (step S943). It should be noted that, if the correction is executed by use of a linear interpolation matrix instead of a unit matrix and if the threshold value is found exceeded in step S941 or S942, a linear interpolation matrix is computed by use of the affine transformation parameters corresponding to each frame in the cross direction of the current frame in step S943 and the correction is executed by use of this linear interpolation matrix.

Figure 35:
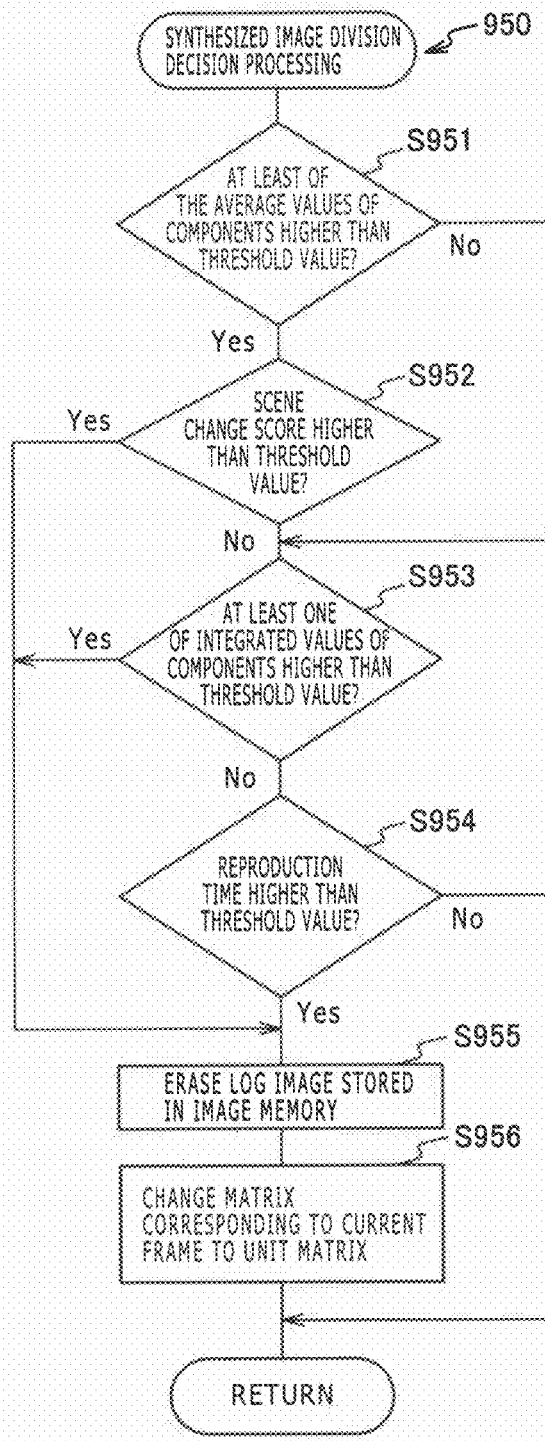
FIG. 35 is a flowchart indicative of a synthesized image division decision processing procedure of the processing procedures of the moving image reproduction processing by the image processing apparatus 100 in the embodiment of the present invention.

FIG. 35 is a flowchart indicative of a synthesized image division decision processing procedure (the processing procedure of step S950 shown in FIG. 33) of the processing procedures of the moving image reproduction processing by the image processing apparatus 100 in the embodiment of the present invention. In this example, it is determined whether the division of an image corresponding to the current frame is necessary or not depending on whether at least one of the average values of the components of camera work corresponding to the current frame is over a threshold value and a scene change score is over a threshold value or not, whether at least one of the integrated values of the components of camera work corresponding to the current frame is over a threshold value or not, and whether a reproduction time has exceeded a threshold value or not.

First, the synthesized image division decision block 170 determines whether at least one of the average values of the components of camera work corresponding to the current frame is over a threshold value or not (step S951). If at least one of the average values of the components of camera work corresponding to the current frame is not over a threshold value (step S951), then the procedure goes to step S953. On the other hand, if at least one of the average values of the components of camera work corresponding to the current frame is over a threshold value (step S951), the synthesized image division decision block 170 determines whether the scene change score computed for the current frame is over a threshold value or not (step S952).

If the scene change score computed for the current frame is not over a threshold value (step S952), the synthesized image division decision block 170 determines whether at least one of the integrated values of the components of camera work corresponding to the current frame is over a threshold value or not (step S953). If at least one of the integrated values of the components of camera work corresponding to the current frame is not over a threshold value (step S953), the synthesized image division decision block 170 determines whether a reproduction time from the start frame of the images included in the current synthesized image held in the image memory 220 has passed a threshold value or not (step S954). If a reproduction time from the start frame of the images included in the current synthesized image held in the image memory 220 has not passed a threshold value (step S954), it is not necessary to divide the image corresponding to the current frame, so that the operation of the synthesized image division decision processing ends.

On the other hand, if at least one of the average values of the components of camera work corresponding to the current frame is over a threshold value and the scene change score compute for the current frame is over a threshold value (steps S951, S952), if at least one of the integrated values of the components of camera work corresponding to the current frame is over a threshold value (step S953), or if a reproduction time from the start frame of the images included in the current synthesized image held in the image memory 220 has passed a threshold value (step S954), the image synthesis block 190 erases the synthesized image held in the image memory 220 (step S955). Next, the image conversion block 180 changes the matrix of affine transformation parameters corresponding to the current frame to a unit matrix (step S956).

The following describes in detail feature point extraction processing and optical flow computation processing by a multi-core processor in the embodiment of the present invention with reference to drawings.

Figure 36:
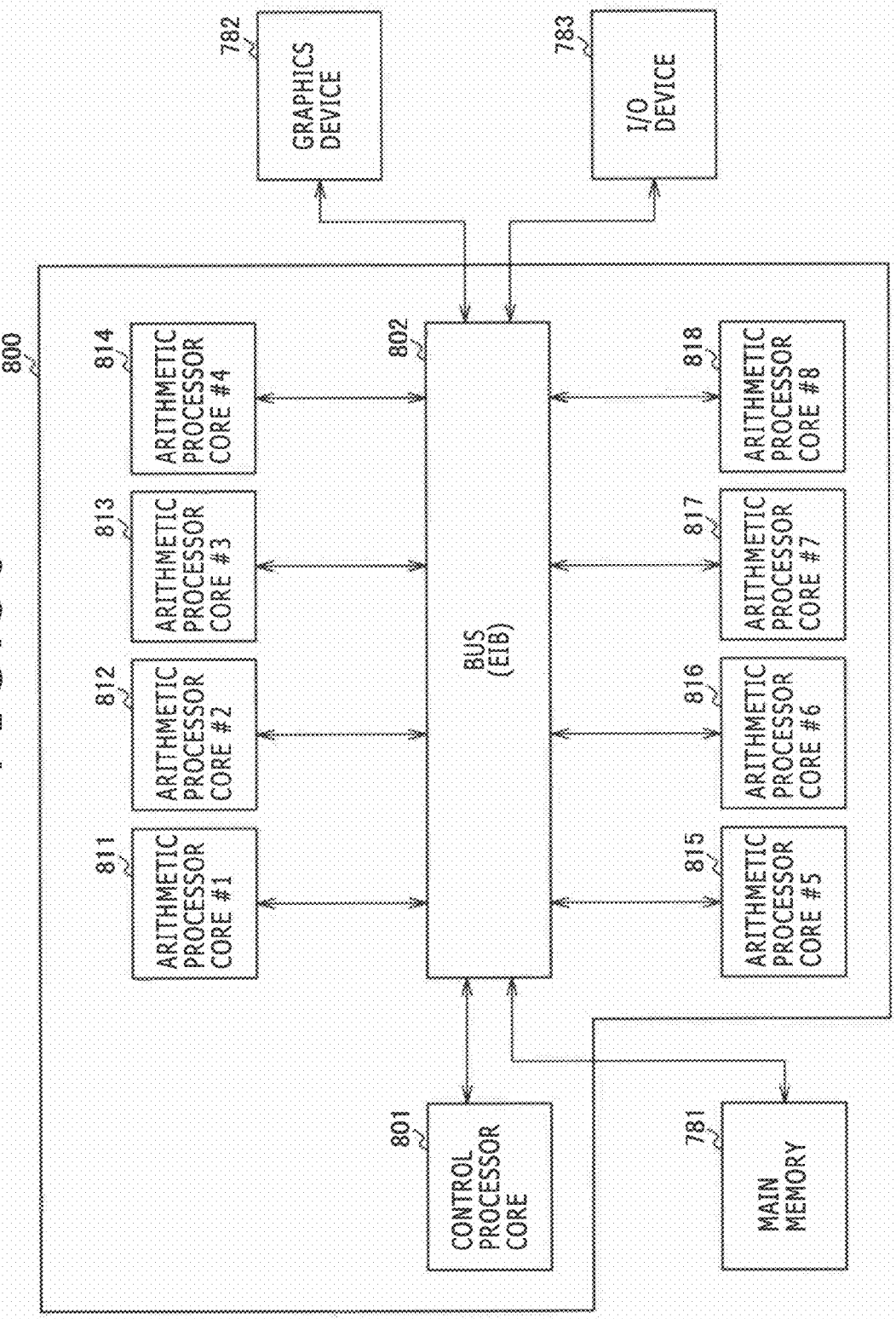
FIG. 36 is a diagram illustrating an exemplary configuration of a multi-core processor 800 in the embodiment of the present invention.

FIG. 36 is an exemplary configuration of a multi-core processor 800 in the embodiment of the present invention. The multi-core processor 800 is a processor in which two or more processor cores of different types are mounted on one CPU (Central Processing Unit). Namely, in order to maintain the processing performance of each discrete processor core and achieve a simple configuration, the multi-core processor 800 has two types of processor cores, one type for coping with all uses (applications) and the other type optimized, to a certain degree, for predetermined uses.

The multi-core processor 800 has a control processor core 801, arithmetic processor cores (#1) 811 through (#8) 818, and a bus 802 and is connected to a main memory 781. Also, the multi-core processor 800 is connected to other devices, such as a graphics device 782 and an I/O device 783. For the multi-core processor 800, "Cell (Cell Broadband Engine)" that is a microprocessor developed by the applicant hereof and so on, for example, may be used.

The control processor core 801 is a control processor core that mainly executes frequent thread switching, such as an operating system, for example. It should be noted that the control processor core 801 is described in detail with reference to FIG. 37.

The arithmetic processor cores (#1) 811 through (#8) 818 are simple and small arithmetic processor cores good at multimedia processing. It should be noted that the arithmetic processor cores (#1) 811 through (#8) 818 are described in detail with reference to FIG. 38.

The bus 802 is a fast bus called EIB (Element Interconnected Bus) to which the control processor core 801 and each of the arithmetic processor cores (#1) 811 through (#8) 818 are connected, data access by each processor core being executed via the bus 802.

The main memory 781, connected to the bus 802, stores various kinds of programs to be loaded into each processor core and data necessary for the processing of each processor core and data processed by each processor core.

The graphics device 782 is a graphics device connected to the bus 802 and the I/O device 783 is an external input/output device connected to the bus 802.

Figure 37:
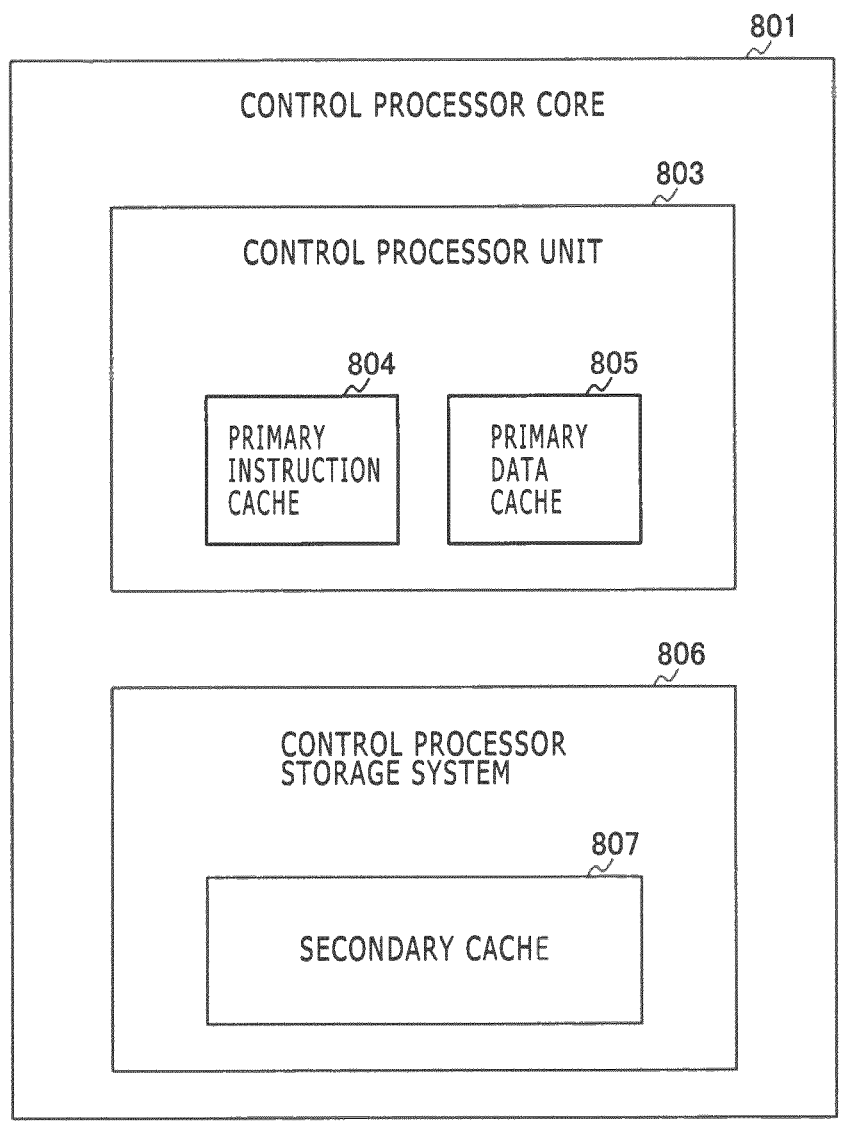
FIG. 37 is a diagram illustrating an exemplary configuration of a control processor core 801 in the embodiment of the present invention.

FIG. 37 shows an exemplary configuration of the control processor core 801 in the embodiment of the present invention. The control processor core 801 has a control processor unit 803 and a control processor storage system 806.

The control processor unit 803 is a unit providing a core for executing the arithmetic operation processing of the control processor core 801, has an instruction set based on the architecture of a microprocessor, and has an instruction cache 804 and a data cache 805 as primary caches. The instruction cache 804 is a 32 KB instruction cache and the data cache 805 is 32 KB data cache, for example.

The control processor storage system 806 is a unit for controlling the data access from the control processor unit 803 to the main memory 781 and has a secondary cache 807 of 512 KB for speeding memory access from the control processor unit 803.

Figure 38:
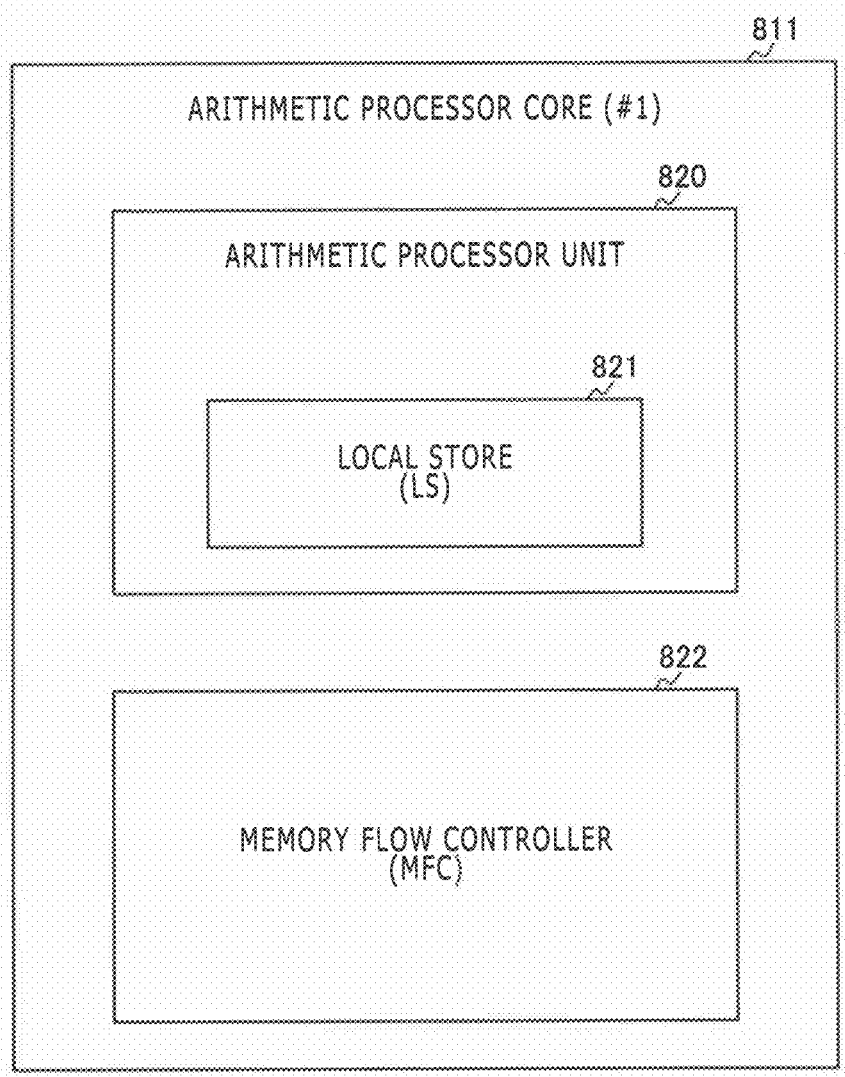
FIG. 38 is a diagram illustrating an exemplary configuration of an arithmetic processor core (#1) 811 in the embodiment of the present invention.

FIG. 38 shows an exemplary configuration of the arithmetic processor core (#1) 811 in the embodiment of the present invention. The arithmetic processor core (#1) 811 has an arithmetic processor unit 820 and a memory flow controller 822. It should be noted that the arithmetic processor core (#2) 812 through the arithmetic processor core (#8) 818 are the same in configuration as the arithmetic processor core (#1) 811, so that the description of arithmetic processor cores is omitted.

The arithmetic processor unit 820 is a unit providing a core for the arithmetic processing of the arithmetic processor core (#1) 811 and has a unique instruction set different from that of the control processor unit 803 of the control processor core 801. Also, the arithmetic processor unit 820 has a local store (LS: Local Store) 821.

The local store 821 is a memory dedicated to the arithmetic processor unit 820 and the only memory that can be directly referenced from the arithmetic processor unit 820. For the local store 821, a memory of 256 K bytes in storage size may be used for example. It should be noted that, for the arithmetic processor unit 820 to access the main memory 781 or the local store on the other arithmetic processor cores (arithmetic processor cores (#2) 812 through (#8) 818), the arithmetic processor unit 820 must use the memory flow controller 822.

The memory flow controller 822 is a unit for transferring data with the main memory 781 and other arithmetic processor cores and is called an MFC (Memory Flow Controller).

Here, the arithmetic processor unit 820 requests the memory flow controller 822 for data transfer and so on via an interface called a channel.

For programming models of the multi-core processor 800 described above, various models are proposed. For a most basic model of these programming models, a model is known in which a main program is executed on the control processor core 801 and sub programs are executed on the arithmetic processor cores (#1) 811 through (#8) 818. In the embodiment of the present invention, an arithmetic operation method of the multi-core processor 800 using this model is described in detail with reference to drawings.

Figure 39:
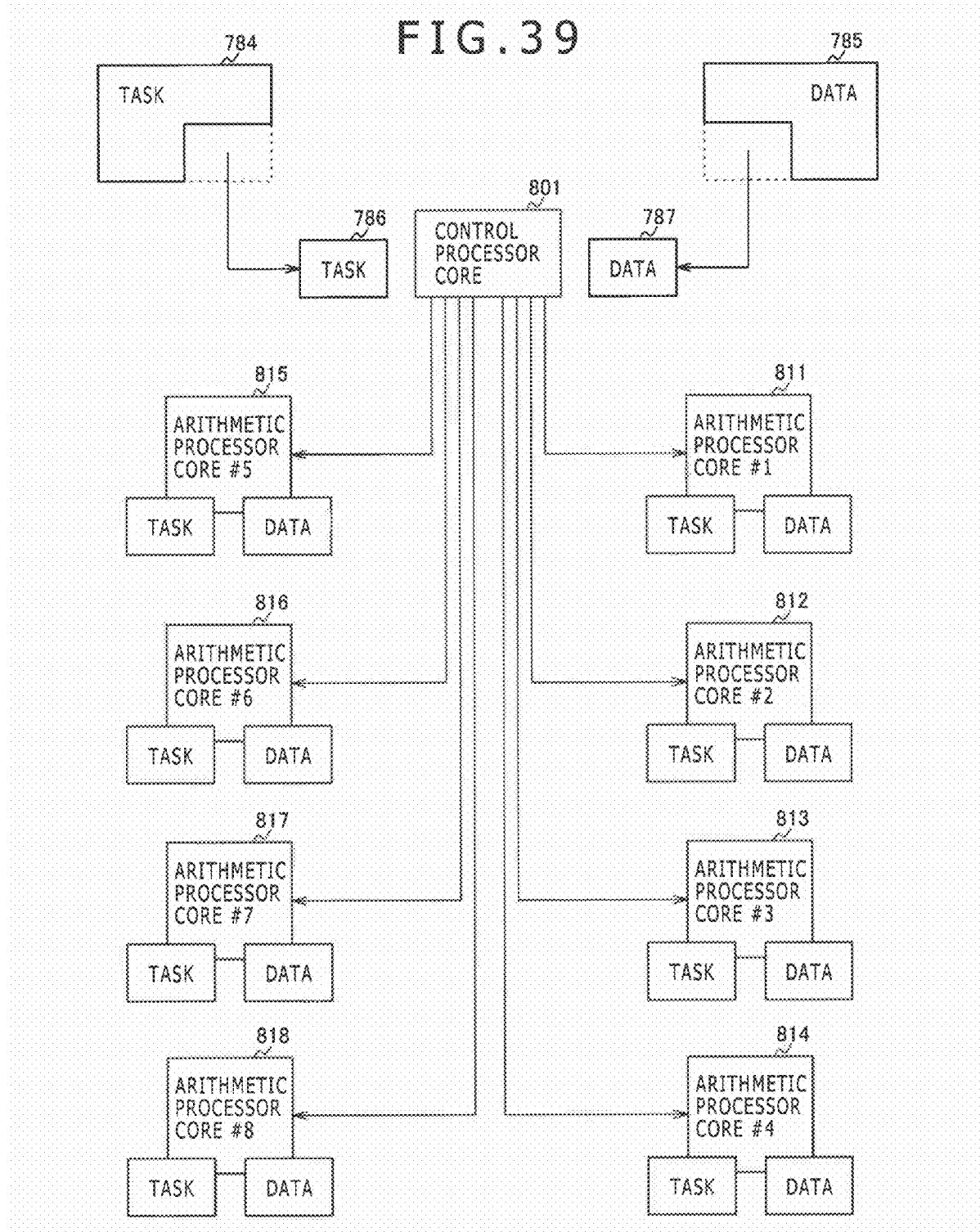
FIG. 39 is a diagram schematically illustrating an operation method of the multi-core processor 800 in the embodiment of the present invention.

FIG. 39 schematically shows the arithmetic operation method of the multi-core processor 800 in the embodiment of the present invention. In this example, in executing a task 784 by the control processor core 801 by use of data 785, each arithmetic processor core executes a task 786 that is a part of the task 784 by use of data 787 (a part of the data 785) necessary for the processing of the task 786.

As shown in the figure, if the control processor core 801 executes the task 784 by use of the data 785, each arithmetic processor core executes the task 786 by use of the data 787 (a part of the data 785) necessary for the processing of the task 786 that is a part of the task 784. In the embodiment of the present invention, the arithmetic operation processing is executed by each arithmetic processor core for each frame configuring a moving image.

As shown in the figure, the arithmetic operation by the multi-core processor 800 allows the parallel use of the arithmetic processor cores (#1) 811 through (#8) 818 to execute comparatively a large number of arithmetic operations in a comparatively short time and the use of SIMD (Single Instruction/Multiple Data) operation on the arithmetic processor cores (#1) 811 through (#8) 818 allows a comparatively large number of arithmetic operations with a small number of instructions. It should be noted that the SIMD operation is described in detail with reference to FIG. 43 through FIG. 46.

Figure 40:
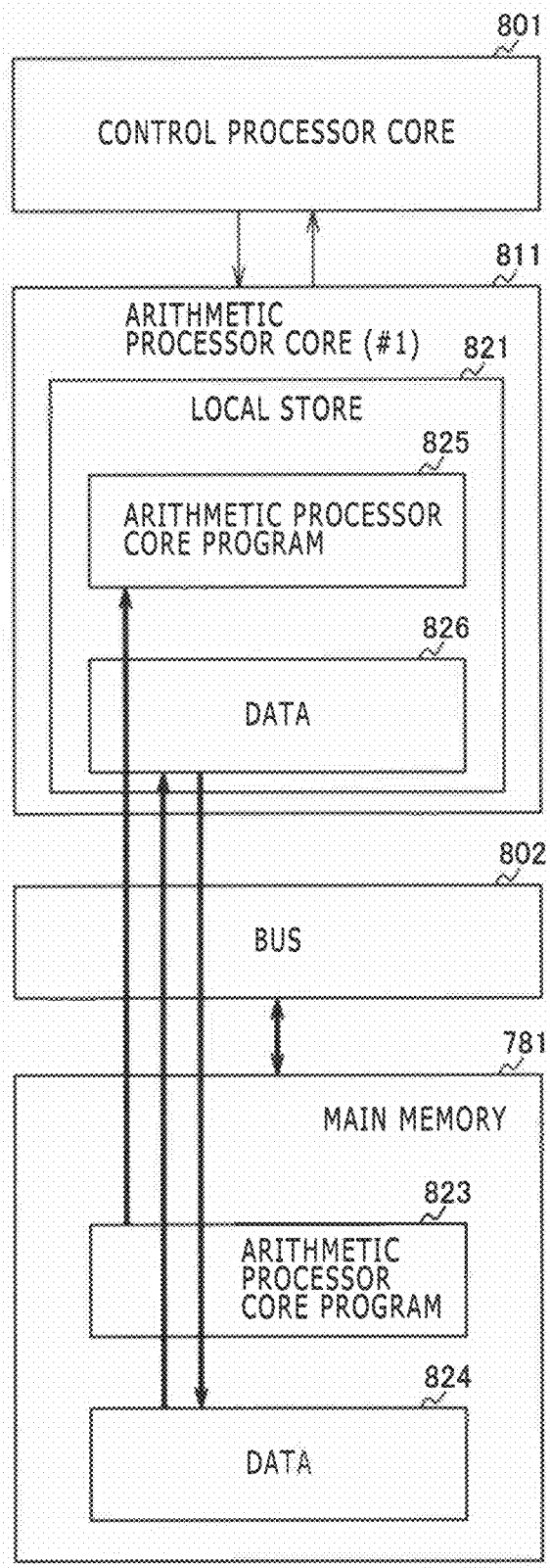
FIG. 40 shows diagrams schematically illustrating a program and a data flow in the case where an arithmetic operation is executed by the multi-core processor 800 in the embodiment of the present invention.

FIG. 40 schematically shows program and data flows in an arithmetic operation by the multi-core processor 800 in the embodiment of the present invention. Here, the arithmetic processor core (#1) 811 is used for an example of description among the arithmetic processor cores (#1) 811 through (#8) 818; the same holds true with the arithmetic processor cores (#2) 812 through (#8) 818.

First, the control processor core 801 sends an instruction to the arithmetic processor core (#1) 811 to load an arithmetic processor core program 823 stored in the main memory 781 into the local store 821 of the arithmetic processor core (#1) 811. Consequently, the arithmetic processor core (#1) 811 loads the arithmetic processor core program 823 stored in the main memory 781 into the local store 821.

Next, the control processor core 801 instructs the arithmetic processor core (#1) 811 to execute an arithmetic processor core program 825 stored in the local store 821.

Next, the arithmetic processor core (#1) 811 transfers data 824 necessary for the execution of the arithmetic processor core program 825 stored in the local store 821 from the main memory 781 to the local store 821.

Next, on the basis of the arithmetic processor core program 825 stored in the local store 821, the arithmetic processor core (#1) 811 manipulates data 826 transferred from the main memory 781 and executes processing in accordance with conditions, storing a processing result into the local store 821.

Next, the arithmetic processor core (#1) 811 transfers the result of the processing executed on the basis of the arithmetic processor core program 825 stored in the local store 821 from the local store 821 to the main memory 781.

Next, the arithmetic processor core (#1) 811 notifies the control processor core 801 of the end of the arithmetic operation processing.

The following describes in detail an SIMD arithmetic operation that is executed by use of the multi-core processor 800 with reference to drawings. Here, the SIMD arithmetic operation denotes an arithmetic operation method for executing the processing of two or more pieces of data with one instruction.

FIG. 41(*a*) schematically shows an overview of an arithmetic operation method for executing the processing of two or more pieces of data with each instruction. The arithmetic operation method shown in FIG. 41(*b*) is an ordinary arithmetic operation method, which is called a scalar arithmetic operation, for example. An instruction for adding data "A1" to data "B1" provides a processing result data "C1" for example. Also, the other three arithmetic operations are executed in the same manner; namely, data "A2," "A3" and "A4" in the same column are added to data "B2," "B3" and "B4" in the same column respectively by add instructions, providing data "C2," "C3" and "C4" as processing results. Thus, in a scalar operation, the processing of two or more pieces of data requires to issue respective instructions.

FIG. 41 (*b*) schematically shows an overview of an SIMD arithmetic operation in which the processing of two or more pieces of data is executed with a single instruction. Here, a collection of data (the pieces of data enclosed by dotted lines 827 and 828) for an SIMD arithmetic operation are sometimes referred to as vector data. And an SIMD arithmetic operation that is executed by use of such vector data may be called a vector operation.

For example, a single instruction for adding vector data ("A1," "A2," "A3" and "A4") enclosed by a dotted line 827 to vector data ("B1," "B2," "B3" and "B4") enclosed by a dotted line 828 provides processing results "C1," "C2," "C3" and "C4" (data enclosed by a dotted line 829). Thus, in an SIMD operation, the processing of two or more pieces of data can be executed with a single instruction, thereby executing arithmetic operation processing at high speeds. Also, an instruction associated with these SIMD operations is executed by the control processor core 801 of the multi-core processor 800 and the arithmetic operation processing of two or more pieces of data for this instruction is executed in parallel by the arithmetic processor cores (#1) 811 through (#8) 818.

On the other hand, for example, an SIMD operation cannot execute such processing as addition of data "A1" and "B1," subtraction of data "A2" and "B2," multiplication of data "A3" and "B3," and division of data "A4" and "B4." Namely, the processing by an SIMD operation cannot be executed in which different types of processing are executed on two or more pieces of data.

The following describes in detail a specific arithmetic operation method of the SIMD operation in the execution of feature point extraction processing and optical flow computation processing, with reference to drawings.

Figure 42:
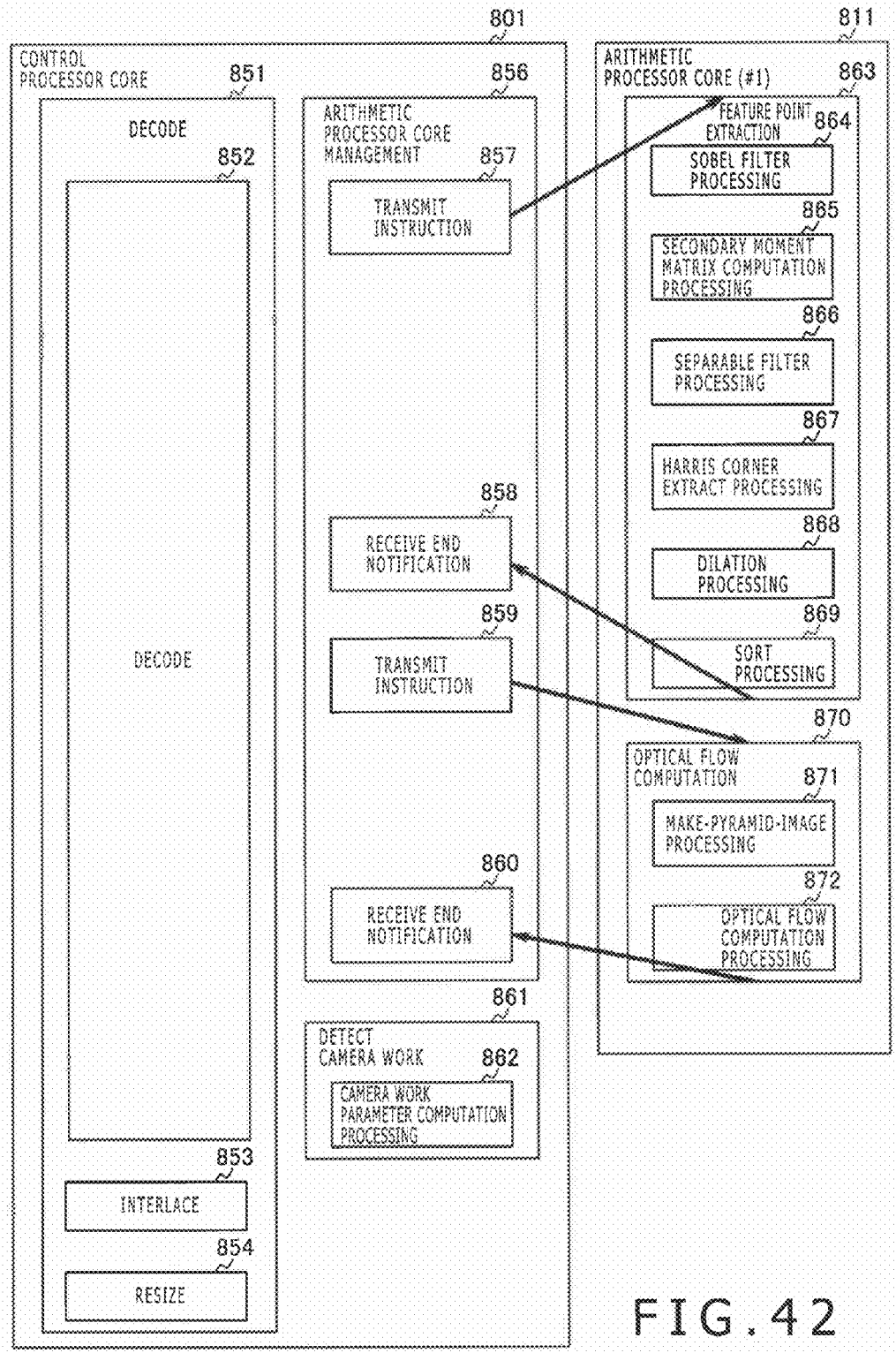
FIG. 42 is a diagram illustrating an exemplary configuration of a program that is executed by the arithmetic processor core (#1) 811 in the embodiment of the present invention.

FIG. 42 shows an exemplary configuration of a program that is executed by the control processor core 801 or the arithmetic processor core (#1) 811 in the embodiment of the present invention. Here, only the arithmetic processor core (#1) 811 is illustrated; the same processing is executed also in the arithmetic processor cores (#2) 812 through (#8) 818.

The control processor core 801 executes decode 852 as decode 851, interlace 853, and resize 854. The decode 852 is the processing of decoding a moving image file. The interlace 853 is the processing of removing an interlace for each decoded frame. The resize 854 is the processing of reducing each interlace-removed frame.

Further, the control processor core 801 executes transmit instruction 857 and 859 and receive end notification 858 and 860 as arithmetic processor core management 856. The transmit instruction 857 and 859 are the processing of transmitting SIMD operation execute instructions for the arithmetic processor cores (#1) 811 through (#8) 818 and the receive end notification 858 and 860 are the processing of receiving the end notification of an SIMD operation from the arithmetic processor cores (#1) 811 through (#8) 818 for the above-mentioned instruction. In addition, the control processor core 801 executes camera work parameter compute processing 862 as camera work detection 861. The camera work parameter compute processing 862 is the processing of computing affine transformation parameters for each frame on the basis of an optical flow computed by the SIMD operation by the arithmetic processor cores (#1) 811 through (#8) 818.

The arithmetic processor core (#1) 811 executes, as feature point extraction processing 863, Sobel filter processing 864, second moment matrix compute processing 865, separable filter processing 866, Calc Harris processing 867, dilation processing 868, and sort processing 869.

The Sobel filter processing 864 is the processing of computing x-direction value dx obtained by use of P2 filter (x-direction) and y-direction value dy obtained by use of a Y-direction filter. It should be noted that the computation of x-direction value dx is described in detail with reference to FIG. 43 through FIG. 46.

The second moment matrix compute processing is the processing of computing values $dx^2$, $dy^2$, and dx·dy by use of dx and dy computed by the Sobel filter processing 864. The separable filter processing 866 is the processing of applying the Gaussian filter (blur processing) to an image of $dx^2$, $dy^2$, and dx·dy computed by the second moment matrix compute processing 865.

The Calc Harris processing 867 is the processing of computing Calc Harris score by use of values $dx^2$, $dy^2$, and dx·dy applied with blur processing by the separable filter processing 866. This Calc Harris score S is computed by the following equation for example.

$$S=(dx^2 \times dy^2 - dx \cdot dy \times dx \cdot dy)/(dx^2+dy^2+\epsilon)$$

The dilation processing 868 is the processing of executing blur processing on an image configured by Calc Harris score computed by the Calc Harris processing 867.

The sort processing 869 is the processing of sorting pixels in the descending order of Calc Harris scores computed by the Calc Harris processing 867, picking up the pixels by a predetermined number from the higher scores, and extracting the picked up points as feature points.

The arithmetic processor core (#1) 811 executes make pyramid image processing 871 and calc optical flow processing 872 as optical flow compute processing.

The make pyramid image processing 871 is the processing of sequentially creating images reduced to the predetermined number of steps from an image size at the time of image taking by camera, the created images being called as multiple resolution images.

The calc optical flow processing 872 is the processing of computing an optical flow for a smallest image among the multiple resolution images created by the make pyramid image processing 871 and, by use of this computation result, computing an optical flow again for an image that is one step higher in resolution, which is repeated until a largest image is reached.

Thus, for example, for the feature point extraction processing that is executed by the feature point extraction unit 121 shown in FIG. 2 and so on and the optical flow computation processing that is executed by the optical flow computation unit 122, processing results can be obtained by executing parallel processing by SIMD operation by use of the multi-core processor 800. It should be noted that the feature point extraction processing and the optical flow computation processing shown in FIG. 42 and so on are illustratively only, so that the SIMD operation by the multi-core processor 800 may be executed by use of other processing configured by various types of filter processing and threshold value processing for the images configuring a moving image.

FIG. 43 shows an overview of a data structure and a processing flow in the case of the filter processing by use of the Sobel filter 830 on the image data (the image data corresponding to one frame configuring a moving image taken by camera) stored in the main memory 781 in the embodiment of the present invention. It should be noted that the image data stored in the main memory 781 shown in the figure is shown in a simplified manner with the number of horizontal pixels being 32. Also, the Sobel filter 830 is a 3×3 edge extraction filter. As shown in the figure, the image stored in the main memory 781 is filtered by the Sobel filter 830 and filter processing results are outputted. This example is described by use of an example in which four filtering results are obtained at once by the use of SIMD operation.

Figure 44:
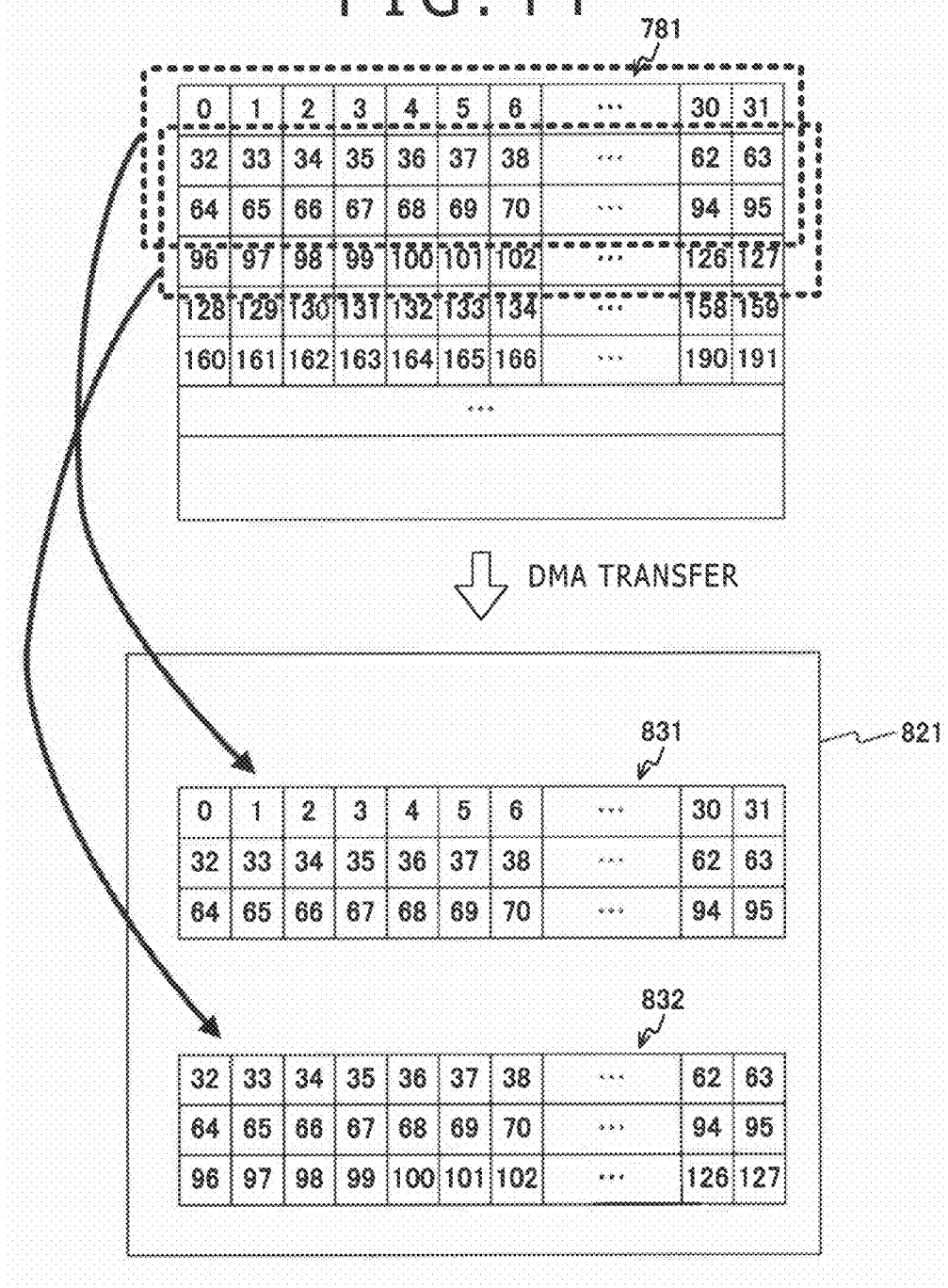
FIG. 44 is a diagram illustrating an overview of a data flow in the case where SIMD operation is executed, by use of the Sobel filter 830, on image data stored in the main memory 781 in the embodiment of the present invention.

FIG. 44 shows an overview of data flows in the case where an SIMD operation is executed by use of the Sobel filter 830 on the image data stored in the main memory 781 in the embodiment of the present invention. First, the predetermined number of lines (for example, 3 lines) including the first line of the image data stored in the main memory 781 are DMA (Direct Memory Access)-transferred to a first buffer 831 of the local store 821 of the arithmetic processor core and the predetermined number of lines obtained by shifting each line DMA-transferred to the first buffer 831 are DMA-transferred to a second buffer 832. Thus, the use of the double buffers can hide the delay caused by DMA transfer.

Figure 45:
FIG. 45 is a diagram illustrating an overview of a vector creating method of creating nine vectors from image data stored in a first buffer 831 in the filter processing by use of the Sobel filter 830 in the embodiment of the present invention.

FIG. 45 shows an overview of a vector creating method in which, in the execution of filter processing by use of the Sobel filter 830 in the embodiment of the present invention, nine vectors are created from the image data stored in the first buffer 831. As shown in FIG. 44, after the DMA transfer, nine vectors are created from the image data stored in the first buffer 831. To be more specific, in line 1 of the image data stored in the first buffer 831, vector data 841 is created from four pieces of data from the left corner, vector data 842 is created from the four pieces of data obtained by shifting the preceding four pieces of data by one to the right side, and vector data 843 is created from the four pieces of data obtained by shifting the preceding four pieces of data by one to the right side. Also, likewise for line 2 and line 3, vector data 844 through 849 are created from four pieces of data.

FIG. 46 shows an overview of a vector computation method of executing vector computation for the vector data 841 through 849 by use of SIMD instructions in the filter processing by use of the Sobel filter 830 in the embodiment of the present invention. To be more specific, an SIMD operation is sequentially executed on the vector data 841 through 843 to obtain vector A. In this SIMD operation, an SIMD operation ""−1"בvector data 841"" is first executed. Next, an SIMD operation ""0"בvector data 842"" is executed and an SIMD operation ""1"בvector data 843"" is executed. Here, as for ""0"בvector data 842,"" the operation result is already determined to be "0," so that this operation can be omitted. As for ""1"דvector data 843,"" the operation result is already determined to be the same as "vector data 843," so that this operation can be omitted.

Next, add processing between operation result ""−1"ד"vector data 841"" and operation result ""0"דvector data 842"" is executed by SIMD operation. Next, add processing is between the result of this add processing and operation result ""1"דvector data 843"" is executed by SIMD operation. Here, for example, a computation of a data structure "vector data 1"דvector data 2"+"vector data 3" can be executed by SIMD operation. Therefore, for the computation of vector A, the SIMD operations for ""0"דvector data 842"" and ""1"דvector data 843"" for example can be omitted and ""−1"דvector data 841"+"vector data 843"" may be executed by SIMD operations at once.

Also, likewise, an SIMD operation is executed on the vector data 844 through 846 to obtain vector B and an SIMD operation is executed on the vector data 847 through 849 to obtain vector C.

Next, an SIMD operation is executed on vectors A through C obtained by the SIMD operations to obtain vector D. Thus, executing SIMD operations can provide a collective acquisition of results equivalent to the number of vector elements (in this example, four pieces of data).

After the computation of vector D, the same processing is repeated on the data of the image stored in the first buffer 831 shown in FIG. 44 by shifting the position of data to be taken out by one to the right side, thereby sequentially executing computation of vector D of each data. And, when the processing up to the right end of the image data stored in the first buffer 831 shown in FIG. 44 has been completed, the processing results are DMA-transferred to the main memory 781.

Next, of the image data stored in the main memory 781, the predetermined number of lines obtained by shifting the lines transferred to the second buffer 832 by one line down are DMA-transferred to the first buffer 831 and the above-mentioned processing is repeated on the image data stored in the second buffer 832. Then, the same processing is repeated until the bottom line of the lines of the image data stored in the main memory 781 is reached.

Likewise, by executing the most processing of feature point extraction and optical flow computation by SIMD operations, the high-speed image processing can be realized.

Figure 47:
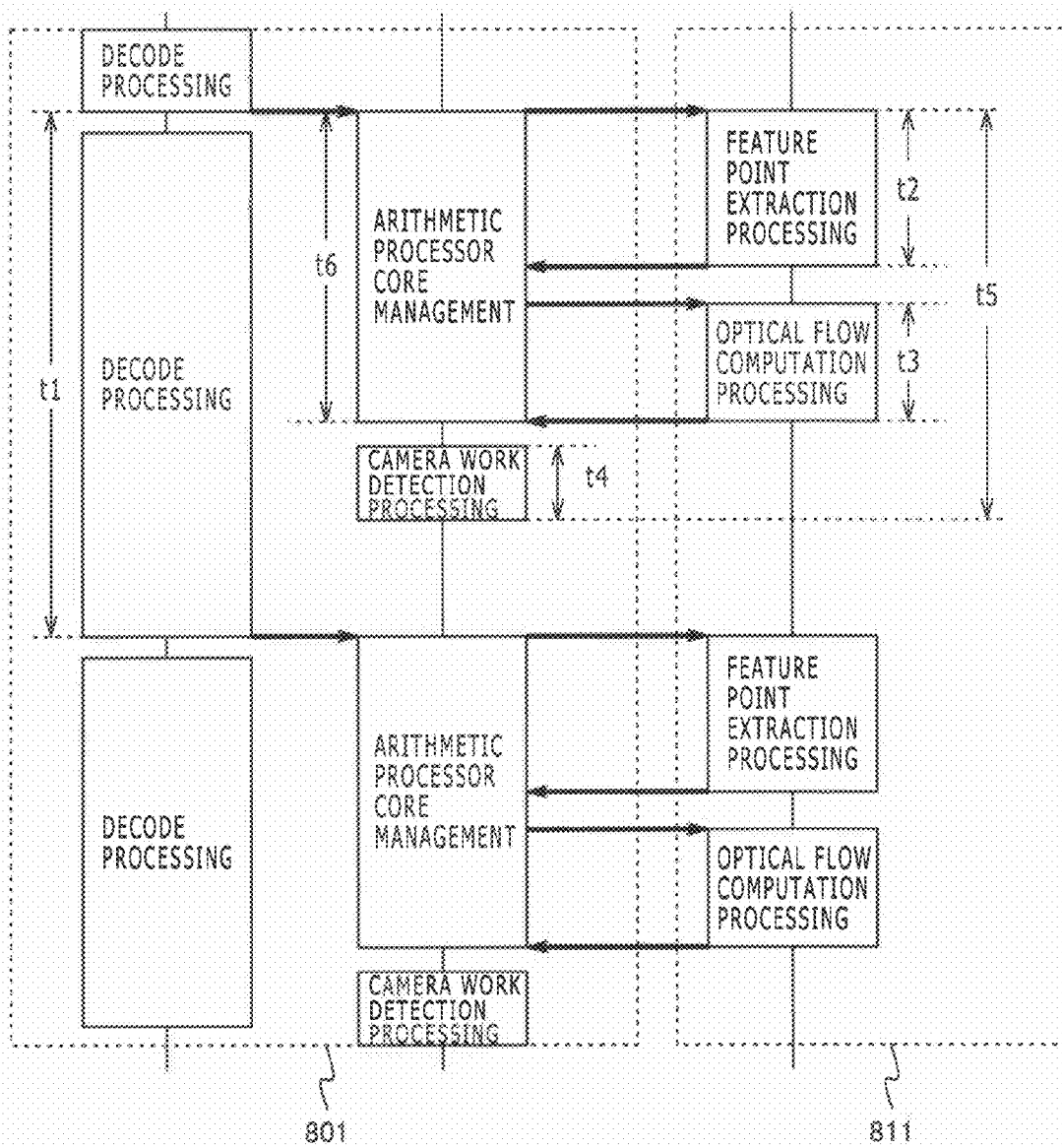
FIG. 47 is a diagram illustrating an overview of camera work parameter computation processing flows in time sequence in the embodiment of the present invention.

FIG. 47 shows an overview of camera work parameter computation processing in the embodiment of the present invention in a time sequence manner. As described above, executing SIMD operations by use of the multi-core processor 800, for example, allows the parallel execution of the decode and analysis processing for moving images. Hence, the analysis time for one frame configuring a moving image can be made shorter than the decode time.

For example, in the figure, t1 is indicative of a time required for the control processor core 801 to execute decode processing of one frame configuring a moving image, t2 is indicative of a time for the arithmetic processor cores (#1) 811 through (#8) 818 to execute feature point extraction processing of one frame configuring the moving image, t3 is indicative of a time required for the arithmetic processor cores (#1) 811 through (#8) 818 to execute optical flow computation processing of one frame configuring the moving image, and t4 is indicative of a time for the control processor core 801 to execute camera work parameter detection processing of one frame configuring the moving image. It should be noted that t5 is indicative of a time required for the arithmetic processor cores (#1) 811 through (#8) 818 to execute camera work detection processing of one frame configuring the moving image. Further, t6, t6 is indicative of a time required for the control processor core 801 to execute management of the arithmetic processor cores (#1) 811 through (#8) 818. For example, t1 may be set to "25.0 ms," t2 to "7.9 ms," t3 to "6.7 ms," t4 to "1.2 ms," and t5 to "15.8 ms."

The following describes in detail reproduction of moving image content by use of a metadata file in the embodiment of the present invention with reference to drawings.

Figure 48:
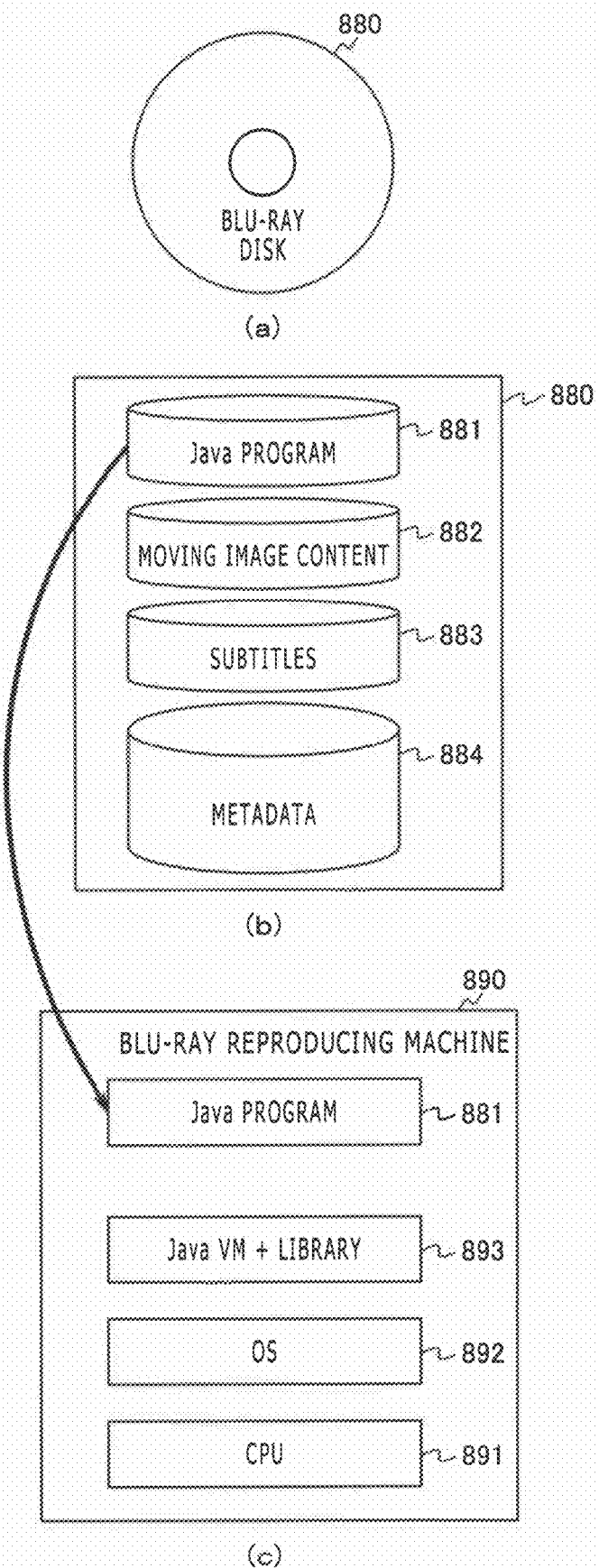
FIG. 48 shows diagrams schematically illustrating internal configurations of a Blu-ray disc 880 which is one example of recording media, data 881 through 884 recorded on the Blu-ray disc 880, and a Blu-ray reproducing machine 890 capable of reproducing the Blu-ray disc 880.

FIG. 48(*a*) is a top view schematically showing a Blu-ray Disc (registered trademark) 880 that is one example of recording media and FIG. 48(*b*) schematically shows data 881 through 884 recorded to the Blu-ray disc 880. Recorded to the Blu-ray Disc 880 are moving image content 882 that is a moving image taken by a camera or the like, a subtitle 883 of the moving image content 882, and metadata (for example, metadata file shown in FIG. 5(*b*)) 884 obtained by analyzing the moving content 882, along with a Java (registered trademark) program 881 associated with the moving image reproduction in the embodiment of the present invention.

FIG. 48(*c*) schematically shows an internal configuration of a Blu-ray disc reproducing machine (Blu-ray Disc Player) 890 capable of reproducing the Blu-ray Disc 880. Here, the Blu-ray disc reproducing machine 890 capable of reproducing Blu-ray discs can execute Java (registered trademark) programs because a Java (registered trademark) VM (Java (registered trademark) Virtual Machine) and library 893 is installed as standard along with a CPU 891 and an OS 892. Hence, loading the Blu-ray Disc 880 on the Blu-ray disc reproducing machine 890 allows the Blu-ray disc reproducing machine 890 to load the Java (registered trademark) program 881 for execution. Consequently, when reproducing the moving content 882, the Blu-ray disc reproducing machine 890 can reproduce a moving image with the use of metadata 884 in the embodiment of the present invention. Namely, the moving image reproduction in the embodiment of the present invention can be realized on all Blu-ray reproducing machines without using dedicated PC software or the like.

In the embodiment of the present invention, examples in which affine transformation parameters are corrected have been described in order to enhance the quality of synthesized images; however, it is also practicable to correct other information associated with moving images to enhance the quality of synthesized images. For example, the quality of panorama images can be enhanced by use of metadata associated with white balance and exposure correction and so on provided with general-purpose digital video cameras.

For example, at the time of taking a moving image, the parameters of exposure correction in each frame are obtained as metadata and stored as related with the frame. Then, when the moving image is reproduced, the frame with which the exposure correction was executed on the basis of the obtained metadata is extracted and inverse correction is executed by image processing on the frame with which this exposure correction executed to correct the frame to the frame before the exposure correction. Consequently, the creation of a synthesized image that largely differs in exposure at different locations on the synthesized image can be prevented.

Also, for example, correction can be executed on a moving image taken with auto white balance capabilities. For example, when this moving image is synthesized for reproduction, the inverse correction of white balance is executed. Consequently, an entire synthesized image can be prevented from becoming blurred because the frames configuring a moving mage have different white balances.

Thus, a moving image is a collection of two or more frames over a predetermined period of time and the image taking conditions for each frame are mostly different because normal reproduction is prioritized. Hence, the inverse correction of these image qualities allows the creation of one panoramic synthesized image of high quality. It should be noted that, in canceling the exposure correction by image processing, it is possible that the image is totally whitened for example, so that it is preferable to execute the correction in accordance with the contents of each moving image.

As described above, in the embodiment of the present invention, in the reproduction of a moving image, each image corresponding to frames before the currently displayed image is synthesized with the current image for display, so that a background and the like taken in at least a part of time zone can be easily viewed along with a subject that is the center of image taking. Hence, for example, if the user wants to review a background and the like taken in at least a part of time zone, the background can be viewed at the same time as the currently displayed image without executing a rewind operation or a cue operation. Also, in viewing a moving image taken by a camera, the contents of this moving image can be easily understood and the spatial expanse of the moving image can be easily recognized by the viewing person.

Namely, a moving image can be spatially developed for viewing by use of past frames. Consequently, for example, a viewing method can be provided in which a panorama image is created while reproducing two or more moving images, so that the viewing person can view moving images with full enjoyment. Also, for the current image, the images before being stored in the image memory 220 can be sequentially displayed, resulting in the display of comparatively fine images. Further, if a scene change occurred or affine transformation parameters were not properly computed, the affine transformation parameter correction or synthesized image division is executed, thereby preventing the moving image being synthesized from failing and enhancing the quality of the panoramically formed synthesized image.

Also, in the embodiment of the present invention, an example has been described in which reproduction and display are executed by use of affine transformation parameters detected in advance; it is also practicable to compute affine transformation parameters at the time of reproduction and use these affine transformation parameters for the reproduction and display. For example, computing affine transformation parameters by an SIMD operation based on a multi-core processor allows the computation of the affine transformation parameters of one frame within the processing time of decoding one frame. Consequently, even in the reproduction of moving image with affine transformation parameter not computed, the reproduction of the moving image can be executed while computing affine transformation parameters, so that viewing in which a moving image is spatially developed can be executed at high speeds.

Also, in the embodiment of the present invention, an example has been described in which two or more moving image files are stored in the moving image storage block 200 and the affine transformation parameters corresponding to each moving image are stored in the metadata storage block 210 as related with the corresponding moving image and frame as a metadata file; it is also practicable to store the moving image and the affine transformation parameters corresponding hereto into the moving image storage block as related with each other as a moving image file in advance and, at the time of reproduction, each item of information is extracted from the moving image file for use.

Also, for example, in the high vision TV (Television), when a moving image taken in SD (Standard Definition) image quality is viewed or a moving image taken by a digital still camera or a moving image storage function of a mobile phone is viewed, if the moving image is displayed in the original image size, the number of pixels of high vision TV may not be made the most of. In addition, when zoom-in display is executed, it is often the case where the coarseness of image becomes conspicuous. Therefore, the display described in the embodiment of the present invention allows the viewing making the most of the number of pixels of high vision TV without making conspicuous the coarseness of images.

It should be noted that the synthesized image synthesized by the image synthesis block 190 may be recorded to a recording media or the like for use for other reproduction and display purposes. For example, a synthesized image may be stored in the metadata file of the metadata storage block 210 as a representative image in advance for use in search at the time of reproduction. Thus, if a synthesized image is used for a representative image, it is practicable to repeat the synthesized image creation processing for a certain number of frames of the frames configuring a moving image file to create a synthesized image, instead of repeating the synthesized image creation processing for all the frames configuring a moving image file, thereby using synthesized image thus created as a representative image. Further, in the embodiment of the present invention, an example has been described in which the synthesized image creation processing is repeated from the start frame configuring a moving image to create a synthesized image; it is also practicable to repeat the synthesized image creation processing from the end frame to the start frame to create a synthesized image. In this case, images earlier in time axis are written over images later in time axis for synthesis. Hence, in the proximity where the division was made, the scene before the division may become conspicuous. Therefore, for example, in the case of creating a synthesized image for use as a representative image, the synthesized image may be not be created from all the frames, so that, if the division was executed, several frames near this division may be excluded from the synthesis.

Also, if an index image of moving images is extracted on the basis of an overlap ratio in the image taking space that is a space corresponding to a synthesized image to be formed, the embodiment of the present invention is applicable. Namely, an image after the correction or the division may be used to determine an overlap ratio.

Also, in the embodiment of the present invention, an example has been described in which a synthesized image corresponding to a frame before the current frame is left to display; it is also practicable sequentially erase this synthesized image as time passes. In this case, it is also practicable to perform rendering such that the synthesized image is erased leaving a residual image thereof. Also, rendering may be performed such that the image corresponding to the current frame is displayed in color and the synthesized image corresponding to a frame before the current frame is displayed from color to sepia at time passes. Also, upon the reproduction of a scene after the division, the synthesized image of a scene before the division may be gradually blurred out. Consequently, smooth scene switching can be executed for each synthesized image. It should be noted that, in this case, the start image of a new scene may return to a fixed point on the screen.

Also, in the embodiment of the present invention, an example has been described in which the image processing apparatus for displaying an image synthesized by the image synthesis block; it is also practicable to apply the embodiment of the present invention to an image processing apparatus having image output means for outputting image information for displaying an image synthesized by the image synthesis block onto another image display apparatus. Further, the embodiment of the present invention is applicable to a moving image reproduction apparatus capable of reproducing a moving image or an image taking apparatus such as digital video camera or the like capable of reproducing a taken moving image.

Also, in the embodiment of the present invention, moving images taken by a camera have been described; it is also practicable to apply the embodiment of the present invention to moving images after editing in the case where a moving image taken by a camera was edited and moving images with animations synthesized, for example. Also, in the embodiment of the present invention, an example has been described in which a part of all of a log image is displayed; it is also practicable to display only two or more converted current images. Namely, only two or more current images held last in an image memory may be sequentially displayed.

Also, in the embodiment of the present invention, a case has been described in which a camera movement is obtained when the size of a moving object is comparatively small relative to the area of an image configuring a moving image and the moving image is reproduced by use of this camera movement. However, the embodiment of the present invention is also applicable when the size of a moving body is comparatively large relative to the area of an image configuring a moving image. For example, when a train departing a station is taken as the center of the subject with a ratio of the train to the image area taken large and the above-mentioned affine transformation parameters are computed, the movement of the train is computed. In this case, by use of this train movement, a synthesized image can be created in the above-mentioned synthesized image creation method. Thus, moving information associated with a relative moving amount between camera and subject at the time of image taking can be computed for use as the conversion information for converting images configuring a moving image.

It should be noted that, while preferred embodiments of the present invention having correlations with the inventive specified items in the scope of claims have been described using specific terms, such description is for illustrative purpose only, and it is to be understood that changes and variations may be made without departing from the spirit or scope of the following claims.

Namely, in claim 1, moving image storage means corresponds to the moving image storage block 200 for example. Conversion information storage means corresponds to the metadata storage block 210 for example. Also, image holding means corresponds to the image memory 220 for example. Also, feature quantity extraction means corresponds to the feature quantity extraction block 150 for example. Also, image conversion means corresponds to the image conversion block 180 for example. Also, decision means corresponds to the synthesized image division decision block 170 for example. Also, image synthesis means corresponds to the image synthesis block 190 for example.

Further, in claim 8, moving image storage means corresponds to the moving image storage block 200 for example. Also, conversion information storage means corresponds to the metadata storage block 210 for example. Also, image holding means corresponds to the image memory 220 for example. Also, decision means corresponds to the synthesized image division decision block 170 for example. Also, image conversion means corresponds to the image conversion block 180 for example. Also, image synthesis means corresponds to the image synthesis block 190 for example.

Further, in claim 9, moving image storage image means corresponds to the moving image storage block 200 for example. Also, conversion information storage means corresponds to the metadata storage block 210 for example. Also, image holding means corresponds to the image memory 220 for example. Also, feature quantitative extraction means corresponds to the feature quantitative extraction block 150 for example. Also, conversion information correction means corresponds to the conversion information correction block 160 for example. Also, image conversion means corresponds to the image conversion block 180 for example. Also, image synthesis means corresponds to the image synthesis block 190 for example.

Further, in claim 13, feature quantitative extraction means corresponds to the feature quantitative extraction block 150 for example. Also, decision means corresponds to the synthesized image division decision block 170 for example. Also, image synthesis means corresponds to the image conversion block 180 and the image synthesis block 190 for example.

Further, in claim 14, moving image storage means corresponds to the moving image storage block 200 for example. Also, conversion information storage means corresponds to the metadata storage block 210 for example. Also, image holding means corresponds to the image memory 220. Also feature quantitative extraction means corresponds to the feature quantitative extraction block 150 for example. Also, image conversion means corresponds to the image conversion block 180 for example. Also, decision means corresponds to the synthesized image division decision block 170 for example. Also, image synthesis means corresponds to the image synthesis block 190 for example. Also, display control means corresponds to the display control block 250 for example.

Further, in claim 15 or 16, an image conversion procedure corresponds to step S929 for example. Also, a decision procedure corresponds to step S950 for example. Also, an image synthesis procedure corresponds to step S930 for example.

It should be noted that the processing procedures described in the embodiment of the present invention may be understood as a method having a sequence of these procedures or as a program for making a computer execute the sequence of these procedures or a recording media that records this program.

The invention claimed is:

1. An image processing apparatus comprising: means for storing a taken moving image taken by an image taking apparatus; means for storing, for each second taken image, conversion information including an affine transformation parameter for converting said second taken image located after a first taken image in time axis of said taken moving image with reference to said first taken image configuring included in said taken moving image; means for holding a log image including each taken image located before said second taken image in said time axis; means for extracting a feature quantity associated with said second taken image; means for converting said second taken image on the basis of said conversion information; means for determining whether or not synthesis of said second taken image with said log image is necessary on the basis of said extracted feature amount; and means for synthesizing, when the synthesis of said second taken image with said log image is determined necessary by said means for determining, said converted second taken image with said log image held in said means for holding and holding the synthesized image in said means for holding as a new log image and, when the synthesis of said second taken image with said log image is determined unnecessary by said means for determining, holding said second taken image in said means for holding without synthesizing said second taken image with said log image held in said means for holding; wherein, when the synthesis of said second taken image with said log image is determined unnecessary by said means for determining, said means for synthesizing erases said log image held in said means for holding and holds said second taken image in said means for holding as a new log image.

2. The image processing apparatus according to claim h wherein, when the synthesis of said second taken image with said log image is determined unnecessary by said means for determining, said means for synthesizing arranges said second taken image at a position different from an arrangement position of said log image in said means for holding and holds said second taken image in said means for holding as new log image.

3. The image processing apparatus according to claim wherein said means for extracting extracts a feature amount by detecting a certain change in each image included in said taken moving image, and
    said means for determining determines whether or not said second taken image corresponds to a scene change point by comparing said extracted feature amount with a predetermined threshold value and, when said second taken image is found corresponding to said scene change point, determines that said second taken image and said log image are not synthesized together.

4. The image processing apparatus according to claim 1, wherein said conversion information includes elements associated with zoom-in/zoom-out, translation, and rotation,
    said means for extracting extracts a translation component, a rotation component, and a zoom-in/zoom-out component on the basis of said conversion information associated with said second taken image, and
    said means for determining determines whether or not said synthesis is necessary by comparing at least one of said extracted translation component, said rotation component, and said zoom-in/zoom-out component with a predetermined threshold value.

5. The image processing apparatus according to claim 4, wherein said means for extracting extracts translation components, rotation components, and zoom-in/zoom-out components on the basis of conversion information associated with each taken image from taken images located a predetermined number before said second taken image in said time axis up to said second taken image and computes an average value of each of said extracted translation components, said rotation components, and said zoom-in/zoom-out components, and
    said means for determining determines whether or not said synthesis is necessary by comparing at least one of said computed average values of translation components, rotation components, and zoom-in/zoom-out components with a predetermined threshold value.

6. The image processing apparatus according to claim 4, wherein said means for extracting extracts translation components, rotation components, and zoom-in/zoom-out components on the basis of conversion information associated with each taken image from taken images located a predetermined number before said second taken image in said time axis up to said second taken image and computes an integrated value of each of said extracted translation components, said rotation components, and said zoom-in/zoom-out components, and
    said means for determining determines whether said synthesis is necessary by comparing at least one of said computed integrated values of translation components, rotation components, and zoom-in/zoom-out components with a predetermined threshold value.

7. An image processing apparatus comprising: means for storing a taken moving image taken by an image taking apparatus; means for storing, for each second taken image, conversion information including an affine transformation parameter for converting said second taken image located after a first taken image in time axis of said taken moving image with reference to said first taken image included in said taken moving image; means for holding a log image including each taken image located before said second taken image in said time axis; means for determining whether or not synthesis of said second taken image with said log image is necessary on the basis of an elapsed time from the holding of said log image in said means for holding; means for converting said second taken image on the basis of said conversion information; and means for synthesizing, when the synthesis of said second taken image with said log image is determined necessary by said means for determining, said converted second taken image with said log image held in said means for holding and holding the synthesized image in said means for holding as a new log image and, when the synthesis of said second taken image with said log image is determined unnecessary by said means for determining, holding said second taken image in said means for holding without synthesizing said second taken image with said log image held in said means for holding; wherein, when the synthesis of said second taken image with said log image is determined unnecessary by said means for determining, said means for synthesizing erases said log image held in said means for holding and holds said second taken image in said means for holding as a new log image.

8. An image processing apparatus comprising: means for storing a taken moving image taken by an image taking apparatus; means for storing, for each second taken image, conversion information including an affine transformation parameter for converting said second taken image located after a first taken image in time axis of said taken moving image with reference to said first taken image included in said taken moving image; means for holding a log image including each taken image located before said second taken image in said time axis; means for extracting a feature quantity associated with said second taken image; means for correcting said conversion information on the basis of said extracted feature quantity; means for converting said second taken image on the basis of said corrected conversion information; and means for synthesizing said converted second taken image with said log image held in said means for holding and holding the synthesized image in said means for holding as a new log image; wherein, when the synthesis of said second taken image with said log image is determined unnecessary by said means for determining, said means for synthesizing erases said log image held in said means for holding and holds said second taken image in said means for holding as a new log image.

9. The image processing apparatus according to claim 8, wherein said means for correcting determines whether or not correction of said conversion information is necessary by comparing said extracted feature quantity with a predetermined threshold value and, when the correction of said conversion information is found necessary, corrects said conversion information and
    said means for converting converts said second taken image on the basis of said corrected conversion information when said conversion information has been corrected and, when said conversion information has not been corrected, converts said second taken image on the basis of said conversion information.

10. The image processing apparatus according to claim 9, wherein, when correction of said conversion information is found necessary, said means for correcting corrects said conversion information to predetermined conversion information.

11. The image processing apparatus according to claim 9, wherein, when the correction of said conversion information is found necessary, said means for correcting corrects said conversion information on the basis of conversion information associated with a taken image located before said second taken image in said time axis and conversion information associated with a taken image located after said second taken image.

12. A moving image reproducing apparatus comprising: means for storing a taken moving image taken by an image taking apparatus; means for storing, for each second taken image, conversion information including an affine transformation parameter for converting said second taken image located after a first taken image in time axis of said taken moving image with reference to said first taken image included in said taken moving image; means for holding a log image including each taken image located before said second taken image in said time axis; means for extracting a feature quantity associated with said second taken image; conversion means for converting said second taken image on the basis of said conversion information; means for determining whether synthesis of said second taken image with said log image is necessary or not on the basis of said extracted feature amount; means for synthesizing, when the synthesis of said second taken image with said log image is determined necessary by said means for determining, said converted second taken image with said log image held in said means for holding and holding the synthesized image in said means for holding as a new log image and, when the synthesis of said second taken image with said log image is determined unnecessary by said means for determining, holding said second taken image in said means for holding without synthesizing said second taken image with said log image held in said means for holding; and means for sequentially displaying a new log image held in said image means for holding or said second taken image onto a display means; wherein, when the synthesis of said second taken image with said log image is determined unnecessary by said means for determining, said means for synthesizing erases said log image held in said means for holding and holds said second taken image in said means for holding as a new log image.

13. An image processing method in an image processing apparatus having means for storing a taken moving image taken by an image taking apparatus, means for storing, for each second taken image, conversion information including an affine transformation parameter for converting said second taken image located after a first taken image in time axis of said taken moving image with reference to said first taken image included in said taken moving image, means for holding a log image including each taken image located before said second taken image in said time axis, and means for extracting a feature quantity associated with said second taken image, said image processing method comprising: an converting said second taken image on the basis of said conversion information; determining whether or not synthesis of said second taken image with said log image is necessary on the basis of said extracted feature amount; and an if when the synthesis of said second taken image with said log image is determined necessary by said determining decision, synthesizing said converted second taken image with said log image held in said image holding means for holding and holding the synthesized image in said means for holding as a new log image and, when the synthesis of said second taken image with said log image is determined unnecessary by said determining, holding said second taken image in said means for holding without synthesizing said second taken image with said log image held in said means for holding; wherein, when the synthesis of said second taken image with said log image is determined unnecessary by said means for determining, said means for synthesizing erases said log image held in said means for holding and holds said second taken image in said means for holding as a new log image.

14. A non-transitory computer-readable storage medium storing computer-readable instructions thereon, which, when executed by an image processing apparatus having means for storing a taken moving image taken by an image taking apparatus, storage means for storing, for each second taken image, conversion information including an affine transformation parameter for converting said second taken image located after a first taken image in time axis of said taken moving image with reference to said first taken image included in said taken moving image, means for holding a log image including each taken image located before said second taken image in said time axis, and means for extracting a feature quantity associated with said second taken image, causes the image processing apparatus to perform a method comprising: converting said second taken image on the basis of said conversion information; determining whether or not synthesis of said second taken image with said log image is necessary on the basis of said extracted feature amount; and, if when the synthesis of said second taken image with said log image is determined necessary by said determining, synthesizing said converted second taken image with said log image held in said means for holding and holding the synthesized image in said means for holding as a new log image and, when the synthesis of said second taken image with said log image is determined unnecessary by said determining, holding said second taken image in said means for holding without synthesizing said second taken image with said log image held in said means for holding; wherein, when the synthesis of said second taken image with said log image is determined unnecessary by said means for determining, said means for synthesizing erases said log image held in said means for holding and holds said second taken image in said means for holding as a new log image.

15. An image processing apparatus comprising: a moving image storage unit configured to store a taken moving image taken by an image taking apparatus; a conversion information storage unit configured to store, for each second taken image, conversion information including an affine transformation parameter for converting said second taken image located after a first taken image in time axis of said taken moving image with reference to said first taken image included in said taken moving image; an image holding unit configured to hold a log image including each taken image located before said second taken image in said time axis; a feature quantity extraction unit configured to extract a feature quantity associated with said second taken image; an image conversion unit configured to convert said second taken image on the basis of said conversion information; a decision unit configured to determine whether or not synthesis of said second taken image with said log image is necessary on the basis of said extracted feature amount; and an image synthesis unit configured to synthesize, when the synthesis of said second taken image with said log image is determined necessary by said decision unit, said converted second taken image with said log image held in said image holding unit and holding the synthesized image in said image holding unit as a new log image and, when the synthesis of said second taken image with said log image is determined unnecessary by said decision unit, holding said second taken image in said image holding unit without synthesizing said second taken image with said log image held in said image holding unit.

16. An image processing apparatus comprising: a moving image storage unit configured to store a taken moving image taken by an image taking apparatus; a conversion information storage unit configured to store, for each second taken image, conversion information including an affine transformation parameter for converting said second taken image located after a first taken image in time axis of said taken moving image with reference to said first taken image included in said taken moving image; an image holding unit configured to hold a log image including each taken image located before said second taken image in said time axis; a decision unit configured to determine whether or not synthesis of said second taken image with said log image is necessary on the basis of an elapsed time from the holding of said log image in said image holding unit; an image conversion unit configured to convert said second taken image on the basis of said conversion information; and an image synthesis unit configured to synthesize, when the synthesis of said second taken image with said log image is determined necessary by said decision unit, said converted second taken image with said log image held in said image holding unit and holding the synthesized image in said image holding unit as a new log image and, when the synthesis of said second taken image with said log image is determined unnecessary by said decision unit, holding said second taken image in said image holding unit without synthesizing said second taken image with said log image held in said image holding unit; wherein, when the synthesis of said second taken image with said log image is determined unnecessary by said means for determining, said means for synthesizing erases said log image held in said means for holding and holds said second taken image in said means for holding as a new log image.

17. An image processing apparatus comprising: a moving image storage unit configured to store a taken moving image taken by an image taking apparatus; a conversion information storage unit configured to store, for each second taken image, conversion information including an affine transformation parameter for converting said second taken image located after a first taken image in time axis of said taken moving image with reference to said first taken image included in said taken moving image; an image holding unit configured to hold a log image including each taken image located before said second taken image in said time axis; a feature quantity extraction unit configured to extract a feature quantity associated with said second taken image; a conversion information correction unit configured to correct said conversion information on the basis of said extracted feature quantity; an image conversion unit configured to convert said second taken image on the basis of said corrected conversion information; and an image synthesis unit configured to synthesize said converted second taken image with said log image held in said image holding unit and holding the synthesized image in said image holding unit as a new log image; wherein, when the synthesis of said second taken image with said log image is determined unnecessary by said means for determining, said means for synthesizing erases said log image held in said means for holding and holds said second taken image in said means for holding as a new log image.

18. A moving image reproducing apparatus comprising: a moving image storage unit configured to store a taken moving image taken by an image taking apparatus; a conversion information storage unit configured to store, for each second taken image, conversion information including an affine transformation parameter for converting said second taken image located after a first taken image in time axis of said taken moving image with reference to said first taken image included in said taken moving image; an image holding unit configured to hold a log image including each taken image located before said second taken image in said time axis; a feature quantity extraction unit configured to extract a feature quantity associated with said second taken image; an image conversion unit configured to convert said second taken image on the basis of said conversion information; a decision unit configured to determine whether synthesis of said second taken image with said log image is necessary or not on the basis of said extracted feature amount; an image synthesis unit configured to synthesize, when the synthesis of said second taken image with said log image is determined necessary by said decision unit, said converted second taken image with said log image held in said image holding unit and holding the synthesized image in said image holding unit as a new log image and, when the synthesis of said second taken image with said log image is determined unnecessary by said decision unit,
   holding said second taken image in said image holding unit without synthesizing said second taken image with said log image held in said image holding unit; and a display control unit configured to sequentially display a new log image held in said image holding unit or said second taken image onto a display unit; wherein, when the synthesis of said second taken image with said log image is determined unnecessary by said means for determining, said means for synthesizing erases said log image held in said means for holding and holds said second taken image in said means for holding as a new log image.

* * * * *